(12) United States Patent
Freda et al.

(10) Patent No.: US 11,982,255 B2
(45) Date of Patent: May 14, 2024

(54) MODULAR ENVELOPE HYDRODYNAMIC ELECTRIFICATION SYSTEM

(71) Applicants: Robert Freda, West Roxbury, MA (US); Bradford G. Knight, Salem, MA (US)

(72) Inventors: Robert Freda, West Roxbury, MA (US); Bradford G. Knight, Salem, MA (US)

(73) Assignee: INGLASS S.p.A., San Polo di Piave (IT)

( * ) Notice: Subject to any disclaimer, the term of this patent is extended or adjusted under 35 U.S.C. 154(b) by 0 days.

(21) Appl. No.: 18/121,174

(22) Filed: Mar. 14, 2023

(65) Prior Publication Data

US 2023/0228240 A1 Jul. 20, 2023

Related U.S. Application Data

(63) Continuation of application No. 17/701,036, filed on Mar. 22, 2022, now Pat. No. 11,655,795, which is a continuation of application No. 17/124,890, filed on Dec. 17, 2020, now Pat. No. 11,286,899, which is a continuation of application No. 16/535,802, filed on Aug. 8, 2019, now Pat. No. 10,876,512, which is a
(Continued)

(51) Int. Cl.
*F03B 13/08* (2006.01)
*H02K 7/18* (2006.01)

(52) U.S. Cl.
CPC ......... *F03B 13/086* (2013.01); *H02K 7/1823* (2013.01)

(58) Field of Classification Search
CPC . F03B 13/086; H02K 7/1823; F05B 2240/93; Y02E 10/20; F04F 10/02
See application file for complete search history.

(56) References Cited

U.S. PATENT DOCUMENTS

| | | |
|---|---|---|
| 4,117,676 A | 10/1978 | Atencio |
| 4,182,123 A | 1/1980 | Ueda |
| 4,220,003 A | 9/1980 | Doi |

(Continued)

FOREIGN PATENT DOCUMENTS

| | | | | |
|---|---|---|---|---|
| EP | 1441125 A1 | * | 7/2004 | ............... E02B 9/00 |
| JP | S59136579 A | | 8/1984 | |

(Continued)

OTHER PUBLICATIONS

International Search Report and Written Opinion for International Application No. PCT/US2018/018188 dated May 29, 2018.

*Primary Examiner* — Pedro J Cuevas
(74) *Attorney, Agent, or Firm* — RMCK Law Group PLC

(57) ABSTRACT

A hydrodynamic electrification system that generates electricity from water moving from a high side to a low side and around a structure that divides the low side from the high side generally includes a water transport system that directs the water from the high side presenting a hydraulic head, over the structure, and to the low side. The system includes a power extraction system having a wheel that receives the water from said water transport system and a mounting system having a high side anchor that connects near an intake to the water transport system at the high side and having a low side anchor that connects to the power extraction system at the low side.

20 Claims, 49 Drawing Sheets

Related U.S. Application Data continuation of application No. PCT/US2018/018168, filed on Feb. 14, 2018.

(60) Provisional application No. 62/458,786, filed on Feb. 14, 2017.

(56) References Cited

U.S. PATENT DOCUMENTS

| | | | |
|---|---|---|---|
| 4,222,520 A | 9/1980 | Melcher | |
| 4,288,985 A | 9/1981 | Dyck | |
| 4,311,410 A | 1/1982 | Atencio | |
| 4,364,228 A | 12/1982 | Eller | |
| 4,381,645 A | 5/1983 | Galuska | |
| 4,629,904 A | 12/1986 | Rojo et al. | |
| 4,717,831 A | 1/1988 | Kikuchi | |
| 4,843,249 A | 6/1989 | Bussiere | |
| 4,948,985 A | 8/1990 | Adams | |
| 5,377,485 A | 1/1995 | Bellamy | |
| 5,440,175 A | 8/1995 | Mayo, Jr. et al. | |
| 6,206,630 B1 | 3/2001 | Feltenberger et al. | |
| 6,431,821 B1 | 8/2002 | Feltenberger et al. | |
| 6,531,788 B2* | 3/2003 | Robson | F03B 17/061 290/43 |
| 6,606,857 B1 | 8/2003 | Simonds | |
| 7,969,034 B2 | 6/2011 | Winius | |
| 8,653,682 B2* | 2/2014 | Rooney | F03B 17/061 290/43 |
| 8,766,466 B2* | 7/2014 | Dehlsen | B63G 8/22 290/43 |
| 8,814,515 B2 | 8/2014 | Farb | |
| 9,080,548 B2* | 7/2015 | Dehlsen | F03B 13/105 |
| 9,103,084 B2 | 8/2015 | French | |
| 9,534,579 B2 | 1/2017 | Rompay | |
| 9,719,482 B2 | 8/2017 | Hong | |
| 9,730,431 B2 | 8/2017 | French | |
| 9,803,614 B2 | 10/2017 | Williams et al. | |
| 10,202,960 B2 | 2/2019 | Williams et al. | |
| 10,428,786 B2 | 10/2019 | Navarro | |
| 10,876,512 B2* | 12/2020 | Freda | F03B 13/086 |
| 11,053,909 B2 | 7/2021 | Suzuki | |
| 2002/0158472 A1* | 10/2002 | Robson | F03B 17/061 290/43 |
| 2006/0245919 A1 | 11/2006 | Krizik et al. | |
| 2009/0322093 A1 | 12/2009 | Winius | |
| 2010/0284784 A1 | 11/2010 | Farb | |
| 2011/0173976 A1 | 7/2011 | Meadon et al. | |
| 2012/0007361 A1 | 1/2012 | Agtuca | |
| 2012/0032444 A1 | 2/2012 | Burton | |
| 2013/0088013 A1 | 4/2013 | Yan et al. | |
| 2013/0229014 A1 | 9/2013 | Willingham | |
| 2013/0266378 A1 | 10/2013 | French | |
| 2015/0008675 A1 | 1/2015 | Willingham | |
| 2015/0267675 A1 | 9/2015 | Kumano | |
| 2016/0017558 A1 | 1/2016 | French | |
| 2016/0201639 A1 | 7/2016 | Hong | |
| 2016/0286766 A1 | 10/2016 | French | |
| 2017/0234288 A1 | 8/2017 | Williams et al. | |
| 2017/0370063 A1 | 12/2017 | French | |
| 2019/0101095 A1 | 4/2019 | Navarro | |
| 2019/0249691 A1* | 8/2019 | Carter, Jr. | E02B 1/003 |
| 2019/0277000 A1 | 9/2019 | French | |

FOREIGN PATENT DOCUMENTS

| | | | |
|---|---|---|---|
| JP | 2016196858 A | 11/2016 | |
| KR | 1020100078185 A | 7/2010 | |
| WO | 2005075818 A1 | 8/2005 | |
| WO | WO-2010122187 A1 * | 10/2010 | B29C 45/4005 |

* cited by examiner

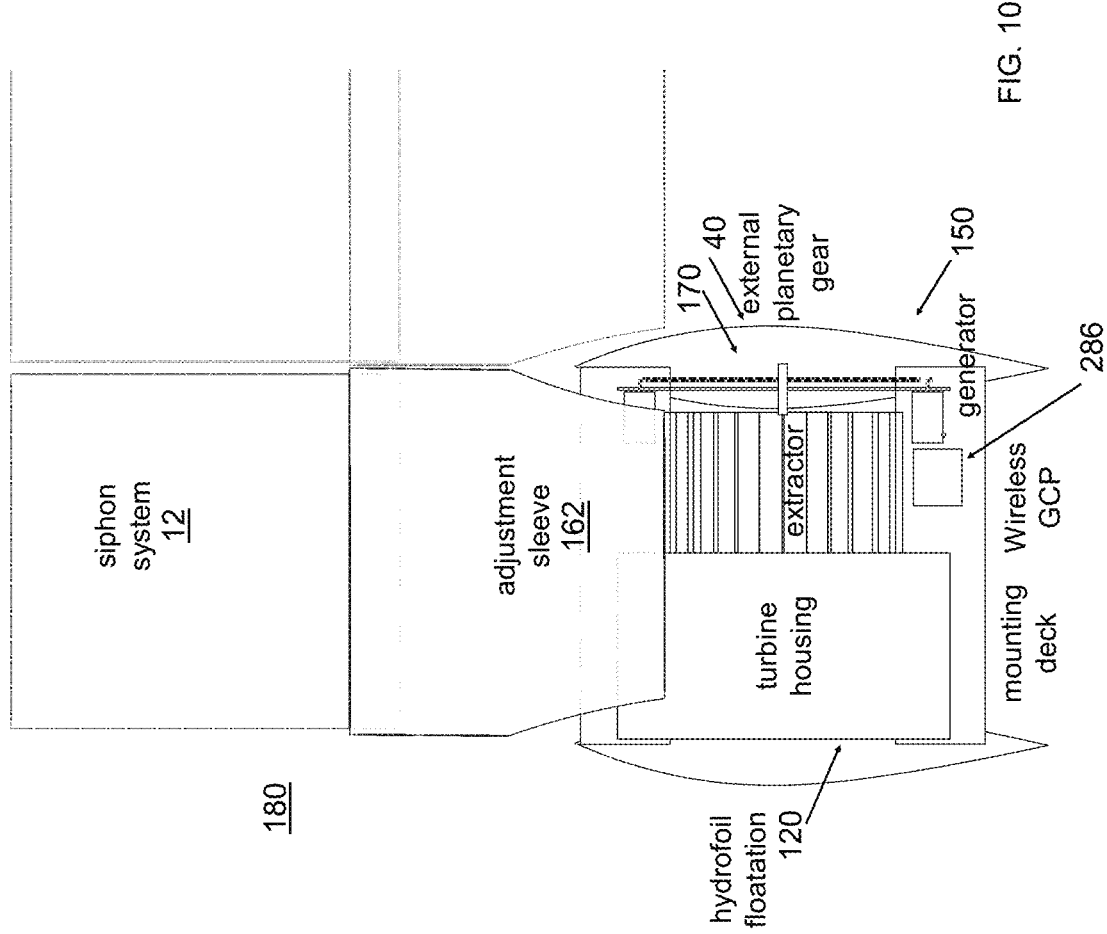

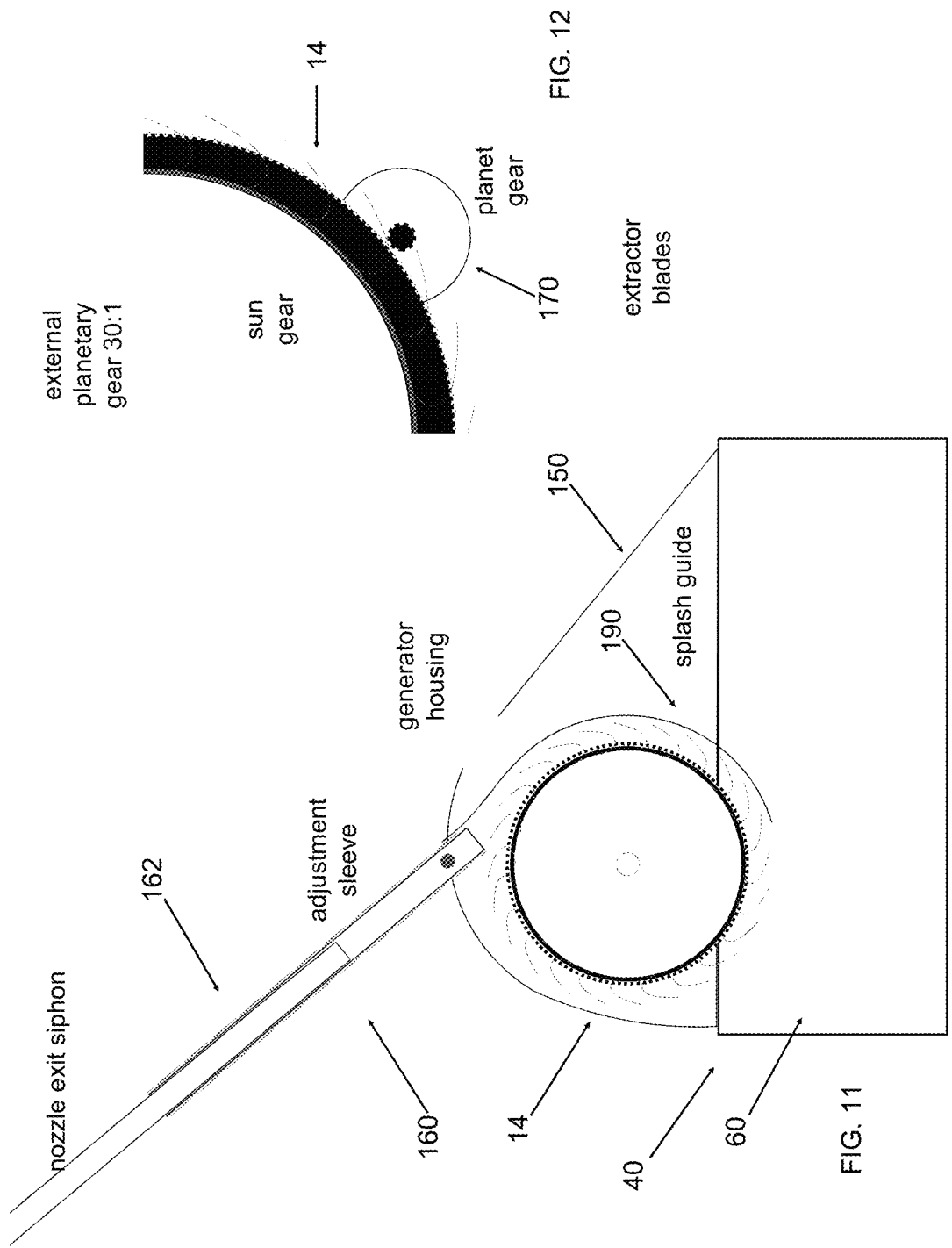

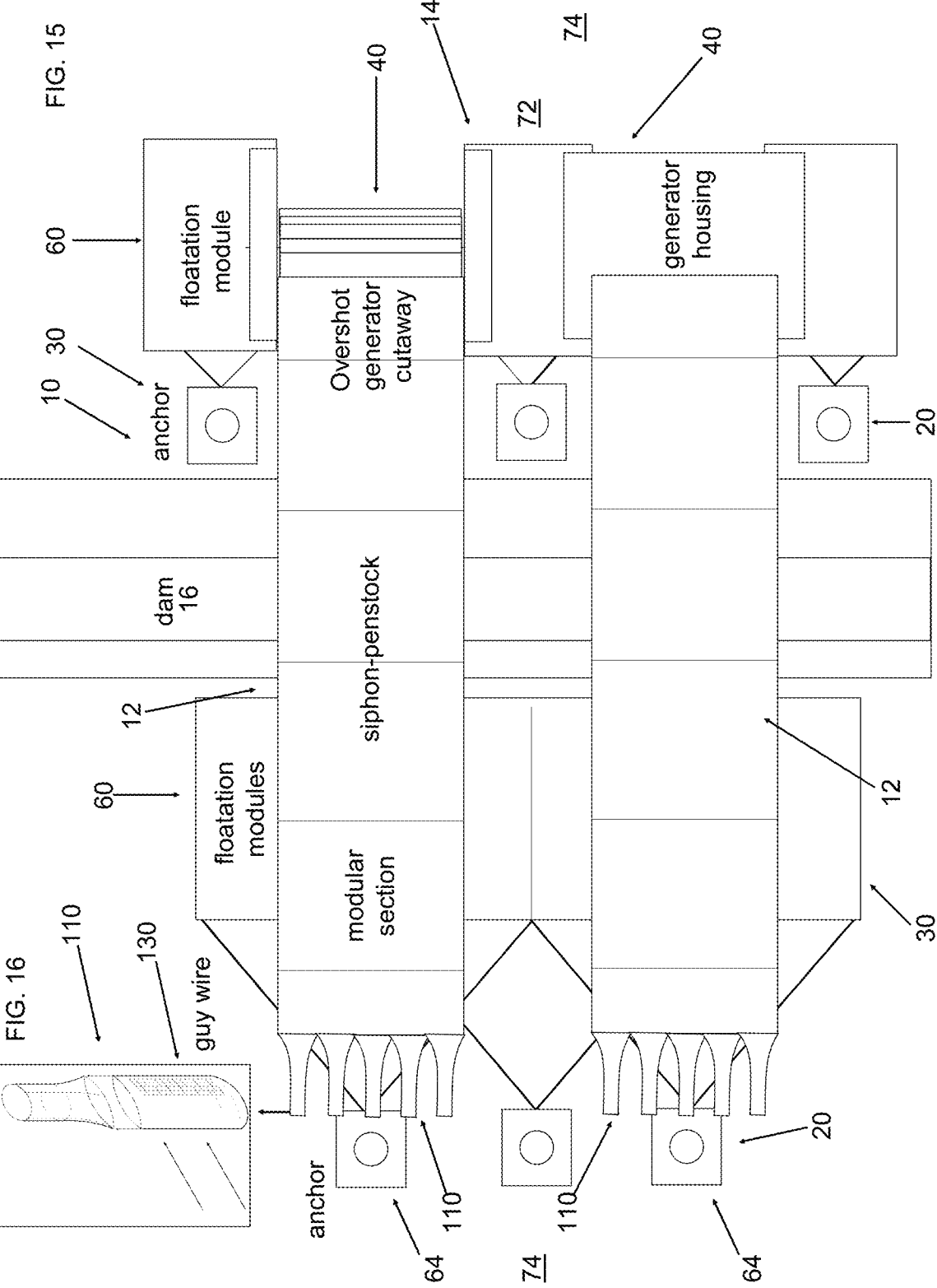

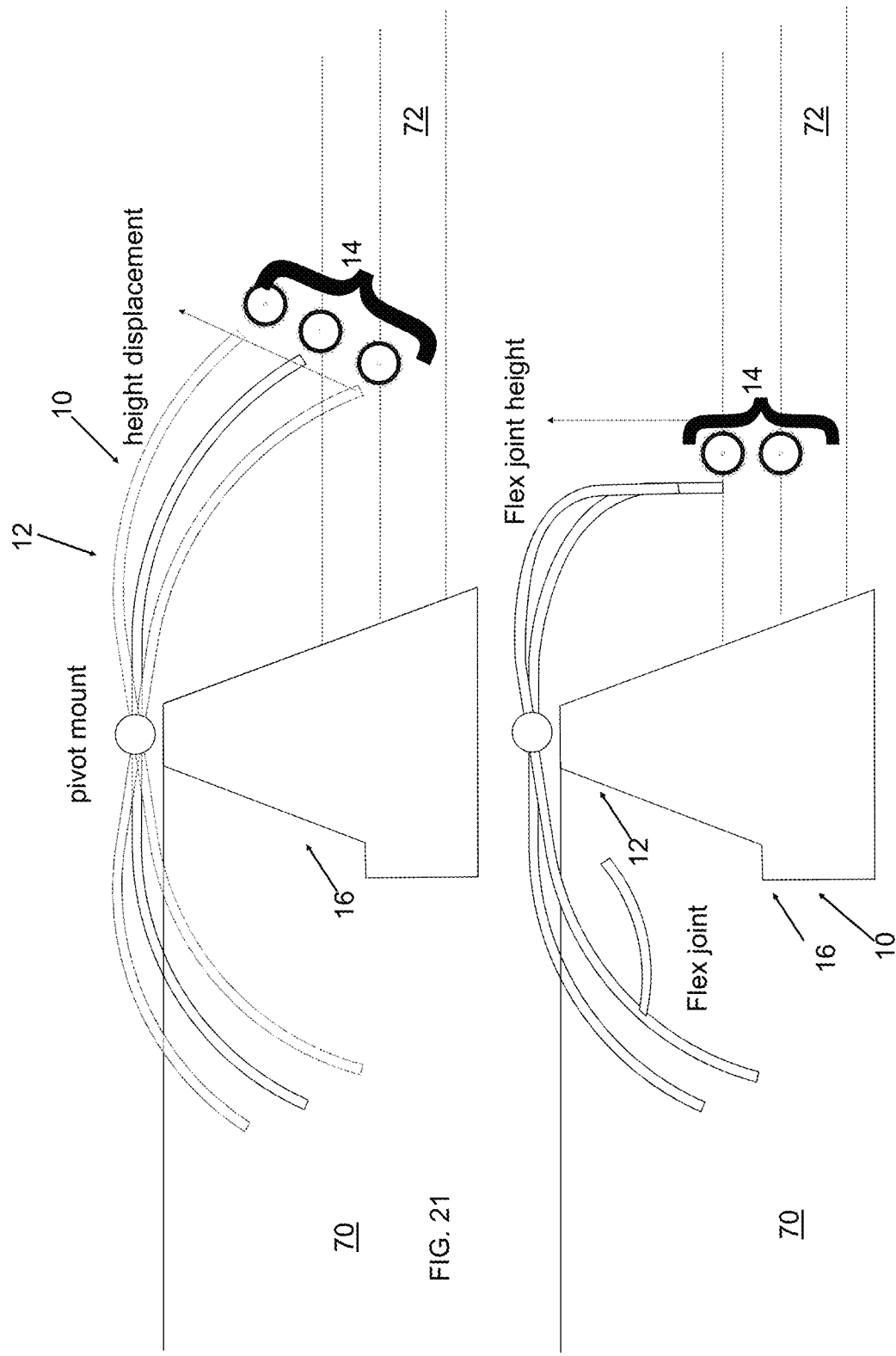

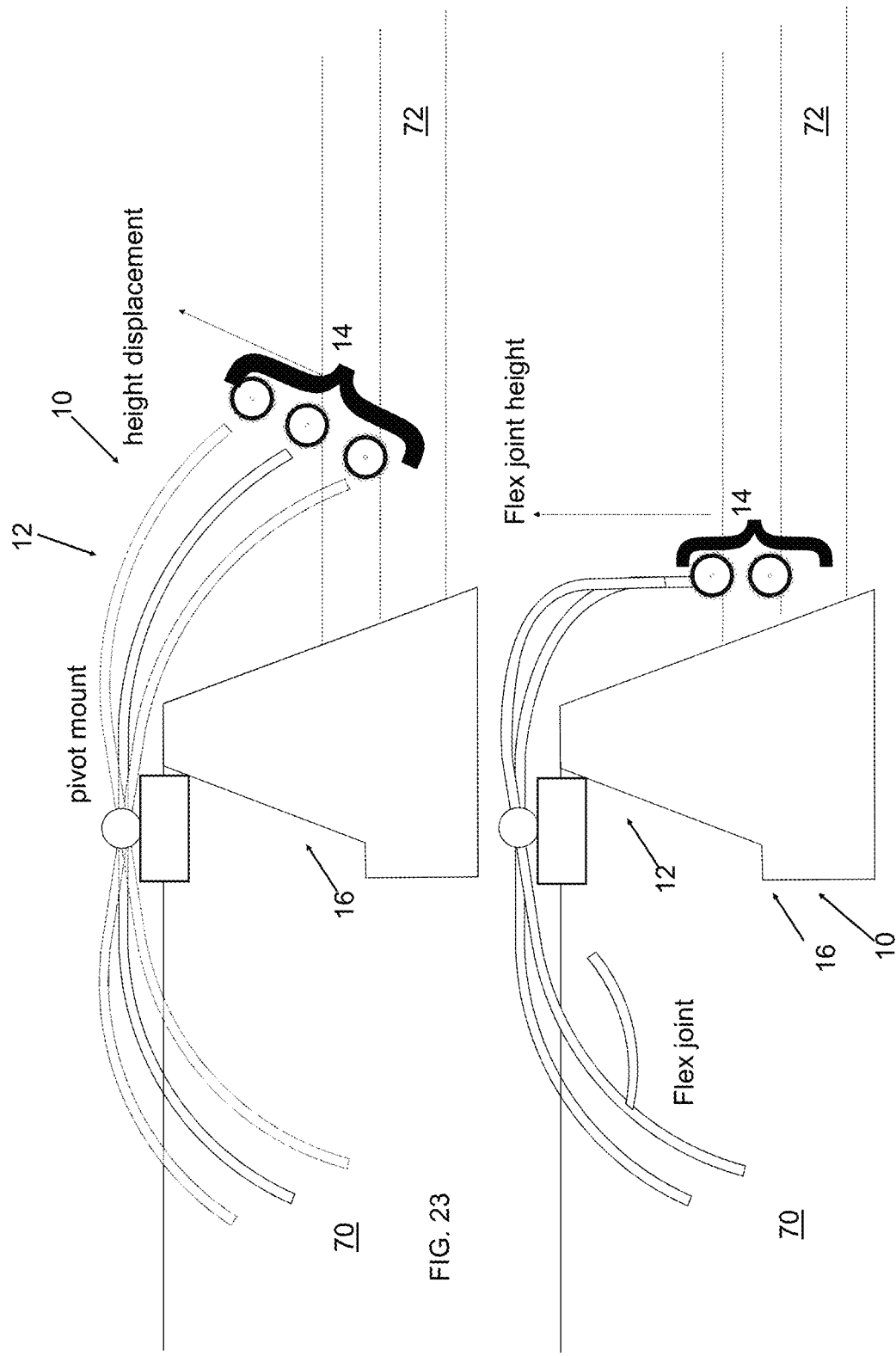

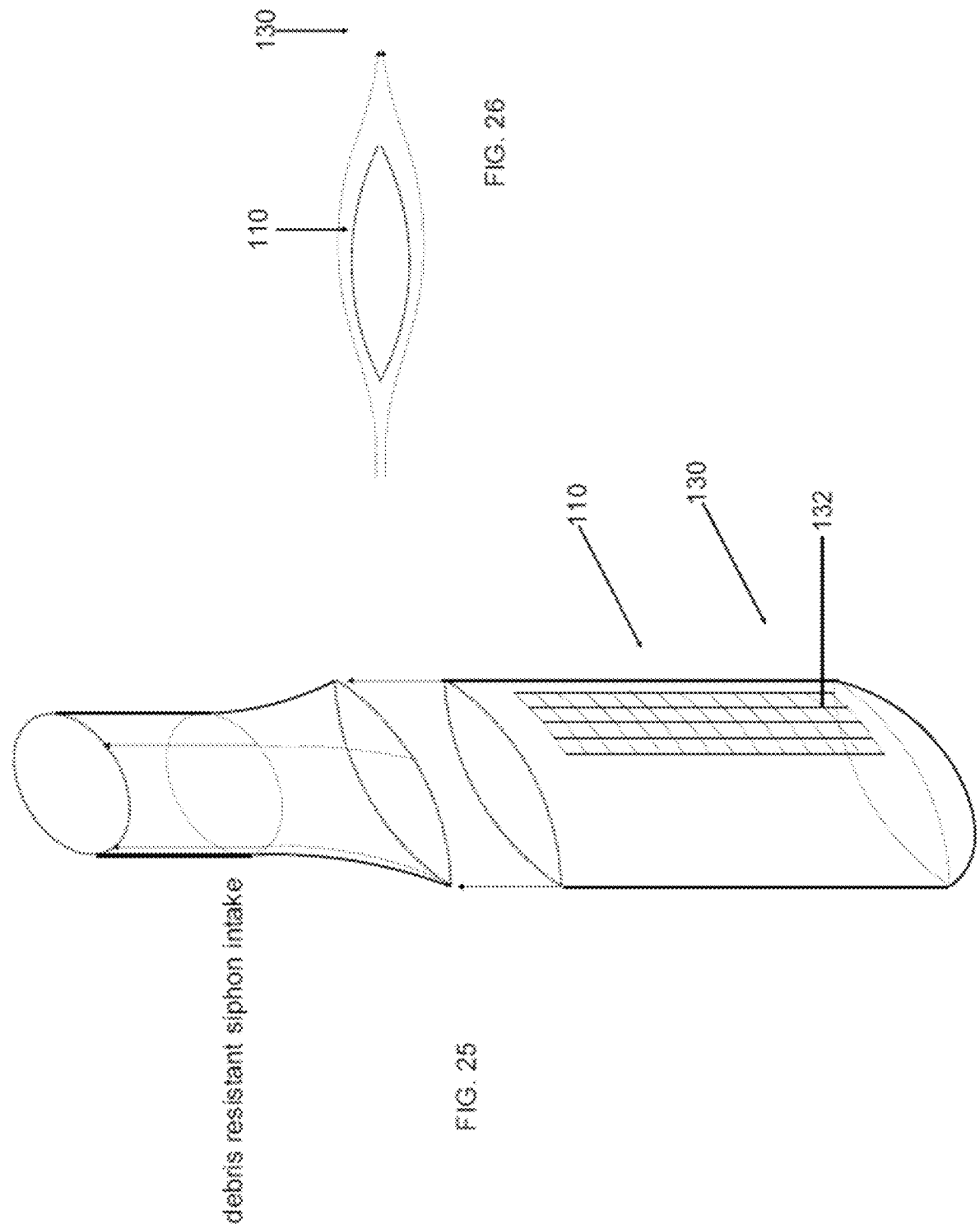

Cassion tidal system with siphon can be disguised as a rock or a reef functionally unobservable from the shore and can be deployed close to shore

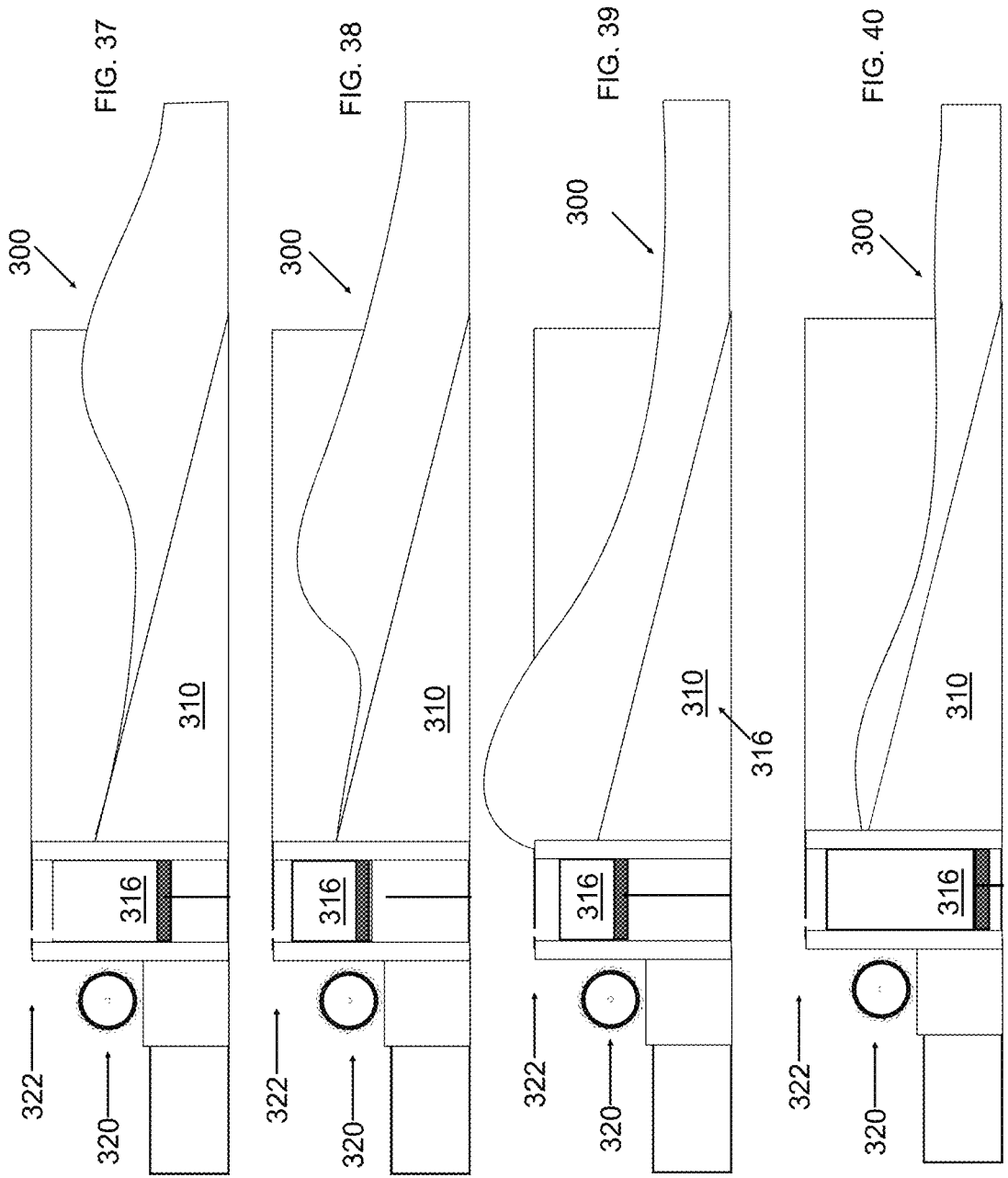

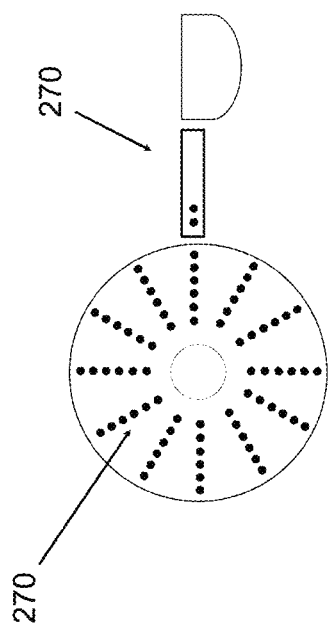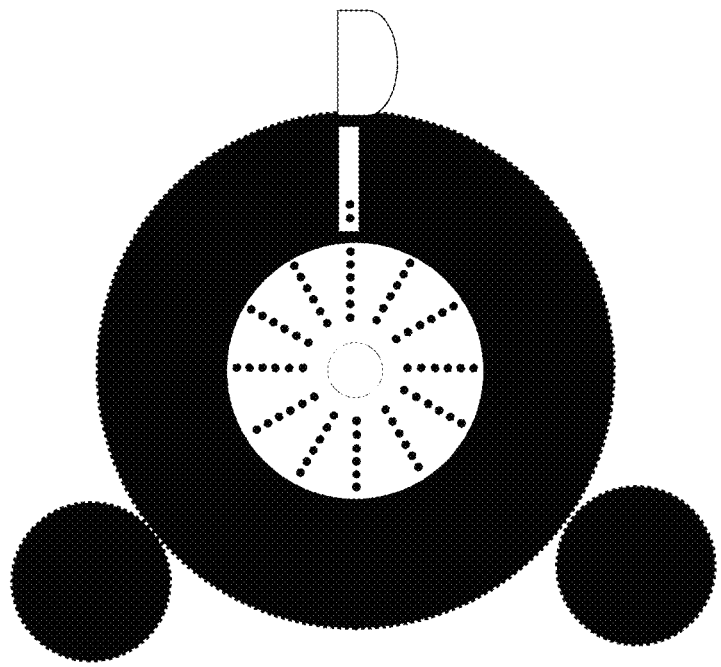

MODULAR ENVELOPE HYDRODYNAMIC ELECTRIFICATION SYSTEM

CROSS-REFERENCE TO RELATED APPLICATIONS

The present application is a continuation of U.S. application Ser. No. 17/701,036 filed Mar. 22, 2022, which is a continuation of U.S. application Ser. No. 17/124,890 filed Dec. 17, 2020, which is a continuation of U.S. application Ser. No. 16/535,802 filed Aug. 8, 2019, which is a continuation of International Application No. PCT/US2018/018188 filed Feb. 14, 2018, which claims priority to U.S. Provisional Application No. 62/458,786, filed Feb. 14, 2017, entitled Siphon Fed Hybrid Water Wheel Dam Electrification System, which is hereby incorporated by reference as if set forth herein in its entirety.

FIELD

The present disclosure relates to hydrodynamic power and specifically relates to a siphon-fed hybrid turbine hydraulic head electrification system that can be modular and mass-produced.

BACKGROUND

Typically, hydrodynamic electrification at hydraulic head sites and in suitable channels are established with equipment specifically customized to each location and position. Moreover, the electrification equipment or the mounting hardware for inlets and outlets can be part of the dam or secured to the structure. In many installations, hydroelectric equipment is permanently installed into the existing environment making its configuration, maintenance, and updating more difficult. Other environments have elevation changes that are only insufficient because of the inability to install large traditional hydroelectric equipment. Applicant appreciates that there is a need for a modular and easily mass-produced hydrodynamic electrification system that can be easily configured and implemented in various hydrodynamic electrification opportunities.

SUMMARY

The present teachings generally include a hydrodynamic electrification system that can be modular and can be mass-produced. The electrification system can be configured with a siphon system and a hybrid water wheel deployed on one or more hydraulic heads. The electrification system can be shown to create little or no effect on the impoundment areas upstream or downstream and can be shown to have little or no structural effect on the hydraulic head. The electrification system can include a mounting system, a water transport system (such as the siphon system), and a power extraction system.

The present teachings generally include a hydrodynamic electrification system that generates electricity from water moving from a high side to a low side and around a structure that divides the low side from the high side. The hydrodynamic electrification system includes a water transport system that directs the water from the high side, over the structure, and to the low side where it meets a power extraction system that receives the water from the water transport system. The system includes a mounting system having a high side anchor that connects near an intake to the water transport system at the high side and having a low side anchor that connects to the power extraction system at the low side.

The present teachings generally include a hydrodynamic electrification system having a water transport system that includes a flexible siphon.

The present teachings generally include a hydrodynamic electrification system having a flotation module to which the water transport system connects near the intake at the high side.

In aspects of the present teachings, a hydrodynamic electrification system that generates electricity from water moving from a high side to a low side and around a structure that divides the low side from the high side includes a water transport system that directs the water from the high side presenting a hydraulic head, over the structure, and to the low side. The system includes a power extraction system having a wheel that receives the water from the water transport system and a mounting system having a high side anchor that connects near an intake to the water transport system at the high side and having a low side anchor that connects to the power extraction system at the low side.

In aspects, the water transport system includes a flexible siphon. In aspects, the system includes a flotation module to which the water transport system connects near the intake at the high side.

In aspects, the flexible siphon is configured to flex in response to movement of the floatation module relative to the power extraction system. In aspects, the flexible siphon is configured to flex in response to a change in a height of the hydraulic head. In aspects, the flexible siphon is configured to flex in response to wave actions.

In aspects, the flexible siphon includes additional sections configured to extend a distance between the mounting system at the high side and the power extraction system to accommodate an increase in the hydraulic head.

In aspects, the high side anchor of the mounting system is configured to flexibly connect the intake of the water transport system to a seabed. In aspects, the high side anchor of the mounting system is configured to flexibly connect the intake of the water transport system to the structure. In aspects, the high side anchor of the mounting system is configured to flexibly connect the intake of the water transport system to a moored structure. In aspects, the low side anchor of the power extraction system is configured to flexibly connect the power extraction system to a seabed.

In aspects, the low side anchor of the power extraction system is configured to flexibly connect the power extraction system to the structure. In aspects, the low side anchor of the power extraction system is configured to flexibly connect the power extraction system to a moored structure. In aspects, the high side anchor of the mounting system is configured to rigidly connect the intake of the water transport system to a seabed. In aspects, the high side anchor of the mounting system is configured to rigidly connect the intake of the water transport system to the structure. In aspects, the high side anchor of the mounting system is configured to rigidly connect the intake of the water transport system to a moored structure.

In aspects, the low side anchor of the power extraction system is configured to rigidly connect the power extraction system to a seabed. In aspects, the low side anchor of the power extraction system is configured to rigidly connect the power extraction system to the structure. In aspects, the low side anchor of the power extraction system is configured to rigidly connect the power extraction system to a moored structure. In aspects, the high side anchor of the mounting system is configured to not connect the intake of the water transport system to a seabed. In aspects, the high side anchor of the mounting system is configured to not connect the intake of the water transport system to the structure. In aspects, the high side anchor of the mounting system is configured to not connect the intake of the water transport system to a moored structure.

In aspects, the low side anchor of the power extraction system is configured to not connect the power extraction system to a seabed. In aspects, the low side anchor of the power extraction system is configured to not connect the power extraction system to the structure. In aspects, the low side anchor of the power extraction system is configured to not connect the power extraction system to a moored structure. In aspects, the water transport system is configured to carry the water above the structure and above a waterline on the high side for directing the water to the power extraction system the low side.

In aspects, the structure is one of a dam, a dam sluice, a natural elevation that contains a hydraulic head, a manmade elevation that contains a hydraulic head, a manmade dam, and a previously electrified dam.

In aspects, the power extraction unit generates electricity at 50 Hz. In aspects, the power extraction unit generates electricity at 60 Hz. In aspects, the power extraction unit is configured to adjust the frequency of electricity being generated by adjusting a flow of the water from the water transport system to the power extraction unit.

In embodiments, the water transport system includes multiple siphons, and wherein the adjusting of the flow of the water from the water transport system to the power extraction unit includes opening or closing at least one of the multiple siphons.

The hydrodynamic electrification system of claim 30 wherein the water transport system includes a siphon, and wherein the adjusting of the flow of the water from the water transport system to the power extraction unit includes adjusting a flow rate through the siphon.

In aspects, the water transport system includes a siphon made of multiple portions of penstock.

In aspects, the structure is a modular ballast that is configured to move in response to movement of a water line on the high side and a portion of the water transport system is configured to move with the modular ballast.

In aspects, the structure is a modular ballast that is configured to move in response to movement of a water line on the high side, and wherein the high side anchor is connected to the modular ballast and the intake of the water transport system is configured to move with the modular ballast.

In aspects, the structure is a modular ballast that is configured to move in response to movement of a water line on the high side, and wherein the low side anchor is connected to the modular ballast and the power extraction system is configured to move with the modular ballast.

In aspects, the structure is a modular ballast that is configured to move in response to movement of a water line on the high side, and wherein the high side anchor is moored to the modular ballast and the intake of the water transport system is configured to float and not move with the modular ballast.

In aspects, the structure is a modular ballast that is configured to move in response to movement of a water line on the high side, and wherein the low side anchor is moored to the modular ballast and the power extraction system is configured to float but not move with the modular ballast.

In aspects, the mounting system includes a flotation module connected to the intake, wherein the flotation module has a submerged element below a waterline on the high side.

In aspects, the submerged element on the flotation module is at least one hydrofoil.

In aspects, the at least one hydrofoil is configured to be oriented axially with a flow of the water through the water transport system.

In aspects, the submerged element on the flotation module is a series of symmetric hydrofoils oriented axially with a flow of the water through the water transport system.

In aspects, the submerged element on the flotation module is a series of symmetric hydrofoils oriented axially with a flow of the water through the water transport system.

In aspects, the water transport system includes a siphon whose cross-sectional area at a portion of the siphon and an exit area of the siphon are related by the following equation that determines an optimum relationship of the cross-sectional area to the exit area per unit length of the siphon to reduce boundary layers from interfering with a column of water at the exit area $$Q_r = A_n \sqrt{2g\left(H - \frac{8flQ_t^2}{\pi^2 g d_h^5}\right)}$$

In aspects, the water transport system includes a siphon whose cross-sectional area defines a single geometry that is one of a honeycomb, round, an oval, triangular, and rectangular throughout the length of the siphon.

In aspects, the water transport system includes a siphon whose cross-sectional area defines at least two different geometries selected from a group consisting of a honeycomb, round, an oval, triangular, and rectangular.

In aspects, the water transport system includes a siphon having an accelerator section to increase a jet velocity of the water into the power extraction system.

In aspects, the water transport system includes an automatic starting mechanism due initially induce a flow into a siphon of the water transport system.

In aspects, the water transport system includes a siphon having at least one screen at the intake to filter water coming into the water transport system.

In aspects, the water transport system includes a siphon having at least one screen at the intake to filter water coming into the water transport system.

In aspects, the water transport system includes the at least one screen at the intake to filter out one of fauna, flora, and biota.

In aspects, the water transport system includes the at least one screen at the intake to prevent fish from entering the intake.

In aspects, the water transport system includes a siphon configured with its intake generally orthogonal to a flow of water through the water transport system to prevent fish from entering the intake.

In aspects, the power extraction system includes one of an overshot waterwheel, a breastshot waterwheel, an undershot waterwheel, a crossflow turbine, a helical turbine, and a Pelton wheel.

In aspects, the power extraction system includes one of a reaction type energy extractor, an impulse type energy extractor, and a hybrid reaction and an impulse energy extractor.

In aspects, the water transport system includes a siphon having an accelerator section to increase a jet velocity of the water into the power extraction system having the wheel configured to operate with a confined flow and include one of a spiral rotor and anhedrally-tilted rotors.

In aspects, the power extraction system having the wheel is configured to operate in one of a fully wetted environment or in a two-phase water to air system.

In aspects, the power extraction system having the wheel that is configured to operate in a two-phase water to air system with a jet velocity of a flow of the water into the power extraction system being between 1.25 and 2 times the rotational speed of the wheel.

In aspects, the system includes multiple water transport systems each connected to one of multiple power extraction systems each having a wheel that receives the water from one the water transport systems to which each of the power extraction systems is connected. The least two of the multiple power extraction systems are at disparate geospatial locations.

In aspects, the system includes multiple water transport systems each connected to one of multiple power extraction systems each having a wheel that receives the water from one the water transport systems to which each of the power extraction systems is connected, wherein the multiple power extraction systems each have a sensor package and are configured to controlled by a network control system that wirelessly connects to each of the multiple power extraction systems.

In aspects, a hydrodynamic electrification system in a mobile capacity inventory network that generates electricity from water moving from a high side to a low side and around structures that divide the low side from the high side in the multiple hydrodynamic environments includes multiple water transport systems that direct the water from the high side presenting a hydraulic head, over at least one of the structures, and to the low side of each of the multiple hydrodynamic environments. The network includes power extraction systems each having a wheel that receives the water from at least one of the water transport systems and mounting systems having multiple high side anchors and multiple low side anchors, wherein at least one of the water transport system connects near an intake to the water transport system at the high side anchor. The at least one of the power extraction system connects to the low side anchor. The multiple power extraction systems each have a sensor package and are configured to controlled by a network control system that wirelessly connects to each of the multiple power extraction systems.

In aspects, the at least two of the multiple power extraction systems are at disparate geospatial locations.

In aspects, the each of the water transport systems includes a flexible siphon.

In aspects, the flexible siphon is configured to flex in response to movement of each of the intakes relative to each of the power extraction systems to which they are connected.

In aspects, the flexible siphon is configured to flex in response to a change in a height of the hydraulic head with which the flexible siphon is associated.

In aspects, the flexible siphon includes additional sections configured to extend a distance between one of the mounting systems at the high side and one of the power extraction systems to accommodate an increase in the hydraulic head.

In aspects, the at least one of the high side anchors of the mounting systems is configured to flexibly connect the intake of one of the water transport systems to a seabed.

In aspects, the at least one of the high side anchors of the mounting systems is configured to flexibly connect the intake of one of the water transport system to the structure.

In aspects, the at least one of the high side anchors of the mounting systems is configured to flexibly connect the intake of one of the water transport systems to a moored structure.

In aspects, the at least one of the low side anchors of the power extraction systems is configured to flexibly connect one of the power extraction systems to a seabed.

In aspects, the at least one of the low side anchors of the power extraction systems is configured to flexibly connect the power extraction systems to one of the structures.

In aspects, the at least one of the low side anchors of the power extraction systems is configured to flexibly connect the power extractions system to a moored structure.

In aspects, the at least one of the high side anchors of the mounting systems is configured to rigidly connect one of the intakes of the water transport systems to a seabed.

In aspects, the at least one of the high side anchor of the mounting systems is configured to rigidly connect one of the intakes of the water transport systems to the structure.

In aspects, the at least one of the high side anchor of the mounting systems is configured to rigidly connect one of the intakes of the water transport systems to a moored structure.

In aspects, the at least one of the low side anchors of the power extraction systems is configured to rigidly connect the power extraction systems to a seabed.

In aspects, the at least one of the low side anchors of the power extraction systems is configured to rigidly connect the power extractions system to the structure.

In aspects, the at least one of the low side anchor of the power extraction systems is configured to rigidly connect the power extraction systems to a moored structure.

In aspects, the at least one of the high side anchor of the mounting systems is configured to not connect one of the intakes of the water transport systems to a seabed.

In aspects, the at least one of the high side anchors of the mounting systems is configured to not connect one of the intakes of the water transport systems to the structure.

In aspects, the at least one of the high side anchors of the mounting systems is configured to not connect one of the intakes of the water transport systems to a moored structure.

In aspects, the at least one of the low side anchors of the power extraction systems is configured to not connect the power extraction systems to a seabed.

In aspects, the at least one of the low side anchors of the power extraction systems is configured to not connect the power extraction systems to the structure.

In aspects, the at least one of the low side anchors of the power extraction systems is configured to not connect the power extraction systems to a moored structure.

In aspects, the water transport systems are configured to carry the water above the structure and above a waterline on the high side for directing the water to the power extraction systems at the low side.

In aspects, the structures are one of a dam, a dam sluice, a natural elevation that contains a hydraulic head, a manmade elevation that contains a hydraulic head, a manmade dam, and a previously electrified dam.

In aspects, the power extraction units generate electricity at 50 Hz.

In aspects, the power extraction units generate electricity at 60 Hz.

In aspects, the power extraction units are configured to adjust the frequency of electricity being generated by adjusting a flow of the water from the water transport systems to the power extraction units.

In aspects, the water transport systems include siphons, and wherein the adjusting of the flow of the water from the water transport system to the power extraction unit includes adjusting flow rates through the siphons.

In aspects, the water transport systems include siphons made of multiple portions of penstock.

In aspects, the structures include a modular ballast that is configured to move in response to movement of a water line on the high side and a portion of the water transport systems is configured to move with the modular ballast.

In aspects, the water transport systems include siphons whose cross-sectional areas at a portion of the siphons and an exit area of the siphons are related by the following equation that determines an optimum relationship of the cross-sectional area to the exit area per unit length of the siphons to reduce boundary layers from interfering with a column of water at the exit area $$Q_r = A_n \sqrt{2g\left(H - \frac{8flQ_t^2}{\pi^2 g d_h^5}\right)}$$

In aspects, the water transport systems include siphons whose cross-sectional areas define a single geometry that is one of a honeycomb, round, an oval, triangular, and rectangular throughout the length of the siphon.

In aspects, the water transport systems include siphons whose cross-sectional areas define at least two different geometries selected from a group consisting of a honeycomb, round, an oval, triangular, and rectangular.

In aspects, the water transport systems include siphons each having an accelerator section to increase a jet velocity of the water into each of the power extraction systems.

In aspects, the each of the water transport systems include an automatic starting mechanism due initially induce a flow into a siphon of the water transport system.

In aspects, the water transport systems include siphons having at least one screen at the intake to filter water coming into the water transport system.

In aspects, the water transport systems include siphons having at least one screen at the intake to filter water coming into the water transport systems.

In aspects, the water transport systems include the at least one screen at the intake to filter out one of fauna, flora, and biota.

In aspects, the water transport systems include the at least one screen at the intake to prevent fish from entering the intake.

In aspects, the water transport systems include siphons configured with their intake generally orthogonal to a flow of water through the water transport system to prevent fish from entering the intakes.

In aspects, the power extraction systems include one of an overshot waterwheel, a breastshot waterwheel, an undershot waterwheel, a crossflow turbine, a helical turbine, and a Pelton wheel.

In aspects, the power extraction systems include one of a reaction type energy extractor, an impulse type energy extractor, and a hybrid reaction and an impulse energy extractor.

In aspects, the water transport systems include a siphon having an accelerator section to increase a jet velocity of the water into the power extraction system having the wheel configured to operate with a confined flow and include one of a spiral rotor and anhedrally-tilted rotors.

In aspects, the power extraction systems each having the wheel is configured to operate in one of a fully wetted environment or in a two-phase water to air system.

In aspects, the power extraction systems each having the wheel that is configured to operate in a two-phase water to air system with a jet velocity of a flow of the water into the power extraction systems being between 1.25 and 2 times the rotational speed of the wheel.

BRIEF DESCRIPTION OF THE DRAWINGS

FIG. 10 is an overhead diagrammatic view of examples of a hydrodynamic electrification system including a power extraction system configured with a planetary gear arrangement in accordance with the present teachings.

FIG. 11 is a diagrammatic view of examples of a hydrodynamic electrification system including a power extraction system configured with a nozzle in a siphon system in accordance with the present teachings.

FIG. 12 is a partial diagrammatic view of examples of a hydrodynamic electrification system including a power extraction system configured with a planetary gear arrangement in accordance with another example of the present teachings.

FIG. 15 is a diagrammatic view of examples of multiple hydrodynamic electrification systems configured with airfoil intakes in siphon systems in accordance with the present teachings.

FIG. 16 is a diagrammatic view of examples of an airfoil intake in a siphon system in accordance with the present teachings.

FIG. 21 is a diagrammatic view of examples of a hydrodynamic electrification system that can be modular, mass-produced, and configured with a siphon system and a hybrid water wheel deployed in cooperation with a pivot mount configured with a dam in accordance with the present teachings.

FIG. 22 is a diagrammatic view of examples of a hydrodynamic electrification system that can be modular, mass-produced, and configured with a siphon system with flex joints and a hybrid water wheel deployed in cooperation with a pivot mount configured with a dam or other structures in accordance with the present teachings.

FIG. 23 is a diagrammatic view of examples of a hydrodynamic electrification system that can be modular, mass-produced, and configured with a siphon system and a hybrid water wheel deployed in cooperation with a pivot mount on a modular ballast in cooperation with a dam in accordance with the present teachings.

FIG. 24 is a diagrammatic view of examples of a hydrodynamic electrification system that can be modular, mass-produced, and configured with a siphon system with flex joints and a hybrid water wheel deployed in cooperation with a pivot mount on a modular ballast in cooperation with a dam in accordance with the present teachings.

FIG. 25 is a diagrammatic view of examples of a debris resistant intake siphon of a hydrodynamic electrification system in accordance with the present teachings.

FIG. 26 is a cross-section view of FIG. 25.

FIGS. 37, 38, 39, and 40 are diagrammatic views of examples of caisson tidal system of a hydrodynamic electrification system with balanced spring systems to maintain a head in different wave configuration examples in accordance with the present teachings.

FIGS. 60 and 61 are diagrammatic views of turbines in a turbine array in accordance with the present teachings.

DETAILED DESCRIPTION

Figure 1:
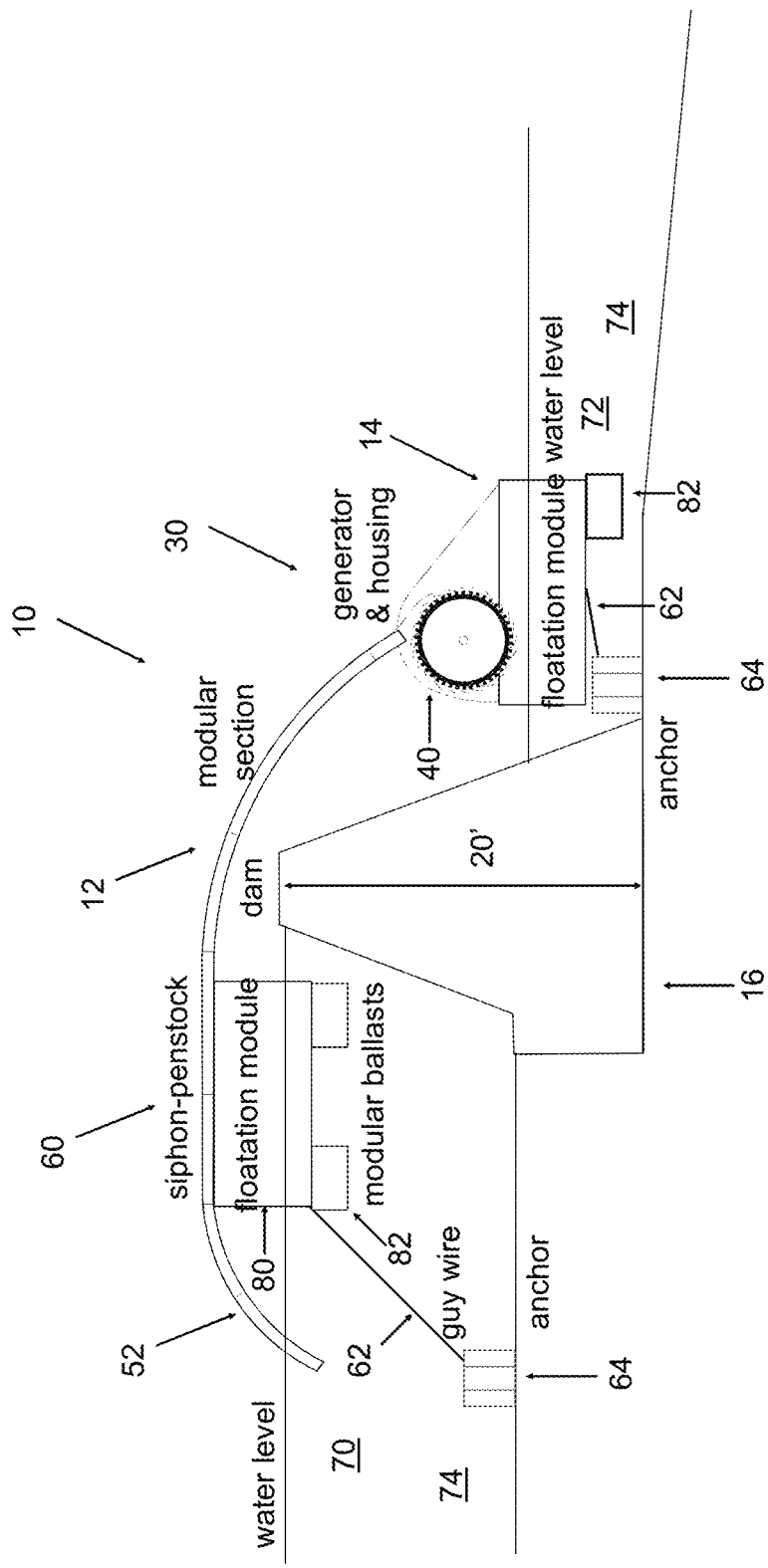
FIG. 1 is a diagrammatic view of examples of a hydrodynamic electrification system that can be modular, mass-produced, and configured with a siphon system and a hybrid water wheel deployed on a dam in accordance with the present teachings.
Figure 2:
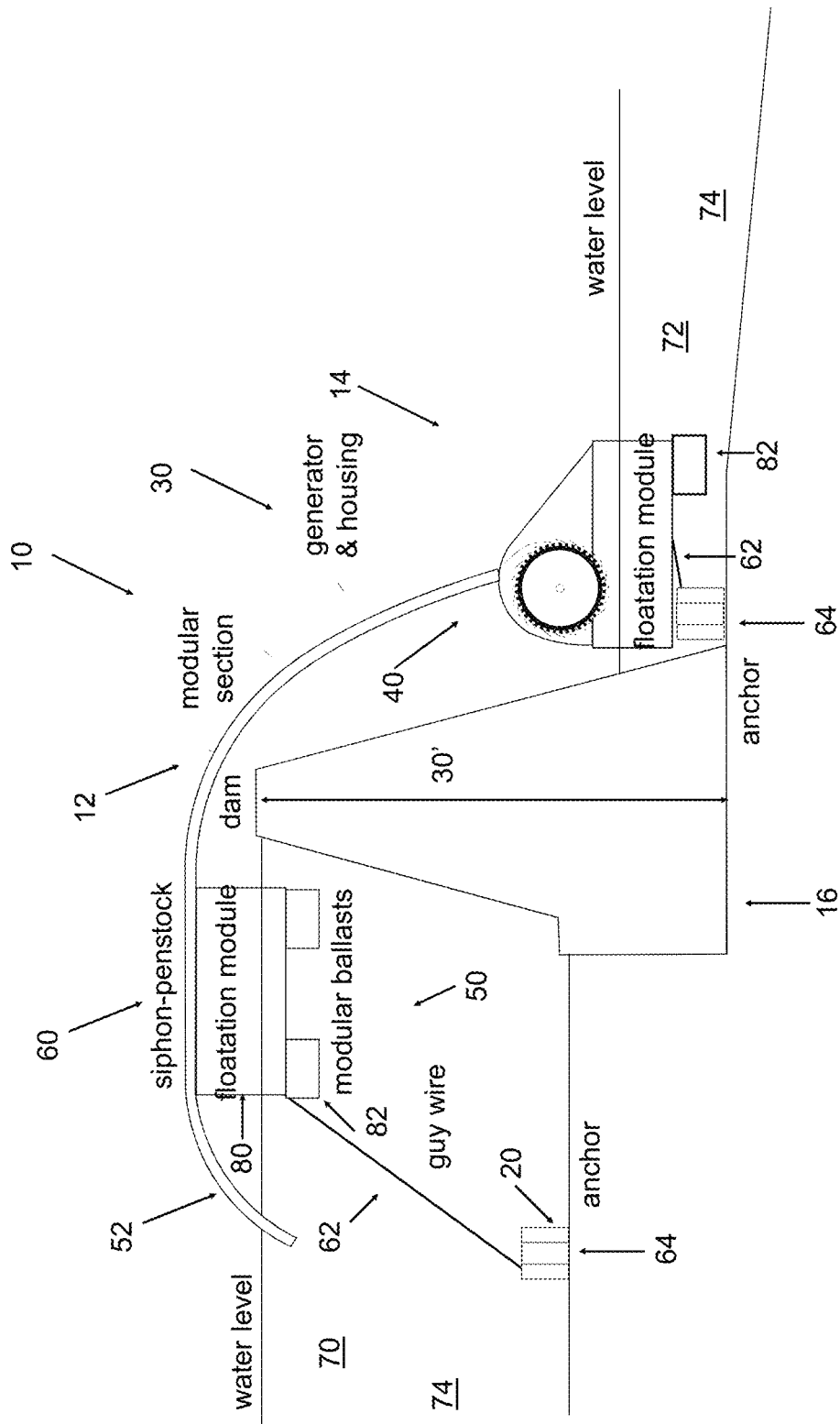
FIG. 2 is a diagrammatic view of examples of a hydrodynamic electrification system deployed on a dam larger than that depicted in FIG. 1 in accordance with the present teachings.
Figure 3:
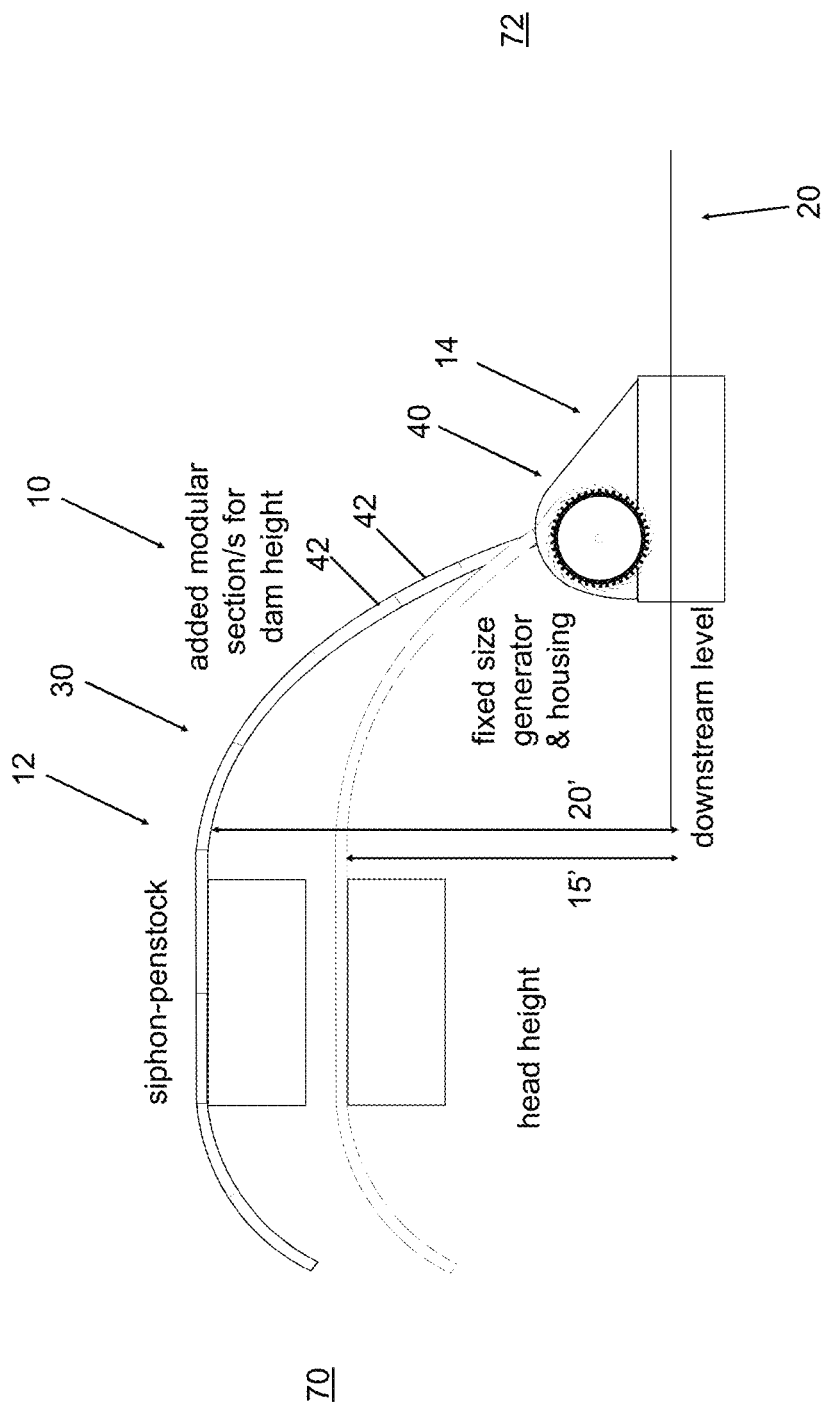
FIG. 3 is a diagrammatic view of examples of a hydrodynamic electrification system deployed on dams of varying height in accordance with the present teachings.
Figure 4:
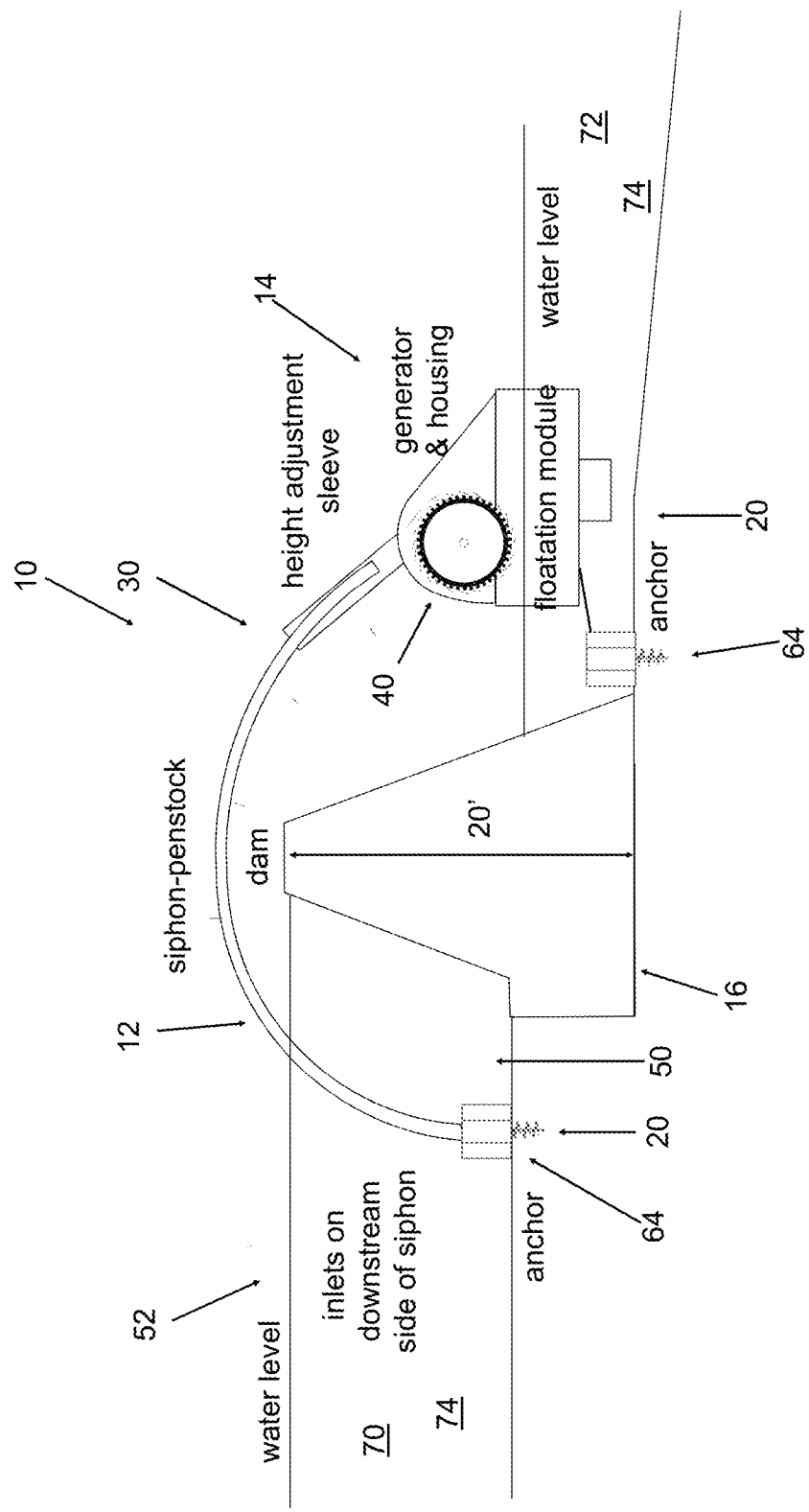
FIG. 4 is a diagrammatic view of examples of a hydrodynamic electrification system configured with an inlet on a downstream side of a siphon system in accordance with the present teachings.

The present teachings generally include a hydrodynamic electrification system 10 that can be modular and can be mass-produced. With reference to FIG. 1, FIG. 2, and FIG. 3, the electrification system 10 can be configured with a siphon system 12 and a water wheel 14 such as a hybrid water-pelton water wheel turbine or the like deployed on one or more dams 16. Throughout the disclosure the one of more dams includes any man-made and/or natural hydraulic head greater than zero. In many examples, the electrification system 10 can be shown to create little or no effect on the impoundment areas upstream or downstream and can be shown to have little or no structural effect on the dam 16 relative to more traditional systems.

Figure 17:
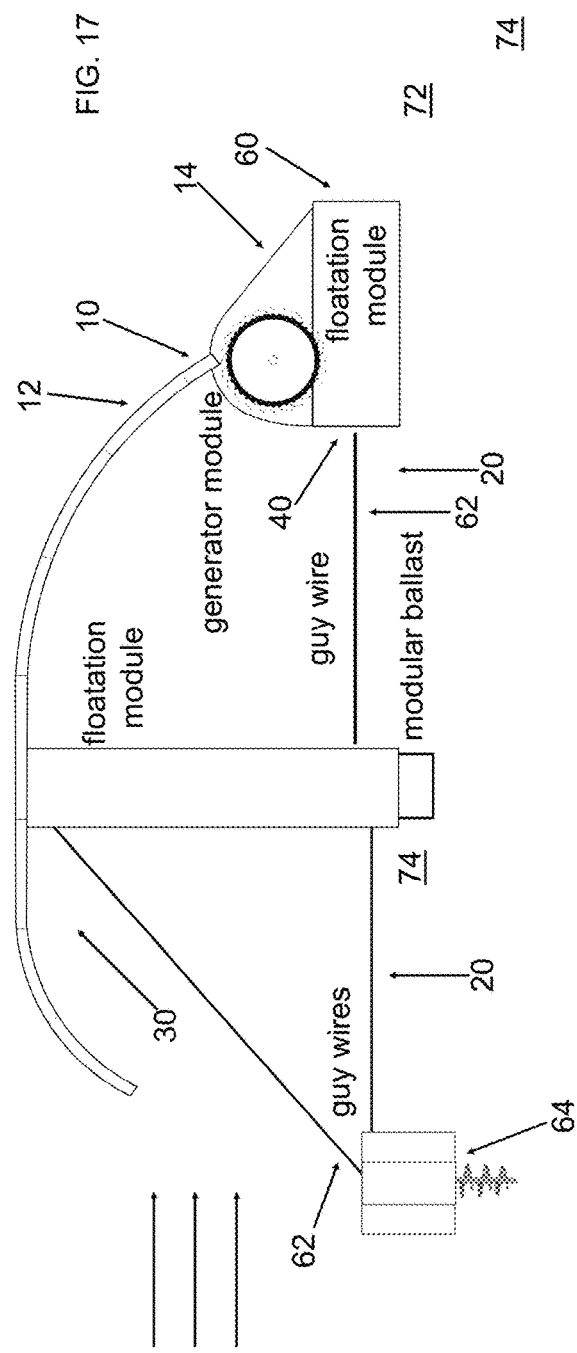
FIG. 17 is a diagrammatic view of examples of a hydrodynamic electrification system that can be modular, mass-produced, and configured with a siphon system and a hybrid water wheel deployed on a modular ballast in accordance with the present teachings.
Figure 18:
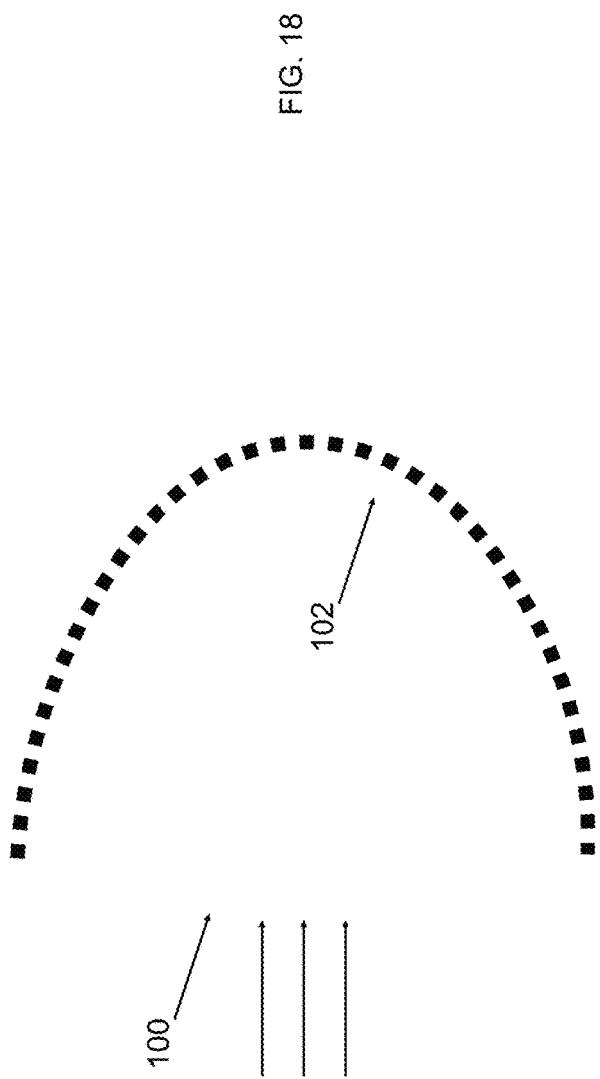
FIG. 18 is a diagrammatic view of examples of placement of siphon systems in an inverted arch in accordance with the present teachings.
Figure 19:
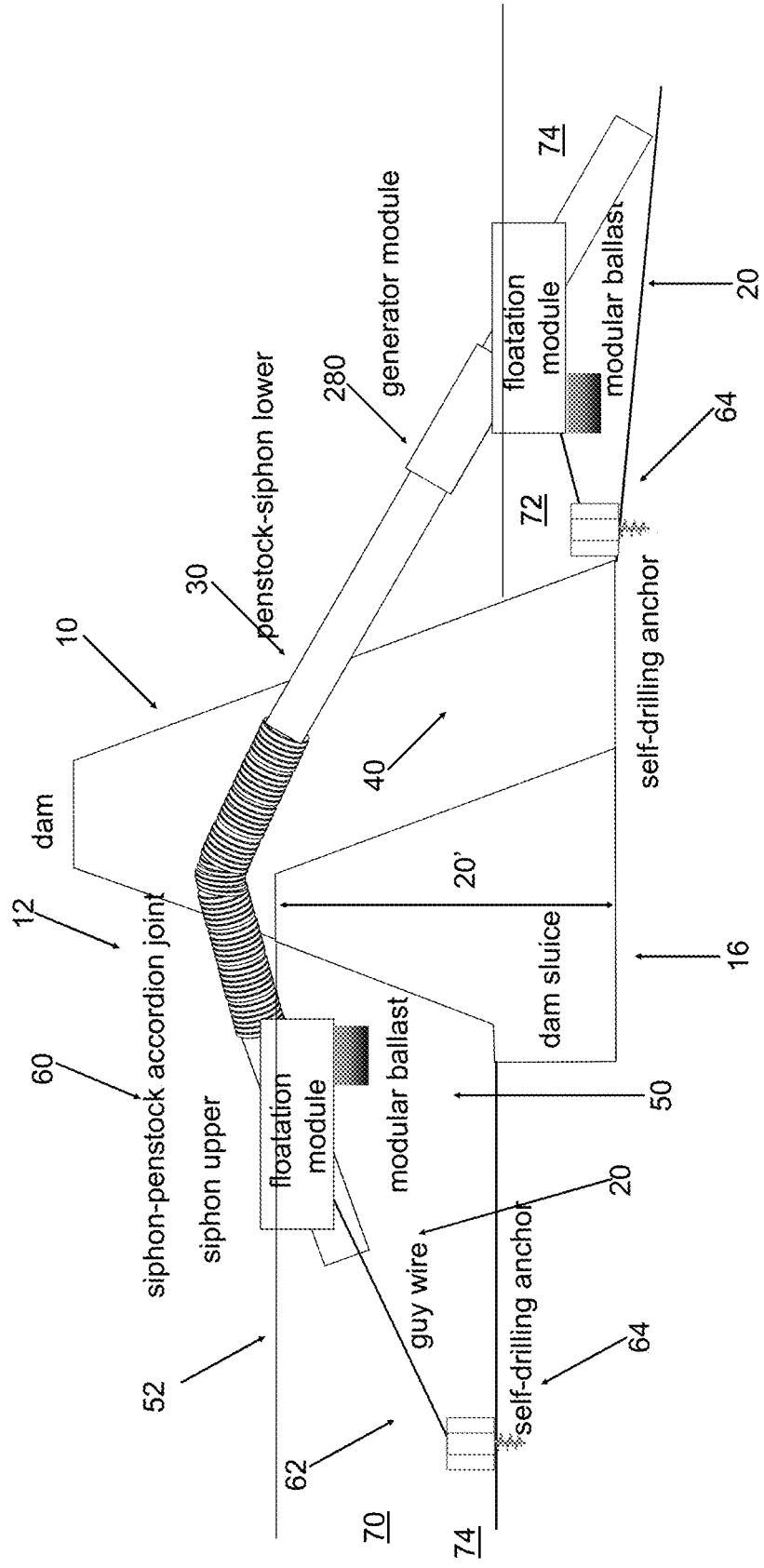
FIG. 19 is a diagrammatic view of examples of a hydrodynamic electrification system that can be modular, mass-produced, and configured with a siphon system and a hybrid water wheel deployed in cooperation with a dam sluice in accordance with the present teachings.
Figure 20:
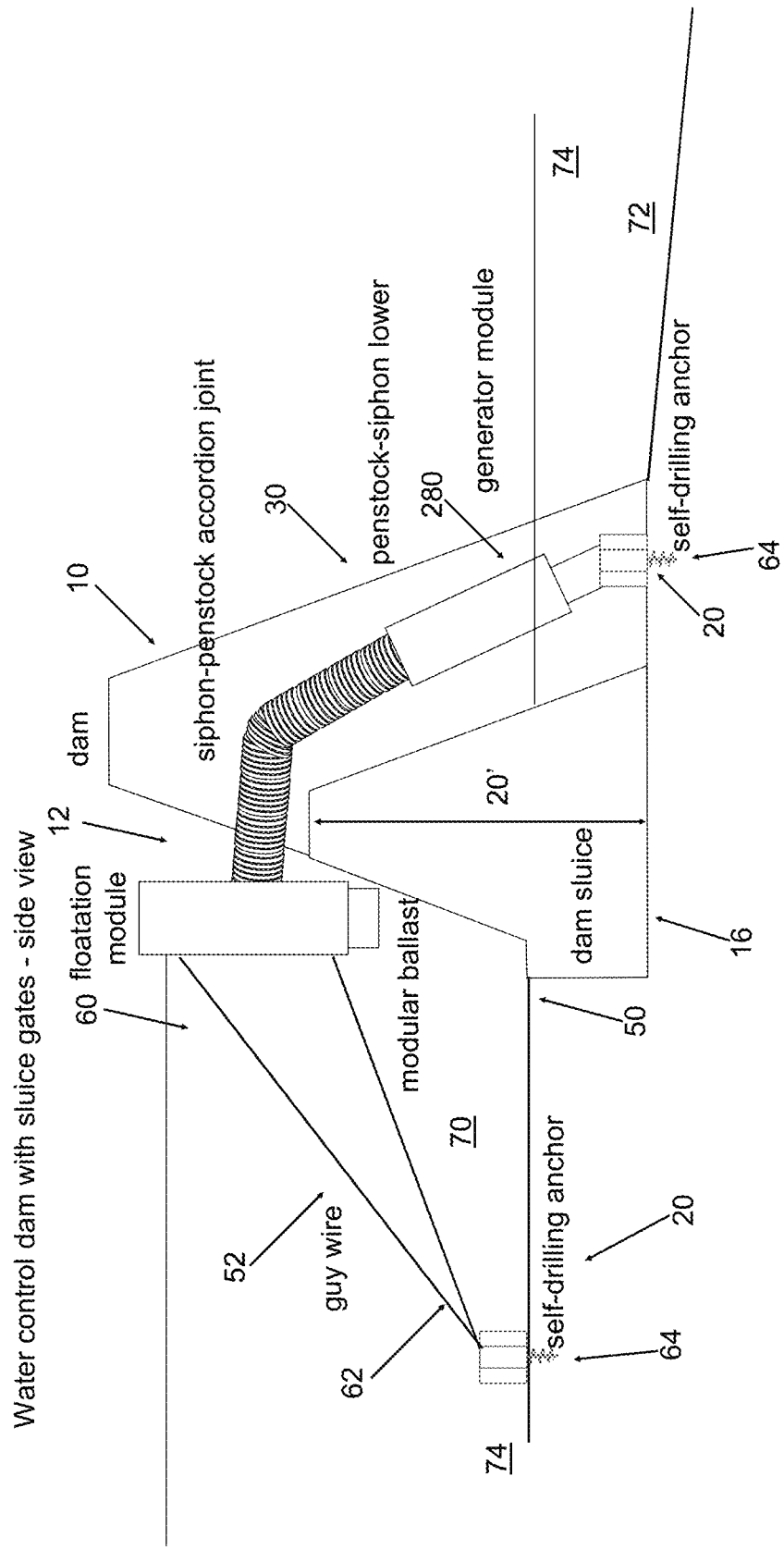
FIG. 20 is a diagrammatic view of examples of a hydrodynamic electrification system that can be modular, mass-produced, and configured with a siphon system and a hybrid water wheel deployed in cooperation with a dam sluice in accordance with the present teachings.

In many examples, the electrification system 10 can include a mounting system 20, a water transport system 30 (such as one or more of the siphon systems 12), and a power extraction system 40. These sub-systems may be comprised of a number of functional modular elements designed to accommodate a broad range dam configurations, functions, and geometries and co-exist or integrate with other hydrodynamic power installation scenarios. One such modular element can include siphon elements 42, as shown in FIG. 3. One or more of the siphon elements 42 can be deployed to extend one or more of the siphon systems 12 to accommodate varying elevations. These modular elements may be used in part or in whole depending on the dam specifics. Additionally, a modular mounting system 50 can be deployed in a dam configuration 52 to enhance or create a hydraulic head differential when deployed on one or more dams 16 or in undeveloped channels 100 (FIG. 18). The electrification system 10 can also be configured so as to also be deployable on dikes, dike systems, modular ballast systems 54 (FIG. 17), on dam sluices 56 (FIGS. 19 and 20), and many other environments with available hydraulic heads and the like.

In aspects of the present teachings, the electrification system 10 may be deployed with multiple modular systems across a channel of water or other similar size rivers, delta, tributary, or the like. In aspects of the present teachings, the electrification system 10 can be configured for electricity production at local electrical frequency requirements (i.e., 50 Hz, 60 Hz, etc.) and in doing so a specific flow rate may be achieved by at least one of shutting off modular siphons, disconnecting modular siphons, adjusting the individual siphon flow rates, or combinations thereof. The siphon system 12 of the water transport system 30 may be configured when deployed on one or more of the dams 16 to include a penstock that can be sized to minimize losses based on using the area ratio of the upstream area and the water transport area and the head differential to generate water velocity. A similar system with additional components can be used to convert near shore wave energy. The siphon system 12 of the water transport system may be configured to transport water over the dam at any available angle relative to the surface of the water and may include mounting elements on both the upstream and downstream sides or either or none of the upstream or downstream sides.

The mounting system 20 can isolate the water transport system 30 structurally from one or more of the dams 16. In certain aspects of the present teachings, the mounting system 20 can serve as a dam such as the modular ballast systems 54 in FIG. 17. In aspects of the present teachings, the mounting system 20 may be comprised of a floatation module 60, mooring elements 62, and anchor elements 64 or freestanding anchor/mounting elements 66, such as axial-flow-oriented concrete three-dimensional symmetric hydrofoils, or a combination of both anchor elements 64, 66. The mounting elements 64 can be disposed in upstream areas 70 and downstream areas 72 of water 74 around the one or more of the dams 16. The upstream areas 70 can be the high side and the downstream areas 72 can be the low side. The mounting elements 64 can serve to suspend and position the water transport system 30 over and above the one or more of the dams 16 or the like. In aspects of the present teachings, one or more mounting elements 64 may be applied directly to the dam 16 and downstream of the dam 16, as shown in FIG. 17. In aspects of the present teachings, the mounting elements 64, 66 may be deployed upstream and downstream avoiding contact with the dam 16.

With reference to FIGS. 1 and 2, the water transport system 30 may be supported upstream by one or more of the floatation modules 60 that include a mounting element 80. The mounting element 80 can be positioned above the water 74. In aspects of the present teachings, the mounting element 80 of the floatation module 60 is provided above the water in a flat orientation when in an operational condition. The mounting element may be able to move passively or actively axially or in any direction with respect to the siphon and be accompanied by guides to constrain the movement to a desired function or dimension or rate. By way of this example, the floatation module 60 can have a submerged element 82. In aspects of the present teachings, the submerged element 82 can be a series of symmetric hydrofoils oriented axially to the flow that can be shown to reduce drag and mooring costs.

In aspects of the present teachings, the mooring elements 62 of the mounting system 20 can include a standard tension system such as guy wires, a compression mooring system used in naval architecture, a tensegrity system where the stability of the structure comes from the elements being in a combination of tension and compression, and the like. In aspects of the present teachings, the mounting elements 64 of the mounting system 20 may be any standard jettylike or pierlike elements and may blend elements of anchoring and mounting or be anchored and moored. In aspects of the present teachings, the floatation module 60 of the mounting system 20 may be configured to use plastic-air, plastic-foam, foamed plastic, self-skinned foam, urethane foam, or similar forms of achieving floatation or a combination thereof. In aspects of the present teachings, jettylike or pierlike elements may be poured in place or prefabricated and installed.

In aspects of the present teachings, when pierlike elements are deployed in arrays, the elements may form a nozzle wherein the accelerated flow between the pierlike elements may be utilized for hydrokinetic power extraction. In the many examples where the pierlike elements can be deployed into a tidal environment, the nozzles may have variable geometry determined by flow direction. The pierlike elements may have passive flow driven gates 275 that may switch the asymmetric balance 276 of the nozzle with the changing direction of the flow. The methods and systems of the present teachings can, therefore, be shown to be able to avoid the need to rotate accelerator hydrokinetic extractors in tidal conditions. In many aspects, the pierlike elements may have variable geometry when deployed in porous arrays. By way of these examples, the variable geometry may allow the system to dynamically adjust head height based on upstream inflow. The pierlike elements may allow the system to maintain a stable head height related to the overpressure experienced by the porous array. Hydrokinetic extractors 279 may be mounted on a floatation bearing 277 wherein a rail bearing or the like is integrated with a controllable depth floatation device. The system may displace in response to the water line in the vertical dimension. These features may be desirable in riverine and ocean environments where there may be a need to avoid debris and the like. A controllable depth system may also be "grounded" on the river or sea bed within the boundary layer during extreme weather or conditions. In many aspects of the present teachings, skinning or overmold materials for floatation elements may include any moldable or formable waterproof plastic or composite, such as thermoplastics or resin-fiber.

Figure 5:
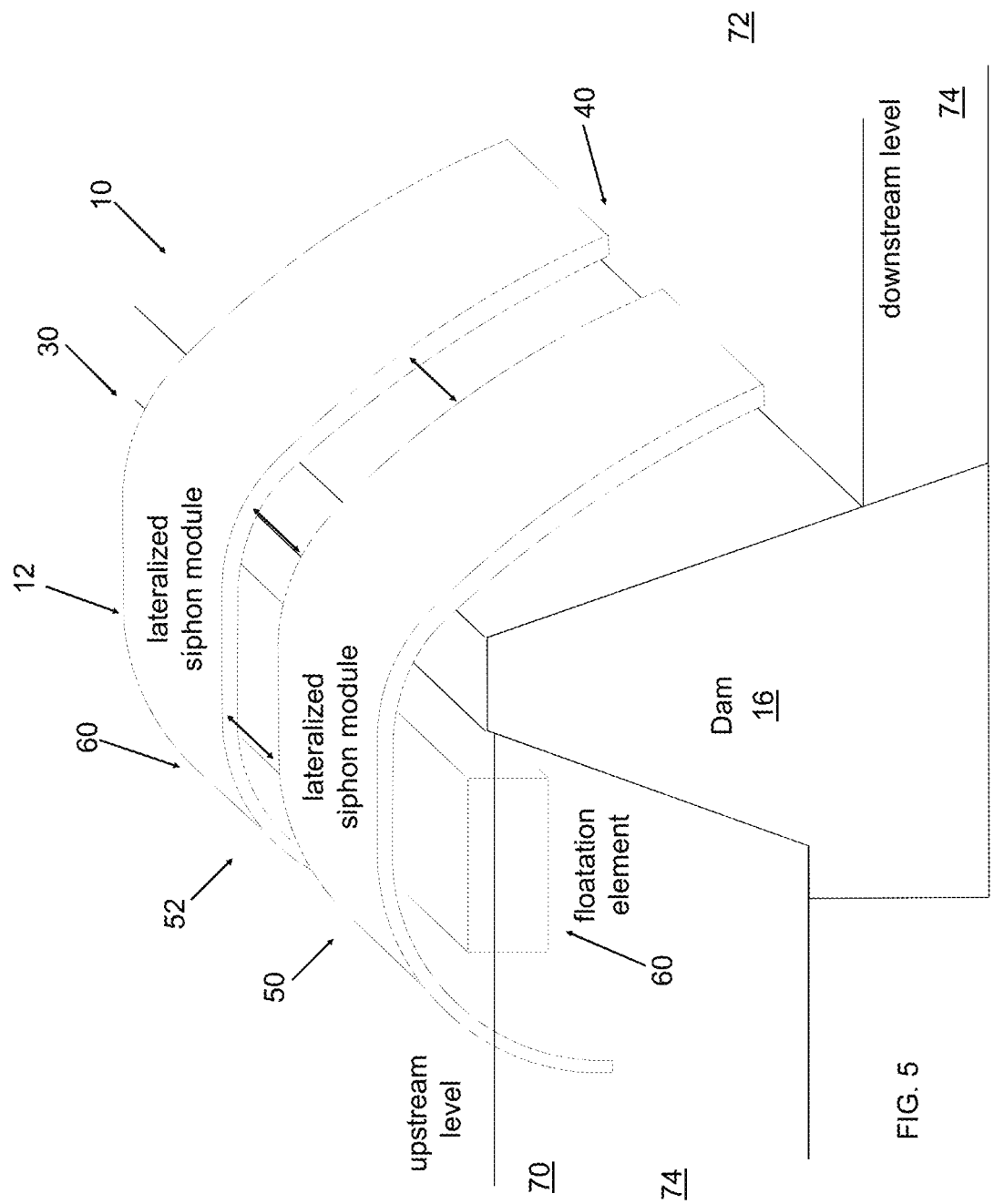
FIG. 5 is a diagrammatic view of examples of multiple hydrodynamic electrification systems in accordance with the present teachings.
Figure 6:
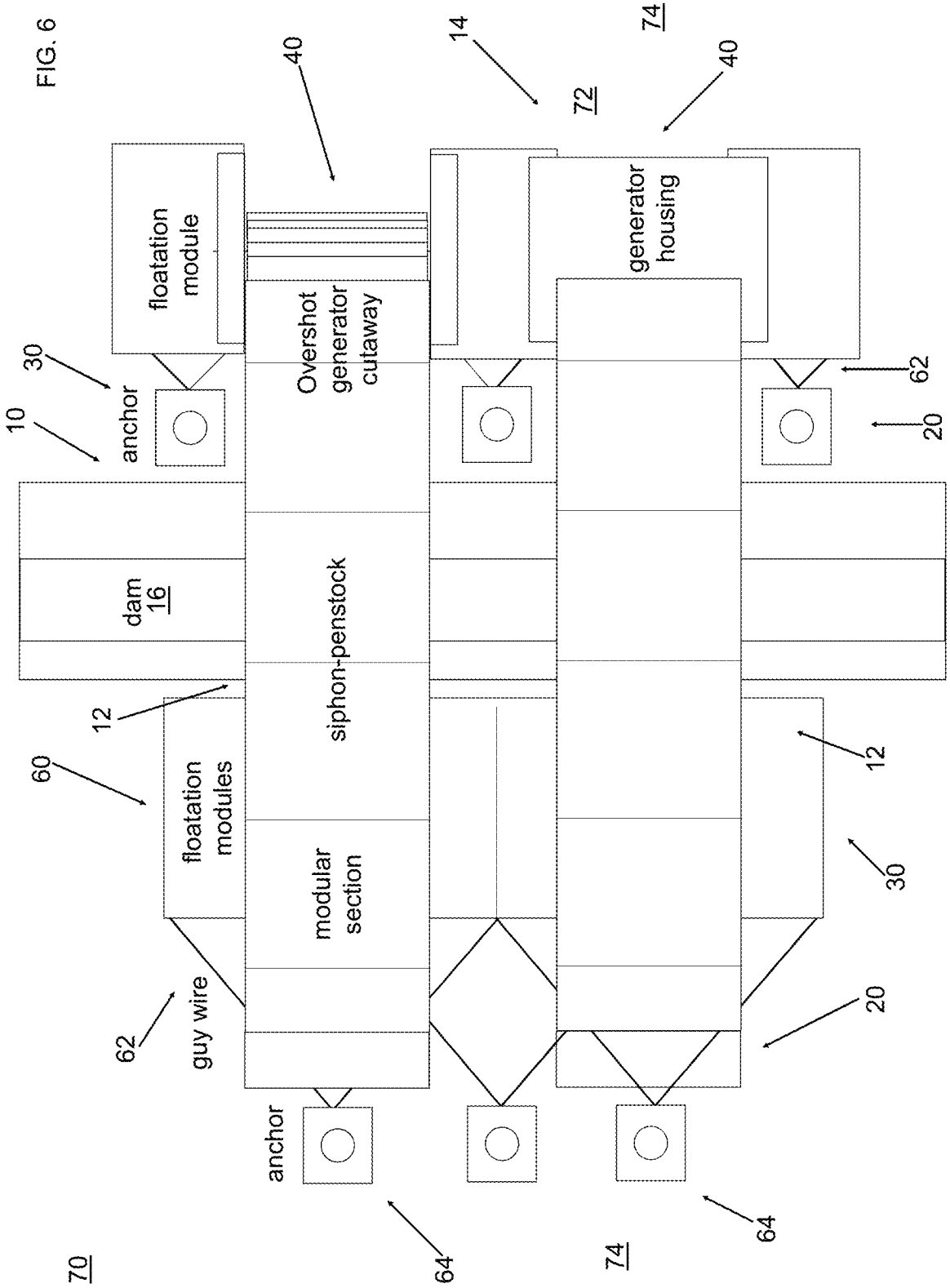
FIG. 6 is an overhead diagrammatic view of examples of multiple hydrodynamic electrification systems in accordance with the present teachings.

In aspects of the present teachings, the mounting system 20 can maintain the relative flow position of the anchor and mounting elements 64, 66 or may allow the relative position to change. When the relative positions are allowed to change, the water transport system 30 can expand or flex accordingly so that the differing distances between the intake and output (i.e., high side and low side) can be accommodated by the mounting system 20 and the variable length water transport system 30 flexing together or independently in response such as what is shown in FIG. 3. The mounting system 20 may include combinations of the above-described elements and for example can be deployed as the modular mounting system 50 and can be disposed in the dam configuration 52, as shown in FIGS. 5 and 6. The dam configuration can be contiguous or non-contiguous to limit loads on the mooring elements 62, 64, 66. With reference to FIG. 18, the dam configuration may include geometries that utilize the natural grade of the channel to minimize impoundment effects such as an inverted arch 102 and the like. By way of this example and others, the dam configuration may be porous. Porosity can include the non-contiguous arrangements in FIG. 18 or other porous or non-contiguous structures where form is allowed to permeate through or go around structures as to appear to be porous to the water flow. In one example, the dam can include many elements to restrict the flow of water through it to provide a dam like effect. In these examples, the porosity can be adjusted to provide additional head height that can be balanced with structural load capacity to an optimal cost level. It can be shown that certain dam configurations in accordance with the present teachings may be applied to existing dams to enhance the ability to control their head differential to make certain electrification scenarios even more attractive for existing dam installations.

In the many aspects of the present teachings, the water transport system 30 can include the modular siphon system 12 that can be dynamically height and length adjustable. The siphon system 12 can include the modular siphon elements 42 to accommodate various dam heights with a single modular siphon system 12. The siphon system can be made of various rubber materials or other stretchable material. Control of the siphon flow rate can be achieved by at least one of a valve, shutting off siphon elements, turning on siphon elements, or combinations thereof as necessary to adjust to the upper reservoir inflow rate. Using an adjustable flow rate siphon to transport the water 74 over the dam 16 avoids any effect on the upper and lower impoundment areas or dam throughput. In aspects of the present teachings, the valves used may be a ball valve or a sliding valve or a nozzle valve or the like. In aspects of the present teachings, the valve may be placed at the intake or at the exit or at an optimal position, balancing structural load and flow control, along the siphon system 12, or a combination thereof. In many aspects, these systems may be used to adjust and maintain the frequency of electrical output from the power extractions systems.

In aspects of the present teachings, the siphon system 12 may be made of any material that optimizes cost. This may include thermoformed plastics or composites pultruded or molded or a combination thereof. In aspects of the present teachings, the siphon system 12 may be comprised of contiguous or noncontiguous elements. In aspects of the present teachings, the intake section of the siphon system 12 may be disposed to minimize the load applied to the system. In aspects of the present teachings, the submerged portion of the siphon system 12 may be comprised of separated hydrofoil to tube geometry elements 110 (FIG. 15) positioned axially to the flow to minimize the dynamic load on the mooring, mounting, and siphon elements, as shown in FIGS. 15, 16, and 25. In aspects of the present teachings, the modular sections may be of uniform shape and dimension or non-uniform shape and dimension. In aspects of the present teachings, the siphon may be lateralized, e.g., a wider than taller cross-section, to minimize per unit length water static loads, as shown in FIG. 5.

In aspects of the present teachings, the modular siphon may include specialized sections such as a valve section or height differential adjustment section or a nozzle section. In aspects of the present teachings, the siphon system 12 may include a mechanism to allow passive adjustment of the total length of the siphon to accommodate head height changes based on seasonal flow rates. In aspects of the present teachings, this height adjustment mechanism may be achieved by a sleeve section or a variable length section such as an accordion folding or rubber section. In aspects of the present teachings, the sleeve section may be integrated on the siphon system 12 or attached to the extraction system. In aspects of the present teachings, there may be multiple adjustment sections or multiple types.

Figure 24A:
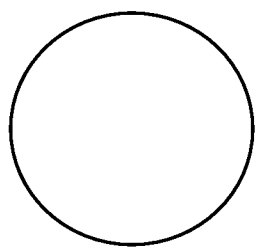
FIG. 24A is an exemplary siphon system having a honeycomb geometry.
Figure 24B:
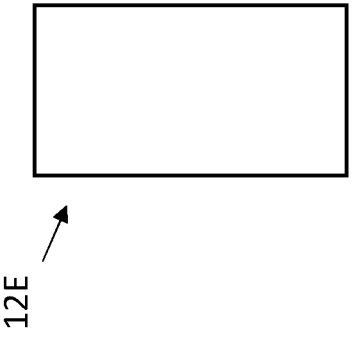
FIG. 24B is an exemplary siphon system having a round geometry.
Figure 24C:
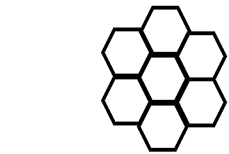
FIG. 24C is an exemplary siphon system having an oval geometry.
Figure 24D:
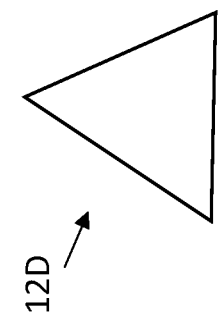
FIG. 24D is an exemplary siphon system having a triangular geometry.
Figure 24E:
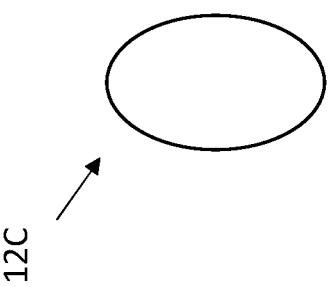
FIG. 24E is an exemplary siphon system having a rectangular geometry.
Figure 27:
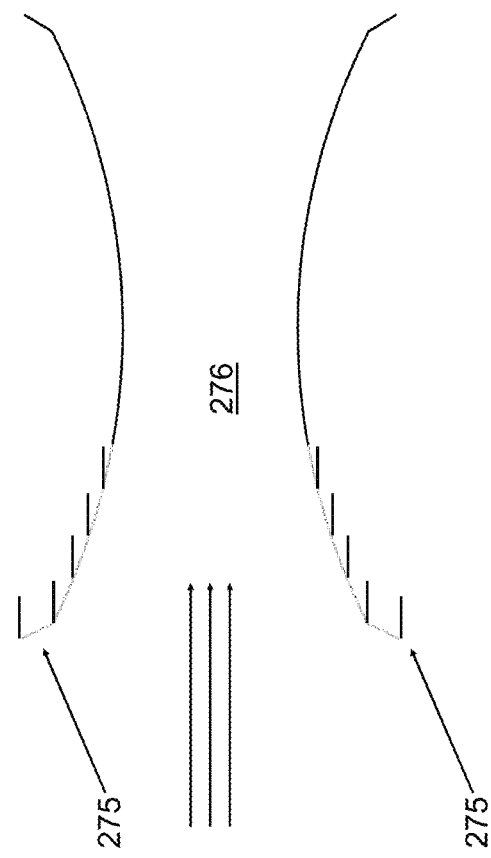
FIG. 27 is a diagrammatic view of examples of a tidal nozzle of a hydrodynamic electrification system in accordance with the present teachings.
Figure 28:
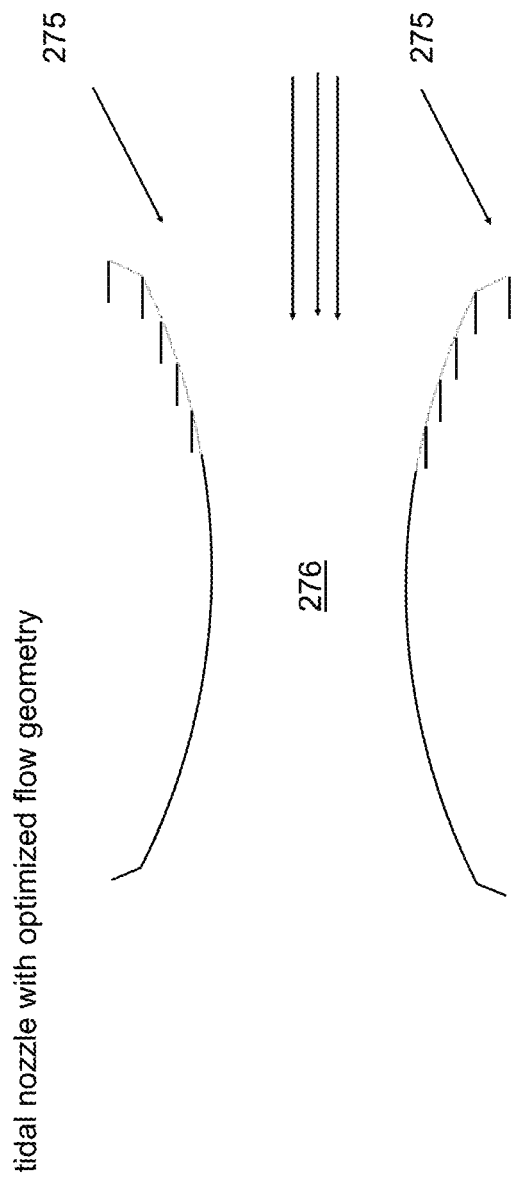
FIG. 28 is a diagrammatic view of examples of a tidal nozzle of a hydrodynamic electrification system in accordance with the present teachings.
Figure 29:
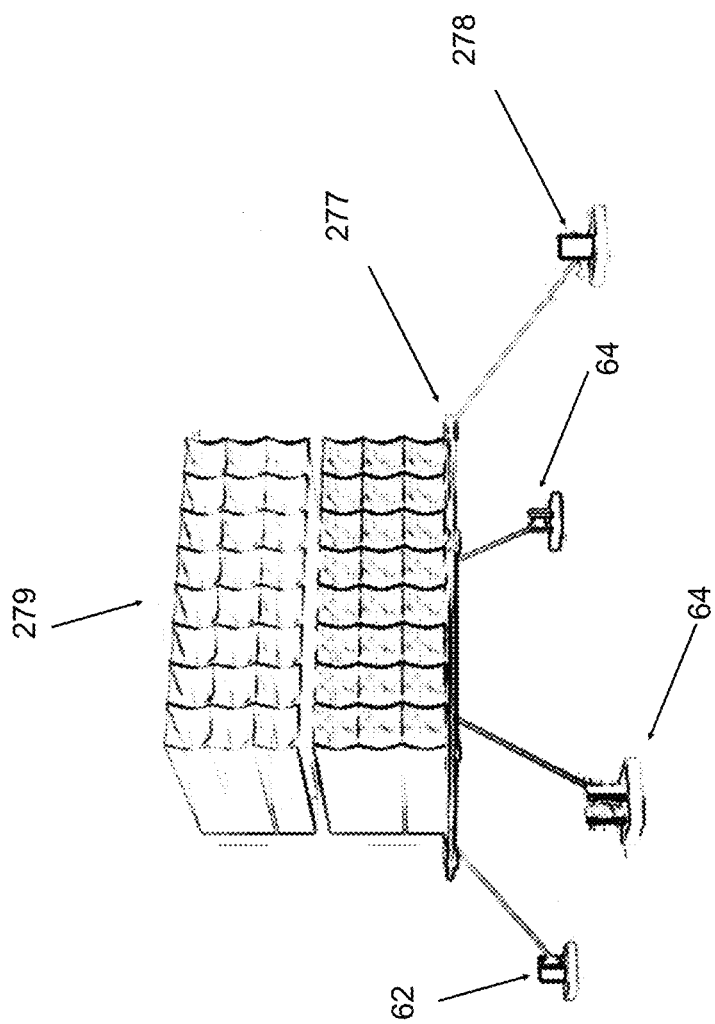
FIG. 29 is a perspective view of examples of a buoyant array of a hydrodynamic electrification system in accordance with the present teachings.

In aspects of the present teachings, the exit of the siphon system 12 may be disposed to increase or reduce the jet velocity into a turbine 120. In aspects of the present teachings, the siphon system 12 may include an accelerator section 280. In aspects of the present teachings, the siphon systems 12 can be comprised of a single geometry or multiple connected geometries, such as honeycomb, 12A (FIG. 24A), round 12B (FIG. 24B), oval 12C (FIG. 24C) triangular 12D (FIG. 24D), rectangular 12E (FIG. 24E), or the like or combinations thereof. In aspects of the present teachings, the siphon system 12 may be comprised of a honeycomb structure or similar packing geometries. The siphon system 12 may be a tightly packed geometry above the water 74 that can be deployed to allow the release to a loosely packed geometry in the water to alleviate dynamic loads on the siphon. In many examples, the siphon system 12 may include an automatic starting mechanism such a compressor, water pump, or the like.

With reference to FIGS. 25-28, a siphon intake 130 of the siphon system 12 may be of a geometry to prevent or alleviate clogging. The intake 130 may be of single layer or multiple porous-solid layers, such as screens 132 and the like, disposed to prevent fish entrainment and clogging by debris. The intake 130 may be at the ends of the siphon or spread across the vertical area of the siphon. The intake may be oriented orthogonally to the flow or may be on the downstream section or a combination thereof. Modular sections of the siphon may be manufactured of any moldable or formable plastic, rubber, or composite, such as thermoplastics or resin-fiber.

In aspects of the present teachings, the power extraction system 40 may be in line with the water transport system 30 and fully wetted or may be a water to air system either inline or after the jet exit of the siphon system 12. The power extraction system 40 may be of fixed size and comprised of a modular system that can accommodate various flow rates or may be configured and deployed with multiple sections that are paired to specific flow rate siphons. In aspects of the present teachings, the power extraction system 40 may be an overshot waterwheel, a breastshot waterwheel, an undershot waterwheel, a crossflow turbine, a helical turbine, a Pelton wheel, or any reaction type or impulse type extractor or hybrid or combination thereof. In aspects of the present teachings, the power extraction system 40 may be in line with the water transport system 30 and may be full wetted or be a two phase water to air system. The water transport system 30 may incorporate an accelerator section wherein an extractor optimized for confined flow, such as a spiral rotor or jet turbine section or anhedrally tilted rotor and the like, may be placed. In aspects of the present teachings, anhedrally tilted rotors can be shown to reduce the tip vortex diffusion angle. In aspects of the present teachings, spiral rotors can be shown to reduce planar rpm induced blockage (akin to converging nozzle blockage) by 20-30%. In aspects of the present teachings, the power extraction system may be a hybrid pelton-water wheel. The optimal jet velocity for the water to air extraction system may be between 1.25 and 2 times the rotational speed of the water wheel or other energy extraction device. Number and shape of blades may vary between deployed systems with each modular type optimized for a specific extraction device size and a range of values of cubic feet per second. The mechanical to electric conversion facility, such as a generator, may be modular including axial or planetary types and may allow a single modular generator and turbine system type to accommodate a wide range of head and flow conditions.

Figure 8:
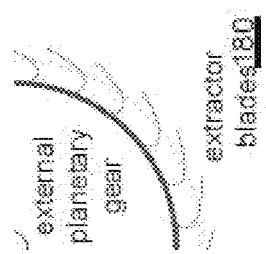
FIG. 8 is a partial diagrammatic view of examples of the power extraction system of FIG. 7.
Figure 14:
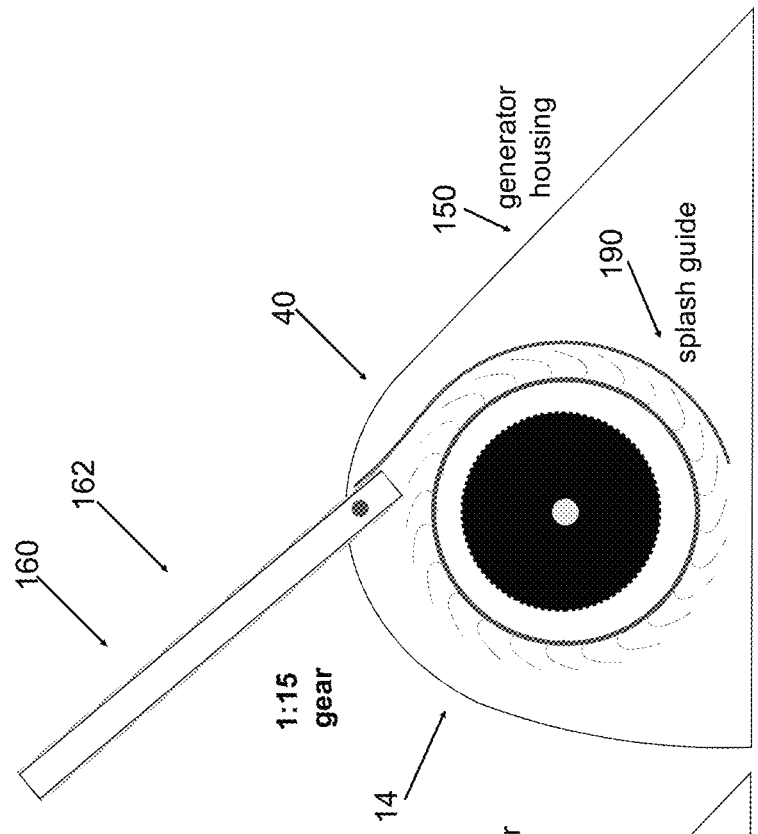
FIG. 14 is a diagrammatic view of examples of a hydrodynamic electrification system including a power extraction system configured with a gear arrangement in accordance with the present teachings.
Figure 13:
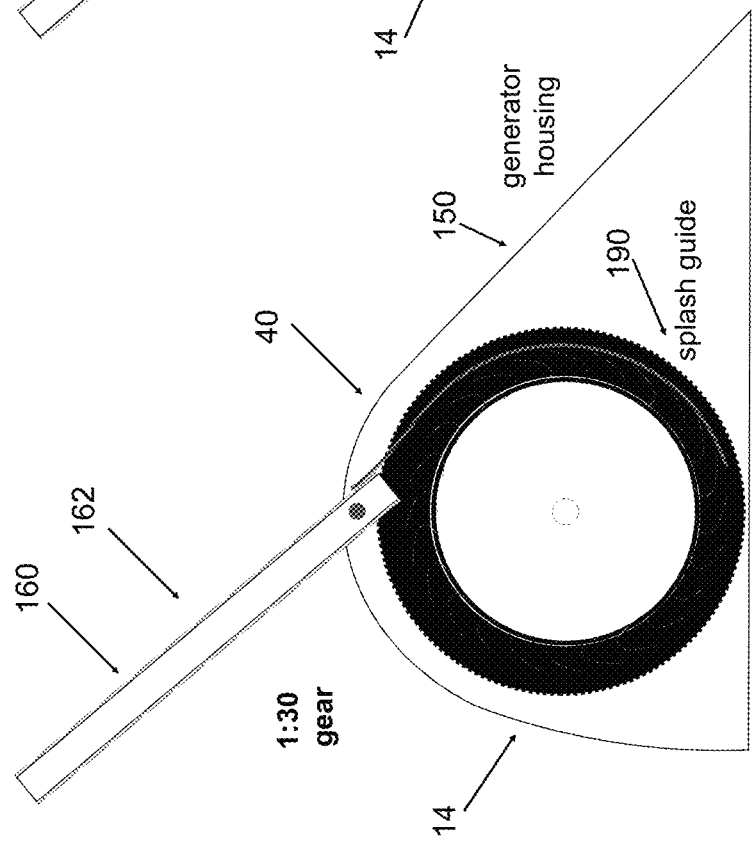
FIG. 13 is a diagrammatic view of examples of a hydrodynamic electrification system including a power extraction system configured with a gear arrangement in accordance with the present teachings.

In aspects of the present teachings, the power extraction system 40 may be deployed in a generator housing 150. The generator housing 150 may be equipped with a height-length adjustment mechanism 160 such as a sleeve 162 or the like. With reference to FIGS. 10-14, the power extraction system 40 in the generator housing 150 may be geared on an external circumference similar to a large scale planetary gear system 170 or to a gearbox or the like. The external gear can be larger or smaller than the diameter of the device to achieve specific ranges of rotational velocity. The external gear may have a singular ratio or may be variable such as CVT or geared transmission. The rotational velocity of the power extraction system 40 may be controlled by actively or passively adjusting blades 180 (FIG. 8) or by managing the load applied to the device either through adjusting the number of planetary generators under load or partitioning the load and applying partial load to the device to results in control of the flow rate through the power extraction system 40. The power extraction system 40 may have mechanisms to ensure maximum entrainment of impulse and water in the blades to maximize power output. This may include a shield or collar contiguous or non-contiguous across the water carrying portion of the energy extractor that can be shown to prevent water loss due to splash from the jet impulse. One such example is a splash guide 190 as shown in FIGS. 13 and 14.

Figure 7:
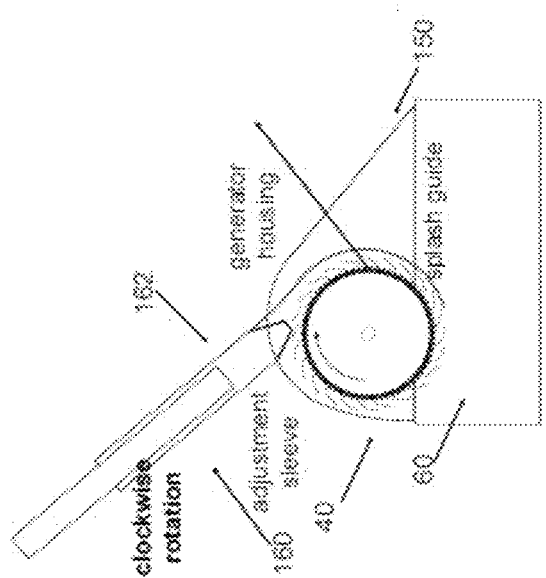
FIG. 7 is a diagrammatic view of examples of a hydrodynamic electrification system including a power extraction system having a clockwise rotation in accordance with the present teachings.
Figure 9:
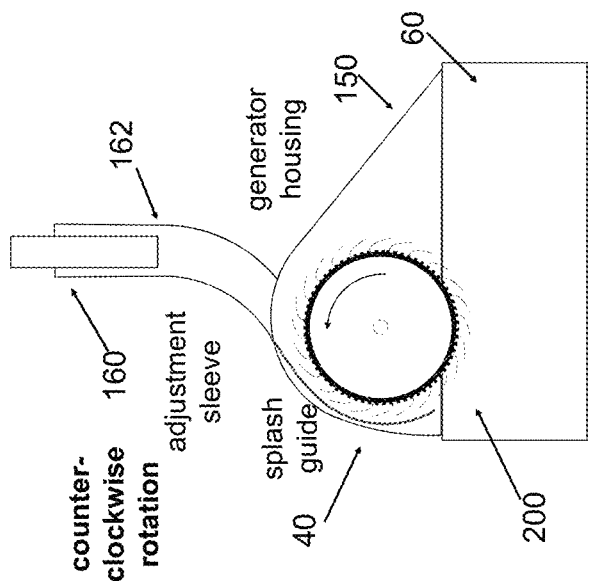
FIG. 9 is a diagrammatic view of examples of a hydrodynamic electrification system including a power extraction system having a counter-clockwise rotation in accordance with the present teachings.

In aspects of the present teachings, the power extraction system 40 may be a wheel configuration wherein the jet is angled in the flow direction and the rotation is clockwise with respect to the flow, as shown in FIG. 7. In many examples, the power extraction system 40 may be a wheel configuration wherein the jet is angled so as to invert (or partially reverse) the flow direction and the rotation is counterclockwise with respect to the overall flow direction of the water, as shown in FIG. 9. In cases where the lower portion of the wheel is in a submerged condition 200 (FIG. 9), counterclockwise rotation may optimize extraction of the head potential in dams where there is remaining flow through the dam plane or other structures including purposeful porosity in the structures and this not transported by the siphons.

The downstream mounting mechanisms may be disposed to vary the entrance to a device area ratio to accelerate the flow to increase the rotational speed of the blades of the energy extractor where the jet is angled in the flow direction and the rotation is clockwise with respect to the flow, as shown in FIG. 7. The siphon exit or adjustment sleeve may be disposed in a geometric configuration to maximize flow extraction of the dam flow rate (cubic feet per second). In the case of a partially submerged turbine the floatation hydrofoils may be configured to match the siphon exit velocity with the velocity induced between the hydrofoils based intake to throat ratios and hydrofoil geometry thereby optimizing output. The energy extractor may be made from mass-produced metals or plastics or composites or a combination thereof. The shape of the blades 180 and number may be optimized to a bucket fill rate that optimizes the potential and impulse energy into the power extraction system 40. Modular sections of the power extraction system 40 may be manufactured of any moldable or formable metal, plastic, rubber, or composites, such as thermoplastics or resin-fiber.

In aspects of the present teachings, the siphon system 12 of the water transport system 30 can be used for emergency relief in dam critical overflow situations such as those seen in Oroville, CA (USA) The water transport system 30 can be deployed with multiple modular siphon systems 12 that can be deployed over walkways, walls, suitable local man-made and natural locations, and the like with the downstream areas 72 of the siphon system 12 located at a desired height to induce sufficient flow to remove extra water. The power extraction systems 40 can be deployed in this example and can also be omitted when redirection of water is only desired. The upstream areas 70 of the siphon system 12 can be secured by the mounting system 20 without the need to secure to any portion of the failing dam like seen in the Oroville, CA situation. It will be appreciated in light of the disclosure that issues concerning water resources shift both geographically and temporally and many of the dams in place are not designed for potential "200 year" flows or the like that may start happening far more often due to climate change realities. To that end, changes in weather patterns such as more monsoon-like activity will intensify the need for local mitigation of overflow conditions especially in dams that are not designed for such weather patterns.

Figure 30:
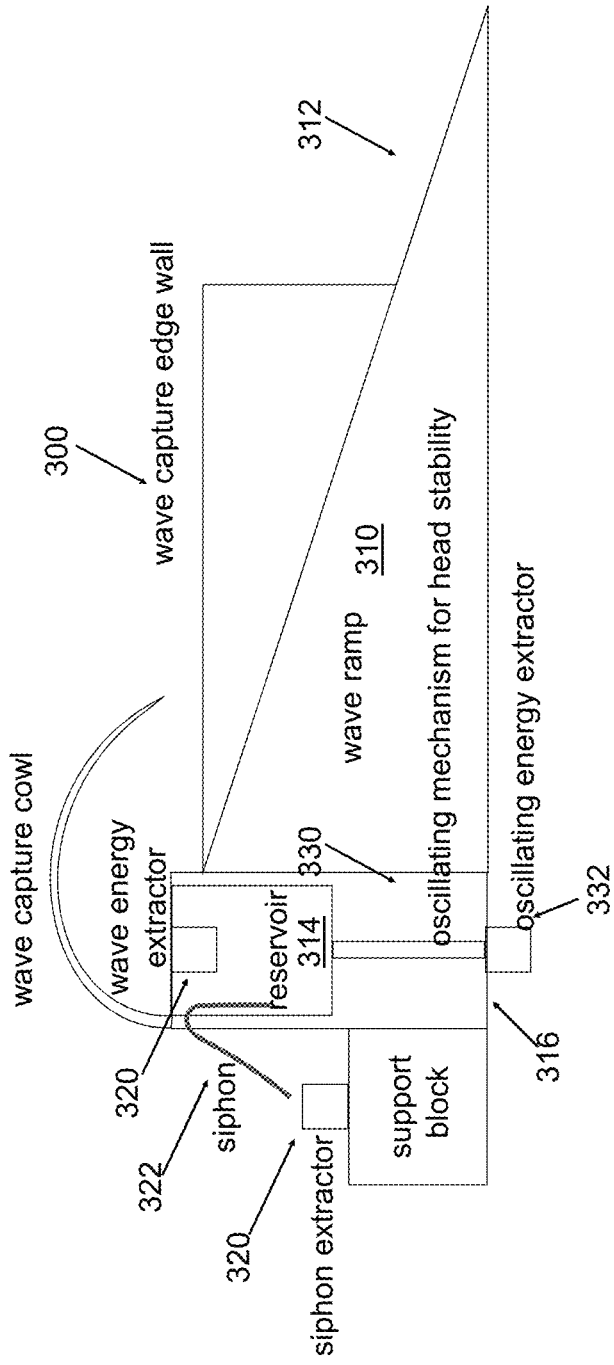
FIG. 30 is a diagrammatic view of examples of a caisson tidal system of a hydrodynamic electrification system in accordance with the present teachings.
Figure 31:
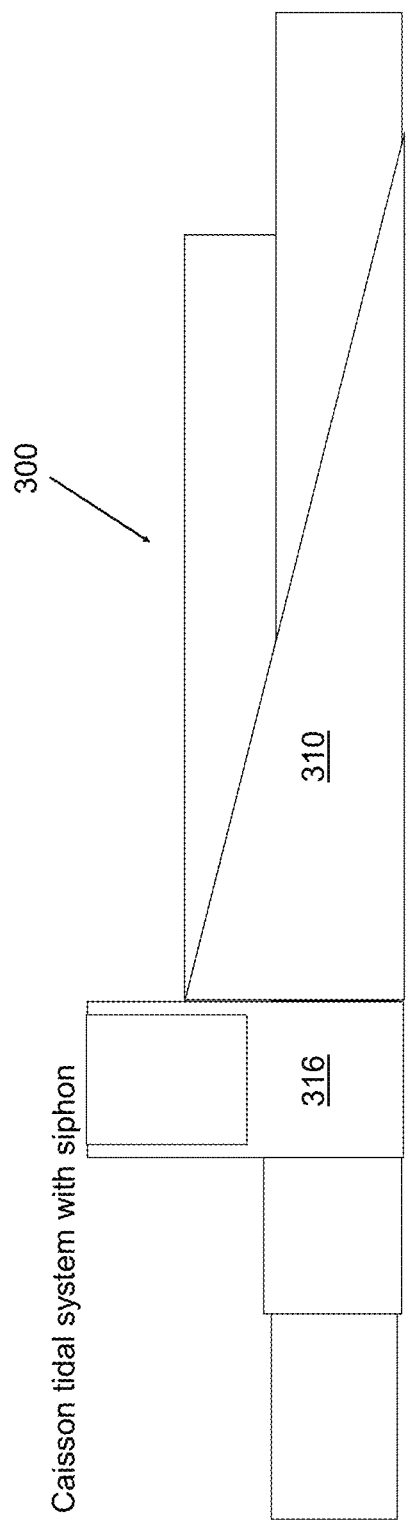
FIG. 31 is a diagrammatic view of examples of a caisson tidal system with a siphon of a hydrodynamic electrification system in accordance with the present teachings.
Figure 32:
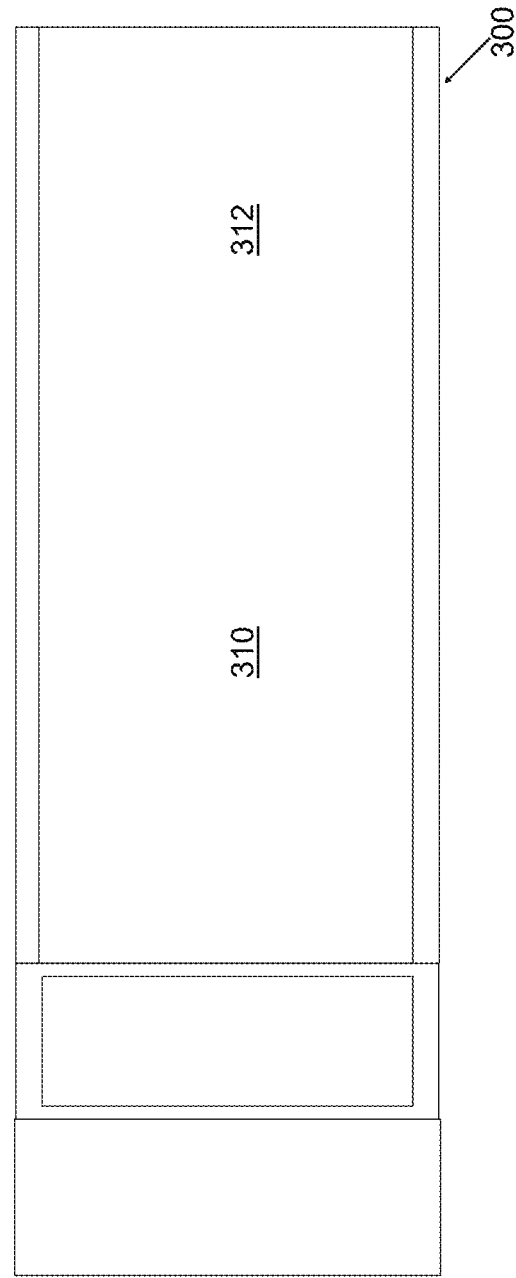
FIG. 32 is an overhead diagrammatic view of examples of a caisson tidal system with a siphon of a hydrodynamic electrification system in accordance with the present teachings.
Figure 33:
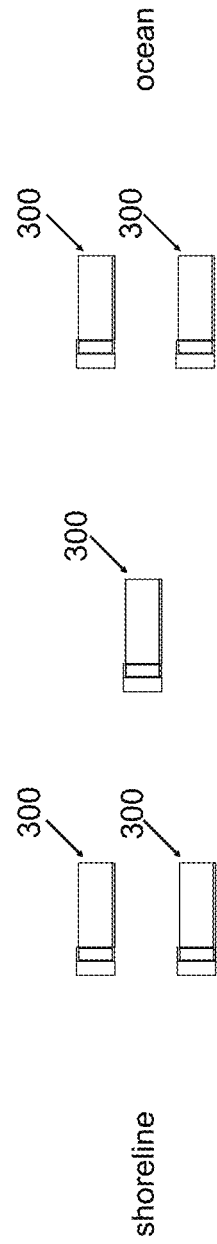
FIG. 33 is an overhead diagrammatic view of examples of a plurality of caisson tidal systems of a hydrodynamic electrification system deployed close to a shoreline in accordance with the present teachings.
Figure 34:
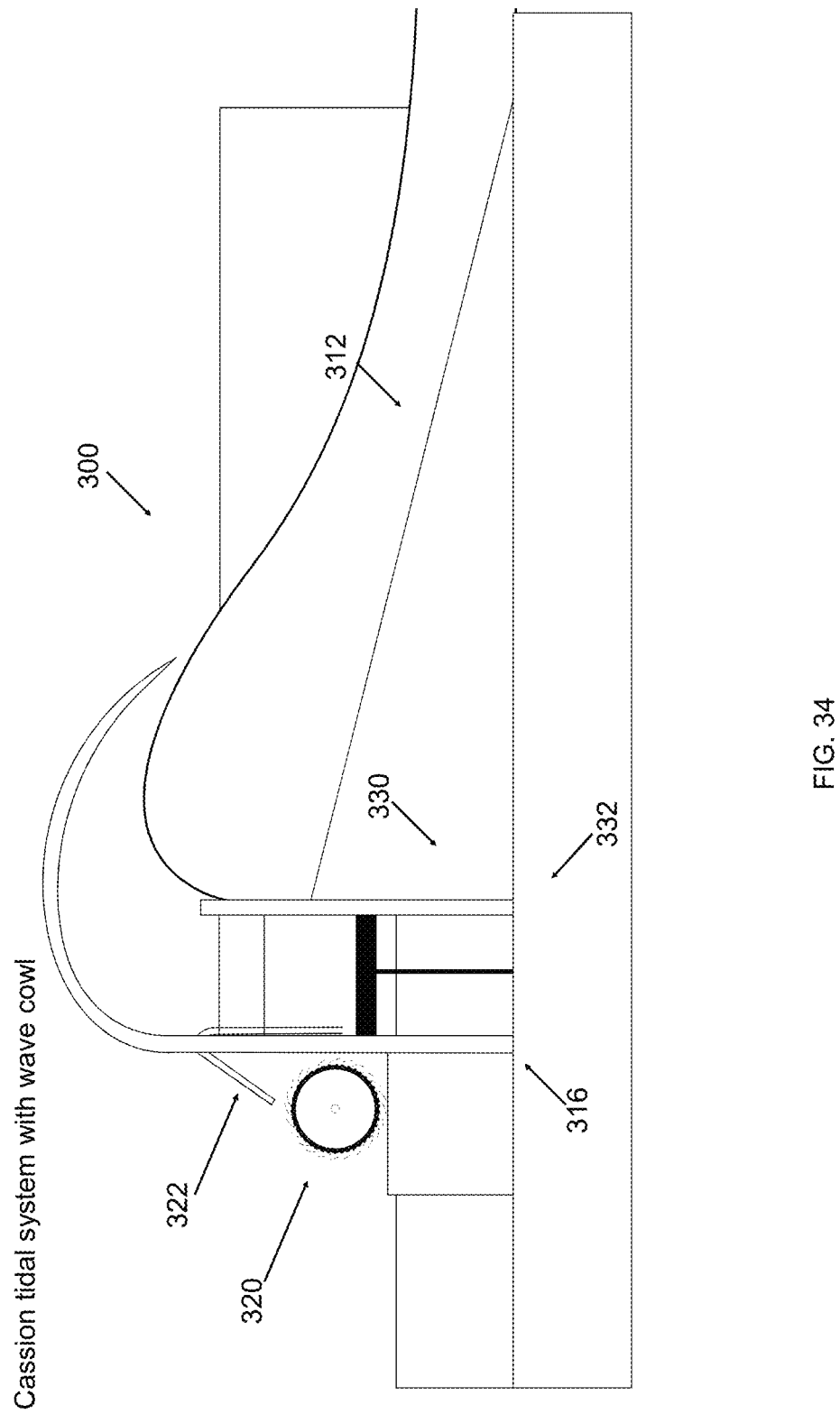
FIG. 34 is a diagrammatic view of examples of a caisson tidal system with a wave cowl of a hydrodynamic electrification system in accordance with the present teachings.
Figure 35:
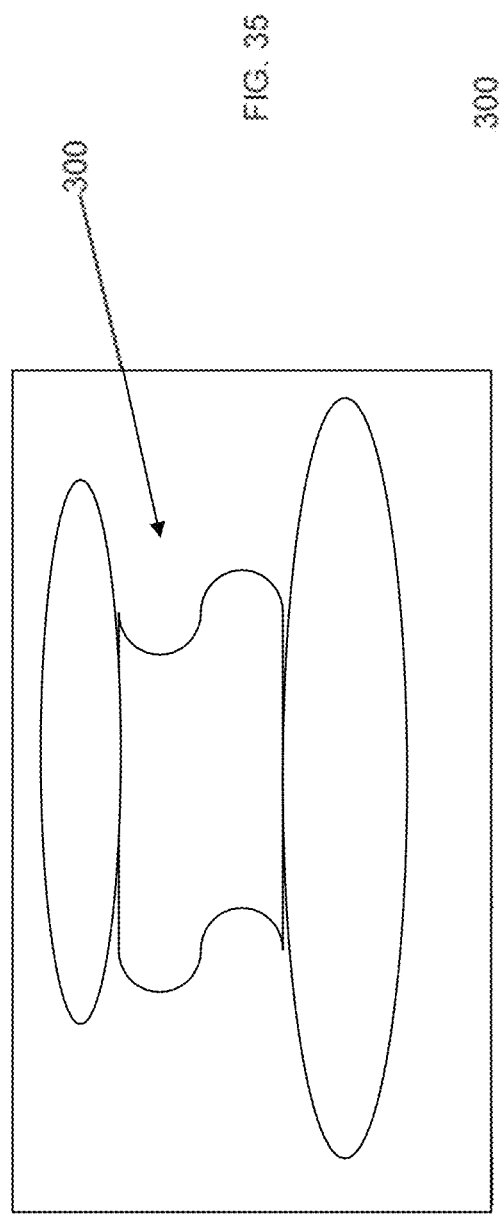
FIG. 35 is a partial perspective view of a caisson tidal system barely observable from the shoreline in accordance with the present teachings.
Figure 36:
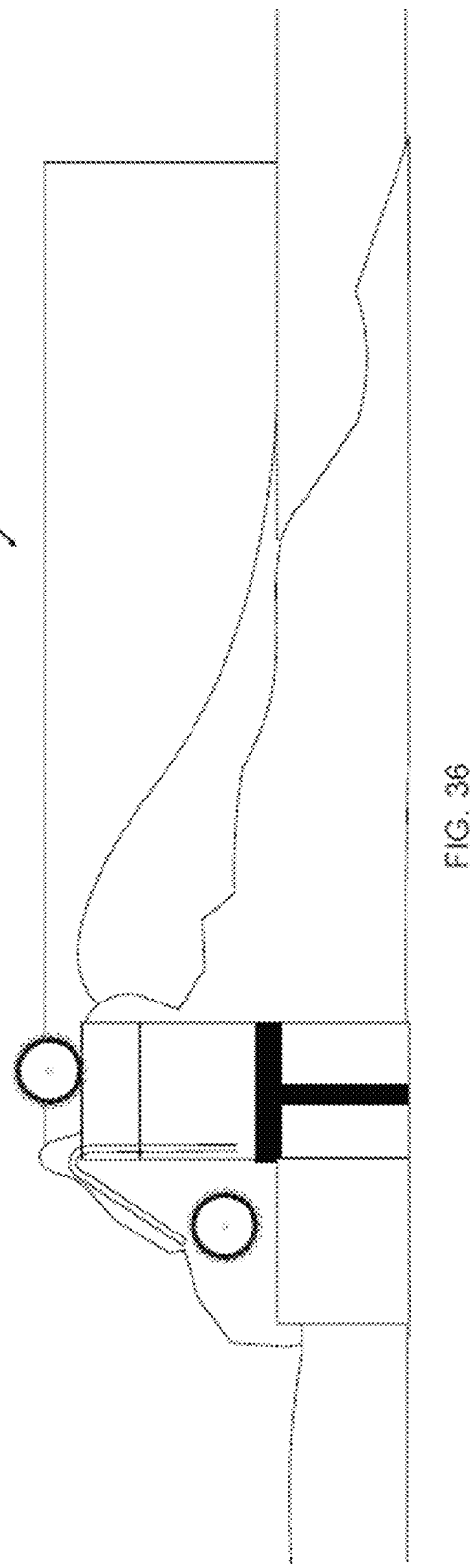
FIG. 36 is a diagrammatic view of examples of a caisson tidal system with a balanced spring system to maintain a head of a hydrodynamic electrification system in accordance with the present teachings.
Figure 41:
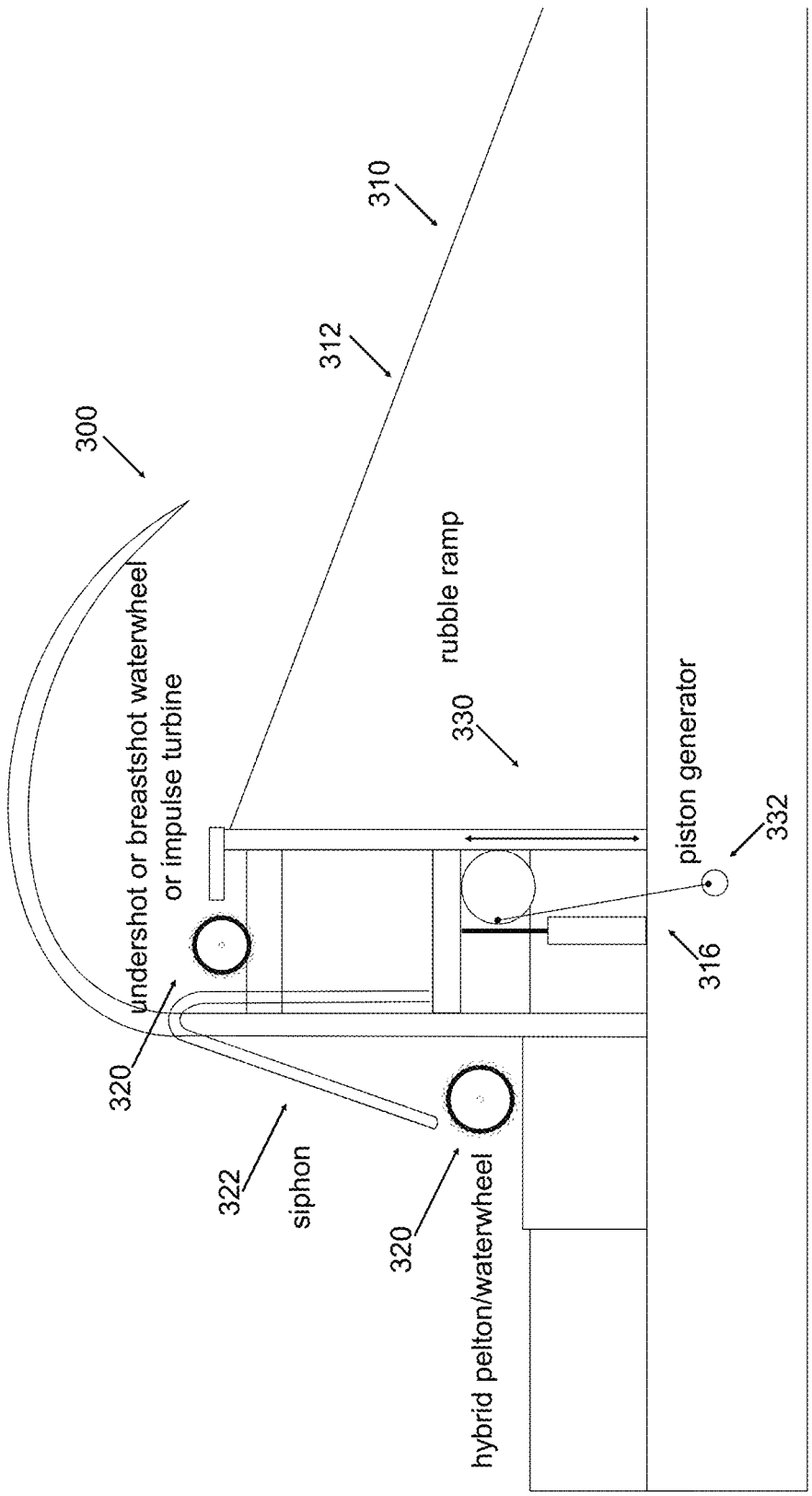
FIG. 41 is a diagrammatic view of examples of a caisson tidal system of a hydrodynamic electrification system with a wave cowl and secondary and tertiary wave extraction systems in accordance with the present teachings.
Figure 42:
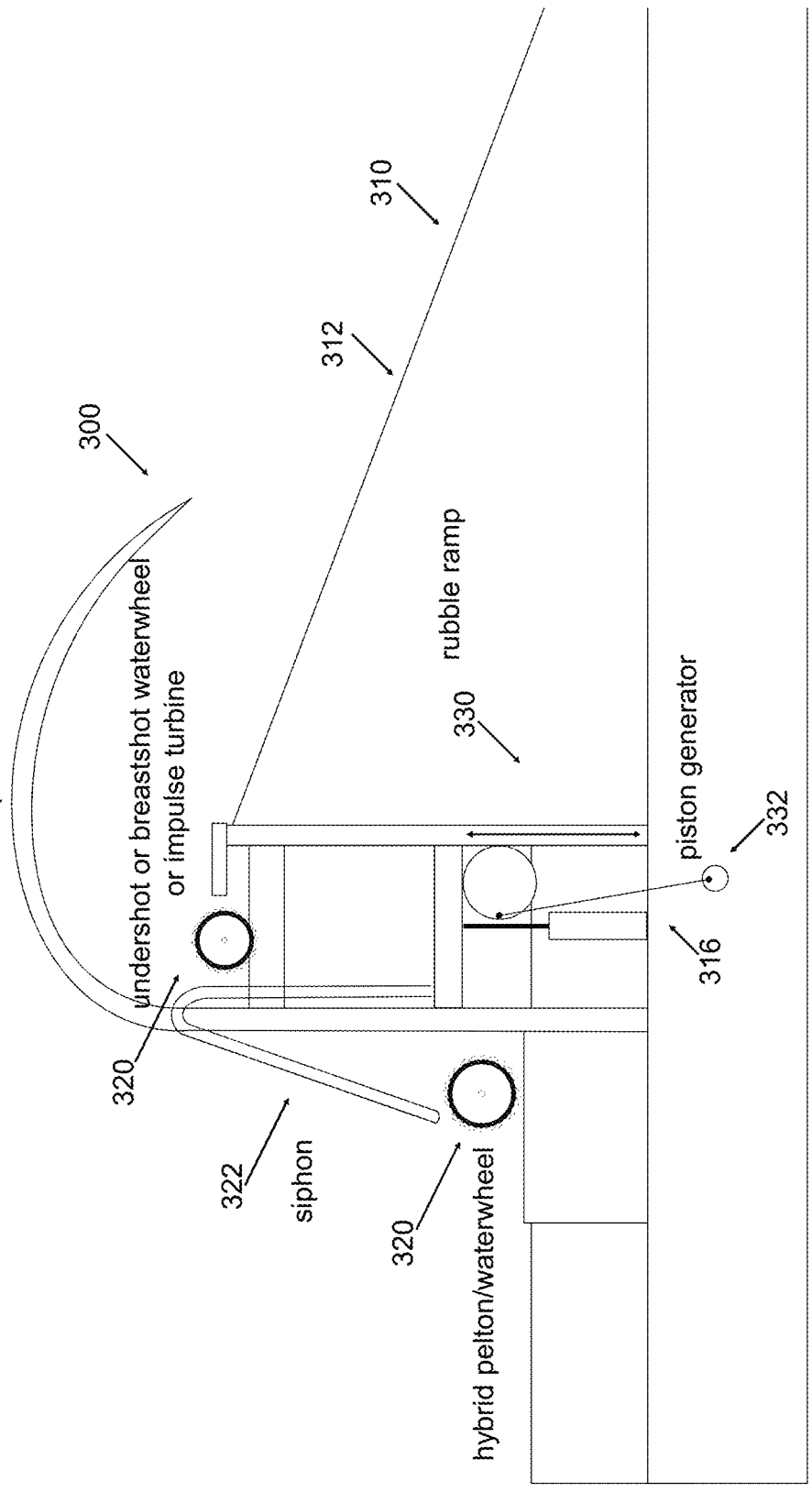
FIG. 42 is a diagrammatic view of examples of a caisson tidal system of a hydrodynamic electrification system with a wave cowl, secondary and tertiary wave extraction systems, and a spring assist system in accordance with the present teachings.

In aspects of the present teachings, FIG. 30 details a near shore wave energy extraction system 300 that can extract wave energy. The near shore wave energy extraction system 300 can include a wave ramp 310 that can include a wave facing grade 312. The wave facing grade 312 can be prefabricated or can be a poured in place caisson structure and can define a system reservoir 314. It will be appreciated in light of the disclosure that a ramp angle and length on the wave facing grade 312 can be optimized to maximize water delivery to the system reservoir 314 in a caisson structure 316 adjacent the wave ramp 310.

In aspects of the present teachings, power may be extracted at multiple points in the water conveyance portions and system reservoirs 314 by multiple mechanisms to maximize the coefficient of power of the wave energy extraction system 300. This may include one or more waterwheel or impulse type extractors 320 at or near the water inflow point in the system reservoir 314 or at an output of a siphon system 322, or both. The shore wave energy extraction system 300 can also include a balance spring 330 or the like located in the system reservoir 314 as part of a piston type extractor 332 or the like. The balance spring 330 can include a top balance that can maintain a maximum head height. In maintaining a maximum head height, sufficient water can be maintained in the system reservoir 314 between each wave so as to deliver water and thus wave energy to a power extractor at an output of the siphon system 322 and to power a piston generator acted upon in the system reservoir 314. The caisson/reservoir element provides a height differential related to local wave and ramp height on which the siphon system 322 as described above may be applied. The caisson/reservoir element may be prefabricated from a type of concrete or composite and dropped or floated into position or may be poured in situ with a prefabricated removable mold or molds and the like. The ramp structure may be prefabricated of a contiguous material or may be formed of a loose material such as sand or rubble and the like. The utilization of multiple mechanisms of extraction may result in a high coefficient of power for near shore wave system.

In aspects of the present teachings, one or more water-to-air type turbines that receive a flow of water via the modular conveyance that may be a siphon or conveyance system may be disposed to receive the water delivery at any tangent or penetrative angle, such as along the internal or external diameter of one or more blade rows of the turbine. The turbine may intercept the flow with a horizontal or vertical disposition, or at any angle between. The water source for the siphon may be a dam, a weir, a reservoir, an aquifer, or any body of what with a sufficient hydraulic head, and the like. In the case of an aquifer, the source may be natural, such as an elevated spring or water hole, or drilled into an elevated formation to create upwelling based on the subsurface pressure available in the aquifer. In cases where the head height between the natural elevation and the turbine exceeds 30 meters, the siphon may be staged by settling pools or aerating the conveyance or any method that breaks the continuity of the water column in the siphon. The water delivery may be inline or orthogonal to the turbine or may be positioned at any point in a spherical volume defined by or expanded from the plane of the turbine.

In aspects of the present teachings, the nozzle at the output end of the water delivery siphon may be any variation of a fixed rate axial constricting nozzle, a variable rate axial constricting nozzle, a uniform circular or square axial constricting nozzle, a non-uniform axial constricting nozzle inclusive of polygonal and ellipsoid structures, or a non-axial nozzle disposed to jet the water at any angle relative to the axial direction of the siphon conveyance. This may include but is not limited to multiple angle nozzles to dispose the water along some rotational circumference that may be circular or any stadium or linear configuration as in, but not limited to, a single or multi-nozzle Turgo-type turbine arrangement. This may include but is not limited to the use of multiple or single nozzles to drive multiple co-mounted Turgo or Pelton or impulse or reaction rotors, and the like.

Referring to FIGS. 48, 49, 50, and 51, this may include but is not limited to use of pressure-driven slit nozzles 202. In embodiments, slit nozzles 203 may be attached to a turbine, allowing thrust from one or more counter-positioned slits 203 to create rotational motion, such as to drive a generator, a rotating shaft, a gear set, a screw drive mechanism, or the like. In the case where a slit nozzle 203 is enabled to rotate, the rotation itself may constitute the only energy conversion mechanism, or, in embodiments, the slit nozzle 203 may be combined with a counter-rotating rotor 204 disposed to intercept the impulse of the jet thrust of the slit nozzle 203 to provide additional energy conversion. The exit of the slit nozzle 203 may be of any nozzle shapes known in the art to optimize throughput and minimize losses. In embodiments, nozzles can be applied from inside the plane of a rotor to avoid the need to move the water out of the way of the incoming blades as may be required with Pelton and Turgo turbines, thus simplifying the blade shape and maximizing the impulse force on the blade without the need for three dimensional shapes to recover the impulse after initial impact and/or to move the water out of the path of oncoming blades. Nozzles of all types can be uniform in exit dimensions or lateralized to stretch the jet across a lateralized turbine. Turbines can be single blade row or multiple blade row or counter-rotating blade rows 203 of the types described and known in the art or may comprise a hybridization of different types. The transmission may be a universal transmission wherein the system may be a planetary transmission 170 or the like that allows n generators to be driven by a single turbine. A universal transmission may be achieved by means of gearing, belting, friction, or combinations thereof. This type of transmission may constitute a component of a modular system of transmission, turbine blades, and turbine housing that may be configurable in multiple ways to accommodate a range of head heights with a single set of components and a single or limited type or rating of a generator.

In aspects of the present teachings, it may desirable to have an array of one or more turbines 250 that may be separated by splash guards 251 or the like to avoid interaction between the water expelled by the preceding array element 252 and the next array element 253. The modular turbine array may be an impulse system that may be Turgo, Pelton, waterwheel, or the like or hybrids thereof and the like. The array may be fed by siphon nozzles that are aligned orthogonally to the flow direction 261 wherein the turbine array is at any spherical angle that benefits clearance of water from the turbine rotational plane and reduces oppositional forces. The nozzles may be aligned relative to the axial flow direction at some spherical angle 258 and the turbine elements may axially aligned to the flow 250. One or more nozzles interaction with the turbine 257 may be fed by a single siphon conveyance 256 or each modular rotor may be fed by an individual siphon and one or more such structures may constitute a module wherein one or more modules may be stacked to a desired capacity. In embodiments the individual modules may have their own co-mounted generators wherein the splash guard and planetary gear functions may be merged into a single component or the modules may connect to one of more shafts 255 wherein a stackable modular generator 262 is used or wherein the planetary system with multiple generators is used or a combination of the systems and the like. The modular turbine system may be comprised of rotor blade elements 254 and mechanisms to adjust the number of blades deployed and the diameter of the rotor 270. The range of blades and the rotor diameter when combined with modular or standard generator and a planetary transmission 170 can accommodate multiple conditions with regard to head and optimizing power extraction.

In aspects of the present teachings, it may be desirable to optimize the water conveyance by minimizing the frictional effects in the conveyance to allow the water delivery to operate at or near a theoretical maximum rate of efficiency. This may be achieved by increasing the cross-sectional area of the conveyance according to the equation below relative to the conveyance length and exit area.

$$Q_r = A_n \sqrt{2g\left(H - \frac{8flQ_t^2}{\pi^2 g d_h^5}\right)}$$

The cross-sectional area may be increased relative to the exit area of the siphon to avoid the boundary layers interfering with the exit column. The equation above may determine or approximate the optimum relationship of the cross-sectional area to the exit area per unit length of conveyance.

In aspects of the present teachings, a plurality of the modular systems may be deployed on two or more geospatially distinct resources, such as two or more dams on a river or two or more river basins in a region. In embodiments, control of the modular systems may be coordinated, such as by providing a networked control system that controls each system. Networked control can be based on a number of parameters, including parameters that optimize the efficiency of an individual system (such as noted above), parameters reflecting the characteristic of an environment in which the modular systems are deployed (e.g., water depths, elevation changes, flow rates, presence of contaminants, presence of fish and other wildlife, and the like), system configuration information (e.g., types of turbines, nozzles, and the like), and other parameters. In embodiments, the modular systems may comprise mobile systems, such that control of each system includes control of the location of the system; for example, control may include specifying or modifying a location at which a system should be operated. Thus, parameters for control may include parameters of other environments at which a modular system might be located (such as places where better conditions of water depth, elevation, flow, or the like are better). Parameters for control may also account for market conditions, grid conditions, and the like, such as identifying locations at which power is needed (such as in a situation involving a problem with grid infrastructure) or identifying locations at which the price paid to a producer for energy is higher (including based on available credits and subsidies for renewable energy production). Parameters for control may be coordinated across systems, such as accounting for the potential effect of operating one system on the effectiveness of another system (such as one deployed downstream, upstream, or over the same dam on a river or other body of water). Parameters for control may account for costs, including operating costs, costs of disassembling, moving and reassembling a system, costs of producing a new system, costs of maintaining a system, and the like. Parameters for control may include optimizing mobility by global inventory control of the resource inventory be electrified inclusive of methods of control that include the parameters detailed above and may include active and reserve inventories allocated algorithmically to maximize the productivity or utilization rate of the equipment.

Instructions for control by a networked control system may be provided by a human operator, an expert system, or an expert system supervised by a human operator. Instructions may specify operating parameters for the modular system, including nozzle positioning, flow rates, turbine operation parameters, opening and closing parameters, energy output rates, target operating levels, target energy production levels, target efficiency levels, maintenance instructions, testing instructions, and the like. Instructions for control may be optimized algorithmically, such as based on one or more rules that operate on one or more objects, the attributes of which reflect the parameters of the system or the environment (including but not limited to other available environments as noted above). Optimization may be based on a model of system operation, such as a model of fluid dynamics, a model of mechanical operation (including but not limited to turbine operation), a model of energy conversion, and the like. Optimization may be based on data collected from the system, such as by one or more instrumentation systems disposed on or in the system or by one or more sensors associated with the system. Optimization may be undertaken by machine learning, such as by using a training set of data collected from test systems or working systems under various conditions to train a neural net to optimize control, to recognize or classify a mode of operation, to recognize a pattern, and the like.

In embodiments, the modules may be deployed as components utilizing a macro geospatial resource model with the boundaries of the macro resource model being defined by various factors, including the cost of reallocation of equipment and the varying operating costs and revenue opportunities in different geospatial locations, rather than dedicating a single power generation system permanently to a single geospatial resource. Benefits may be similar to distributed client-server computation networks, where processing resources across many individual computing devices are combined to create a single, powerful, networked computation system with performance capabilities that exceed the collective capabilities of individual devices operating without coordination. An equipment/resource network has a distinct advantage in that it can adapt to changes in resource and operating conditions and may be deployed to maximize the utilization rate of both the equipment and the global resource while mitigating susceptibility to geospatial or temporal resource or market pricing variation. Coordinated network control of distributed equipment (like mobile power generation equipment) and coordinated optimization of utilization of collective geospatial resources can be applied to modular hydropower generation systems or to any energy generation method or system that experiences resource or parameter variation over an operational lifetime. Modular system networks may be any of size of two or more geospatially distinct resource locations up to and including continental or global networks. The performance of the coordinated systems may be optimized by algorithms inclusive of real time and predictive optimization of equipment allocation relative to the cost of equipment allocation. Individual units may be reallocated as many times as is necessary or profitable during the equipment lifetime. Algorithms may include any algorithm that increases the efficiency and per unit productivity of a modular inventory. Any network optimization algorithm can be combined with the modular equipment network to optimize to a desired result or results. This includes but is not limited to digital network algorithms, logistics algorithms, supply chain algorithms, just-in-time algorithms, genetic and evolutionary or learning algorithms, enterprise resource planning algorithms, and the like. Resource networks and associated algorithms and optimizations can be but are not limited to being executed on the digital systems described herein.

In aspects of present teachings, the modularity and optimization of equipment and resource utilization can be extended to the component level wherein components in the system can be executed, supplied, manufactured, or the like at an optimized specific component lifetime that may vary from the designated lifetime of the system but provide initial and long term cost or performance benefit over generations of the component. The lifetime of individual components may be designed to optimize the performance or results of the system over time, optimizing lifetimes of individual components to the available option of cost-lifetime parameters of the component or may be optimized along with other parameters.

In aspects of the present teachings, it may be desirable to control the utilization of varying resources in a modular deployment to avoid resource conflicts with other sectors or adapt the deployment throughput rate to the availability of the resource. Control of resource utilization may be achieved by step control of modular components by turning modules on and off to avoid over-utilization or depletion of the resource. Step control of the resource utilization may be executed to allow an individual or group of modules to operate at a consistent rate of resource delivery, simplifying the operation and design of the modules.

In aspects of the present teachings, it may desirable to deploy the modular system in described embodiments for the purpose of water quality, sediment balancing, and fish passage, either in combination with the electrification system or independently. The environmental system may include filters for the purpose of removing contaminants or particulates from the water flowing through the siphon. The electrification system and the environmental system may be combined into a single system.

Figure 43:
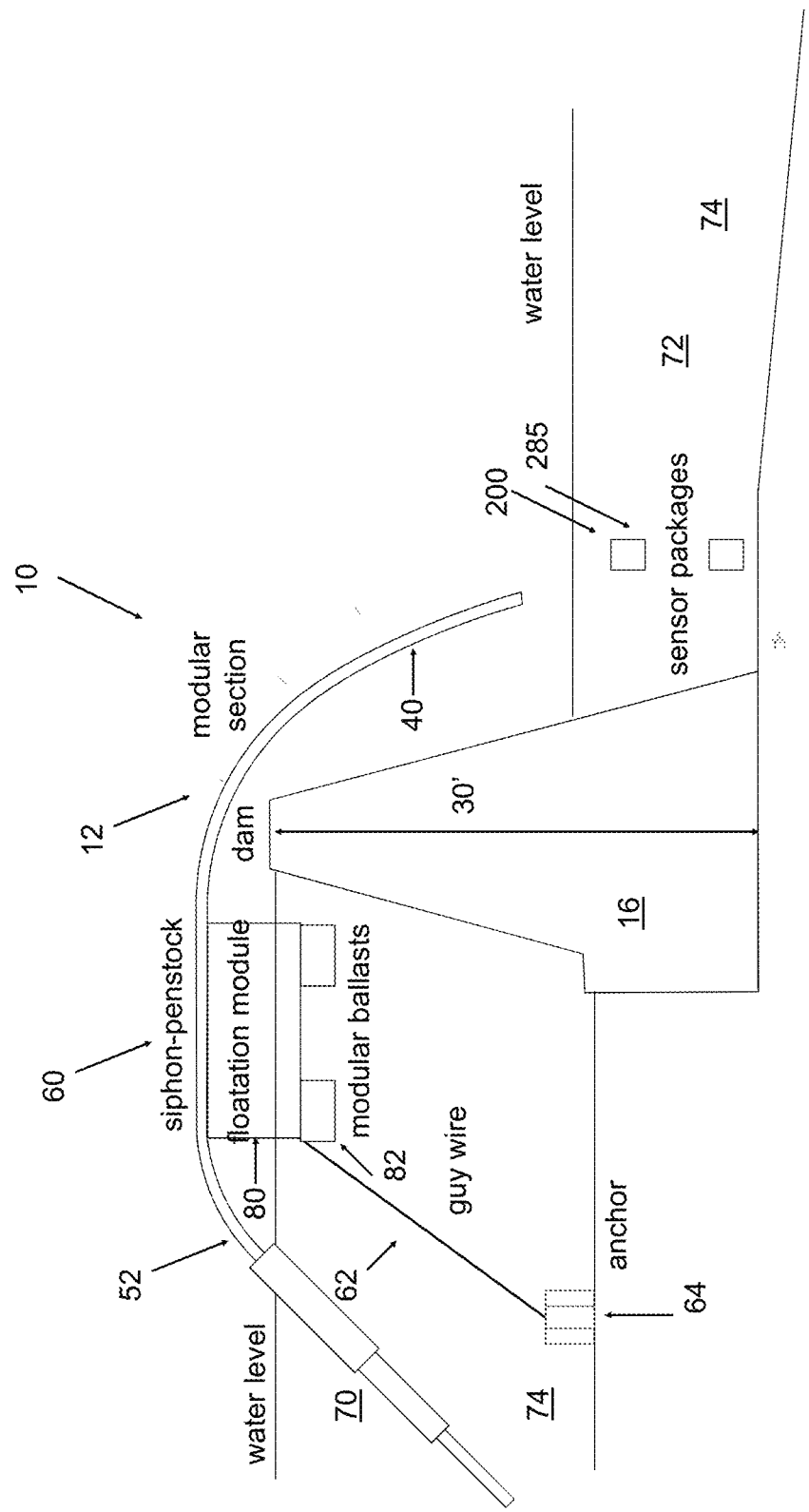
FIG. 43 is a diagrammatic view of examples of a caisson tidal system of a hydrodynamic electrification system with an adjustable depth intake head and a flotation module tethered to an anchor by a guy wire disposed at an opposite side of a siphon from sensor packages located downstream in accordance with the present teachings.
Figure 44:
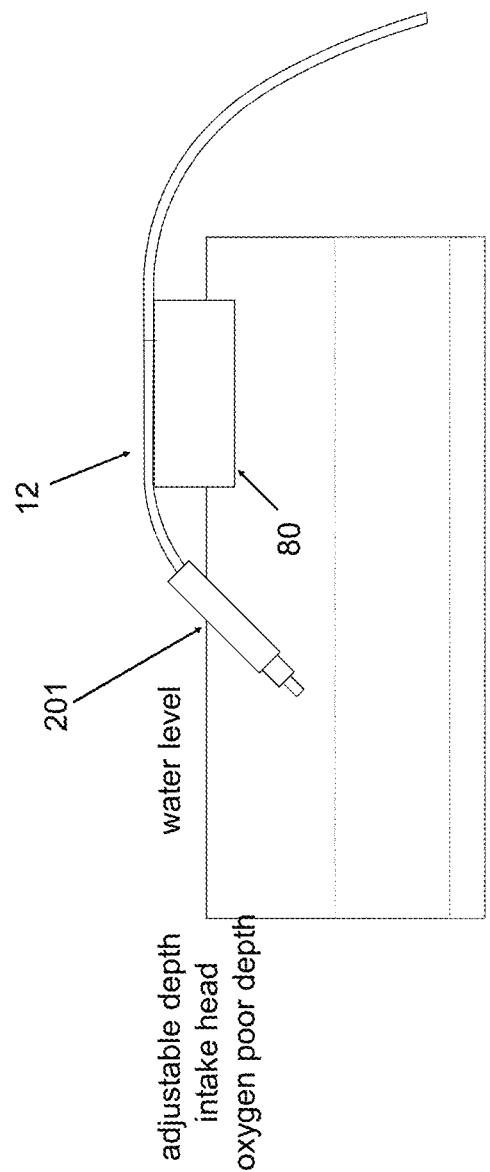
FIG. 44 is a diagrammatic view that depicts examples of an alternative location within a body of water where an adjustable depth intake head may be positioned at an oxygen rich depth in accordance with the present teachings.
Figure 45:
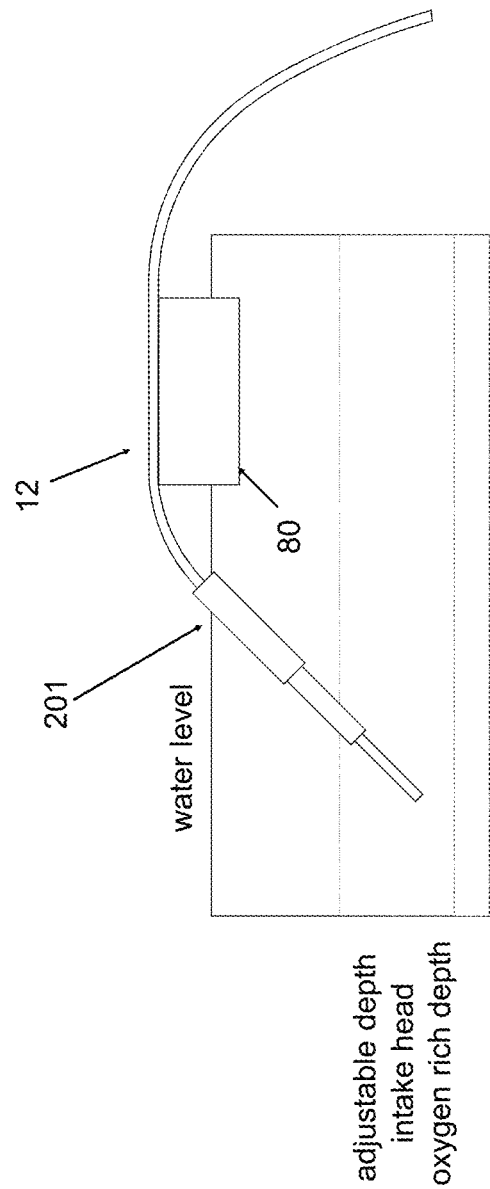
FIG. 45 is a diagrammatic view that depicts examples of an alternative location within a body of water where an adjustable depth intake head may be positioned at an oxygen poor depth in accordance with the present teachings.
Figure 46:
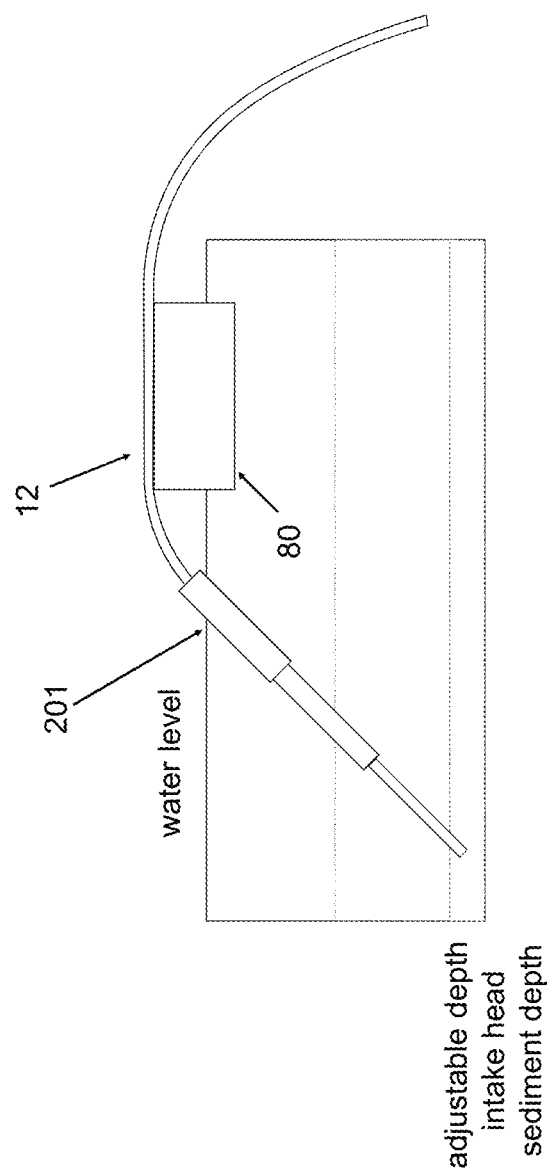
FIG. 46 is a diagrammatic view that depicts examples of an alternative location within a body of water where an adjustable depth intake head may be positioned at a sediment depth in accordance with the present teachings.

Referring to FIG. 43, a diagrammatic view is provided of a hydrodynamic electrification system with an adjustable depth intake 201 head and a flotation module tethered to an anchor by a guy wire. These embodiments may include upstream and downstream sensor packages 200 and adjustable depth siphon intakes 201. In embodiments, adjustable depth siphon 201 intakes may allow the system to balance the water quality, water levels, water content (including content of particulates, sediment or the like, salinity, or the like), water temperatures, or other factors between the upstream and downstream portions of the water source where the modular system is deployed, such as above and below a dam. Referring to FIGS. 44, 45, and 46, an adjustable intake may be positioned in any relevant hydrocline in the river upstream of the dam. The combination of positioning capability and sensors, including chemical sensors, particulate sensors, salinity sensors, sensors for trace elements, biological sensors, pathogen sensors, and the like, may allow the content of the throughput to balance the downstream output to the upstream river conditions.

Figure 47:
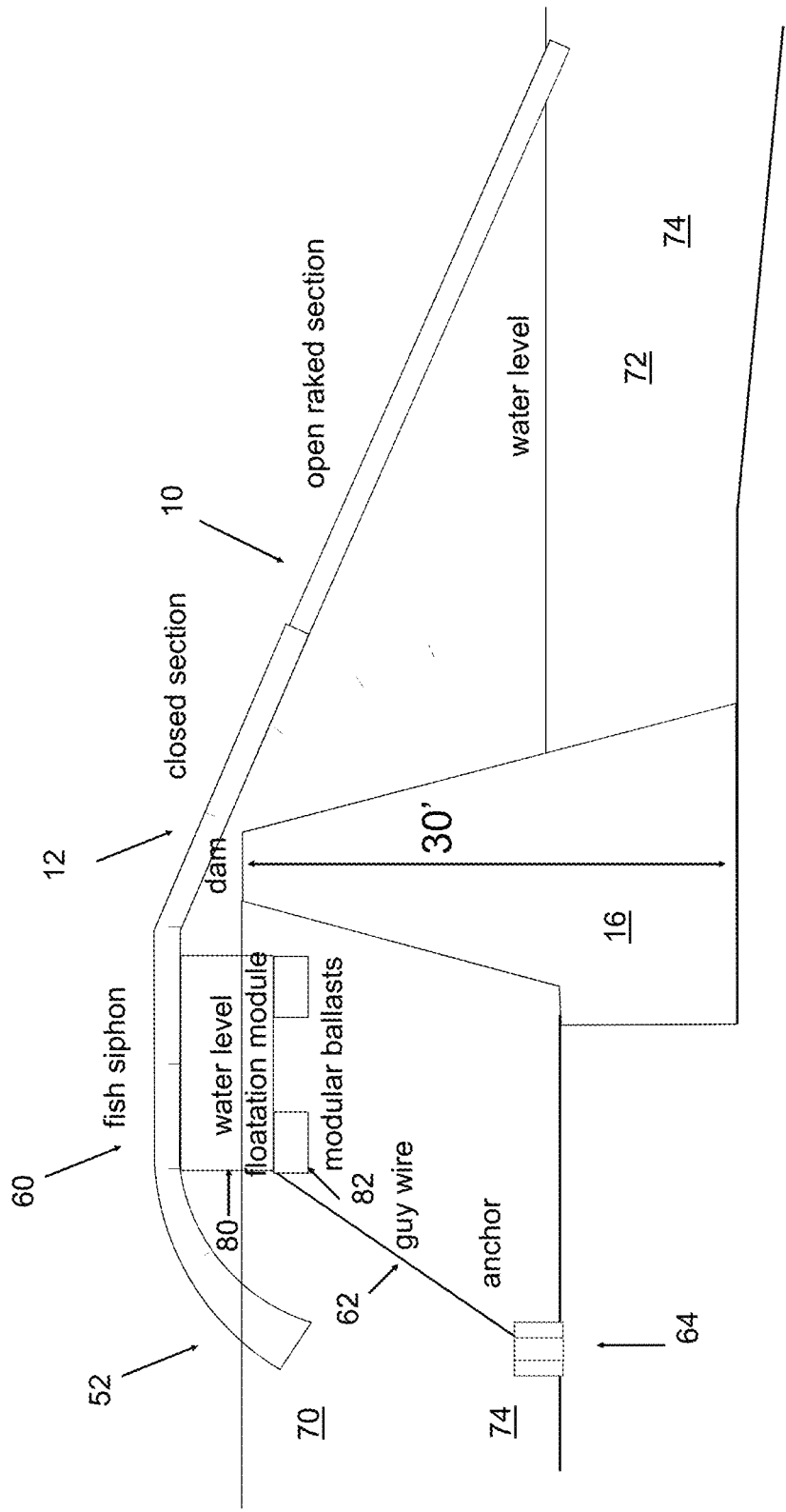
FIG. 47 is a diagrammatic view that depicts examples of a caisson tidal system of a hydrodynamic electrification system with a funnel intake and an outflow on the downstream side of the caisson that includes a closed section and an open raked section of a fish siphon in accordance with the present teachings.
Figure 48:
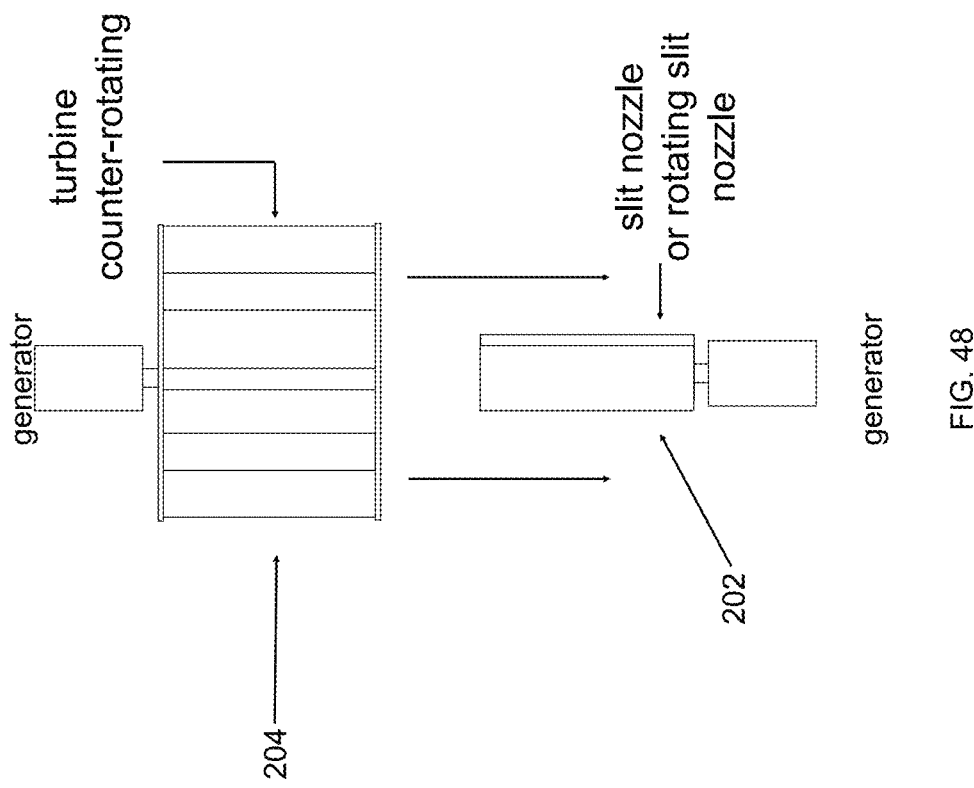
FIG. 48 is a diagrammatic view that depicts examples of a configuration of a slit nozzle for delivering a flow of fluid to driving blades of a turbine in accordance with the present teachings.
Figure 49:
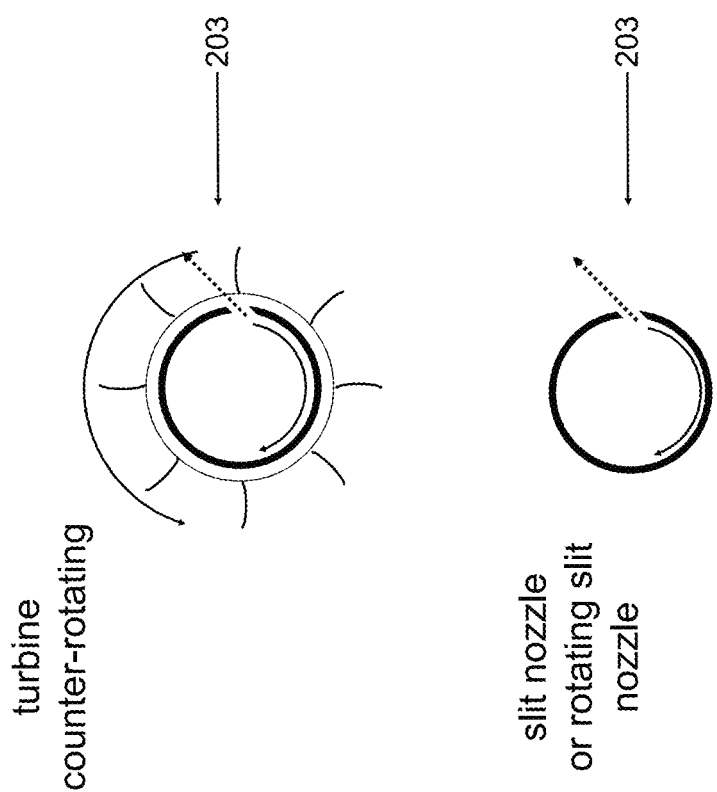
FIGS. 49, 50, and 51 are diagrammatic views that depict examples of configurations of the slit nozzle for delivering a flow of fluid to driving blades of the turbine in accordance with the present teachings.
Figure 50:
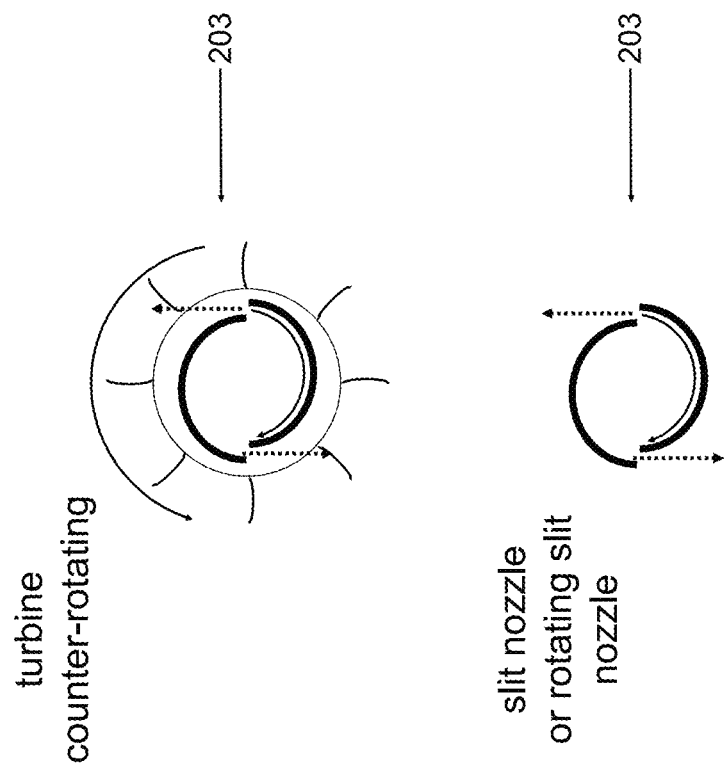
Figure 51:
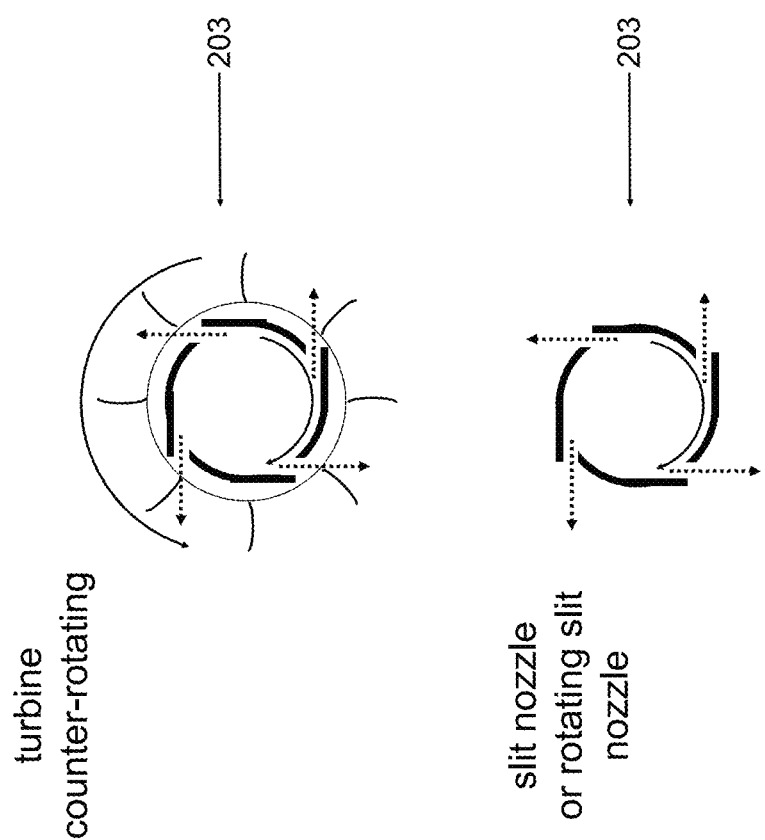

The variable depth siphon intake 201 may be executed with actuators of the kind known in the art, such as linear or rotational actuators, screw-based actuators, fluid-based actuators, and others, and the actuation may be controlled on a timed basis, by remote control of a human operator or expert system, or directly based on sensor data, such as by an autonomous control system, or by combinations of the above. Water quality and sediment siphons may be enclosed for the full length of the siphon. Referring to FIG. 47, in the case of fish passage siphons, the upper portion of the siphon may be closed and the lower portion of the siphon at any plane below the head height of the upper portion of the river may be open to minimize head induced velocity. The closed and/or open section may be fitted with rakes, such as high drag rakes, such as along the lower hydro surface for the purpose of reducing the head velocity against which the fish must swim. The angle of the fish passage may be adjustable to the conditions of the river and the properties of the relevant aquatic species, including by an electromechanical system (e.g., involving one or more robotic elements) under remote operator control, control of an expert system, autonomous control based on one or more sensors, or the like.

Figure 52:
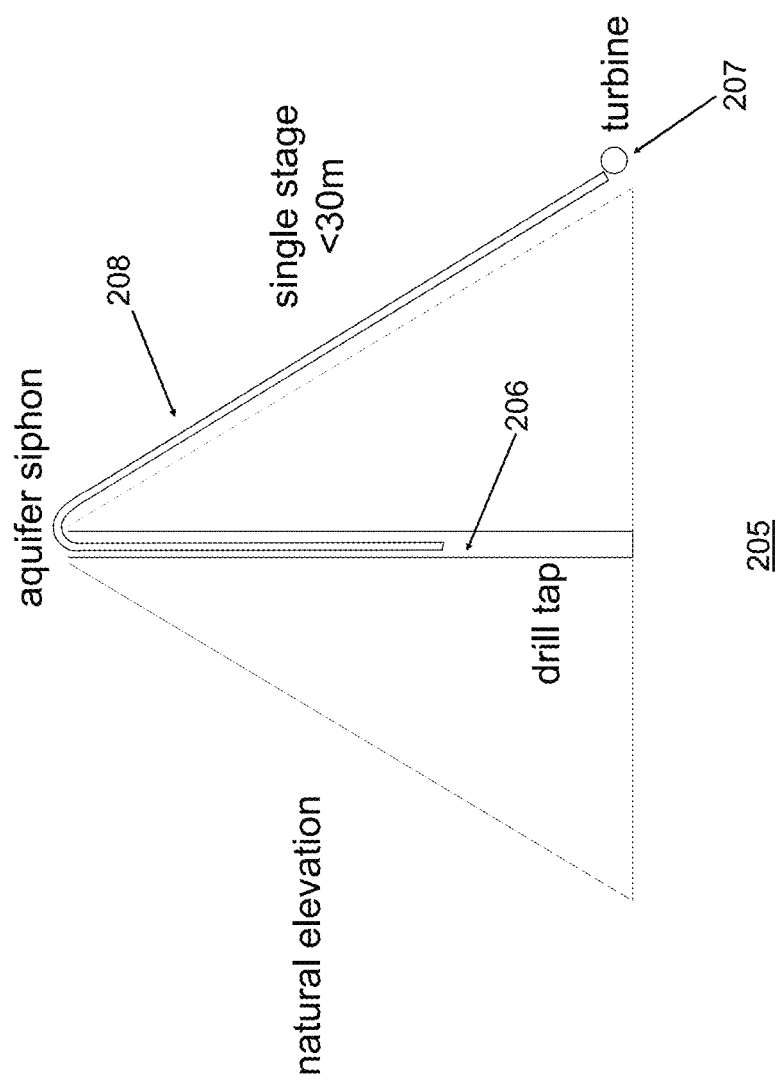
FIG. 52 is a diagrammatic view that depicts examples of a siphoning system adapted for connection to a drill tap as an aquifer siphon having a single stage in accordance with present teachings.
Figure 53:
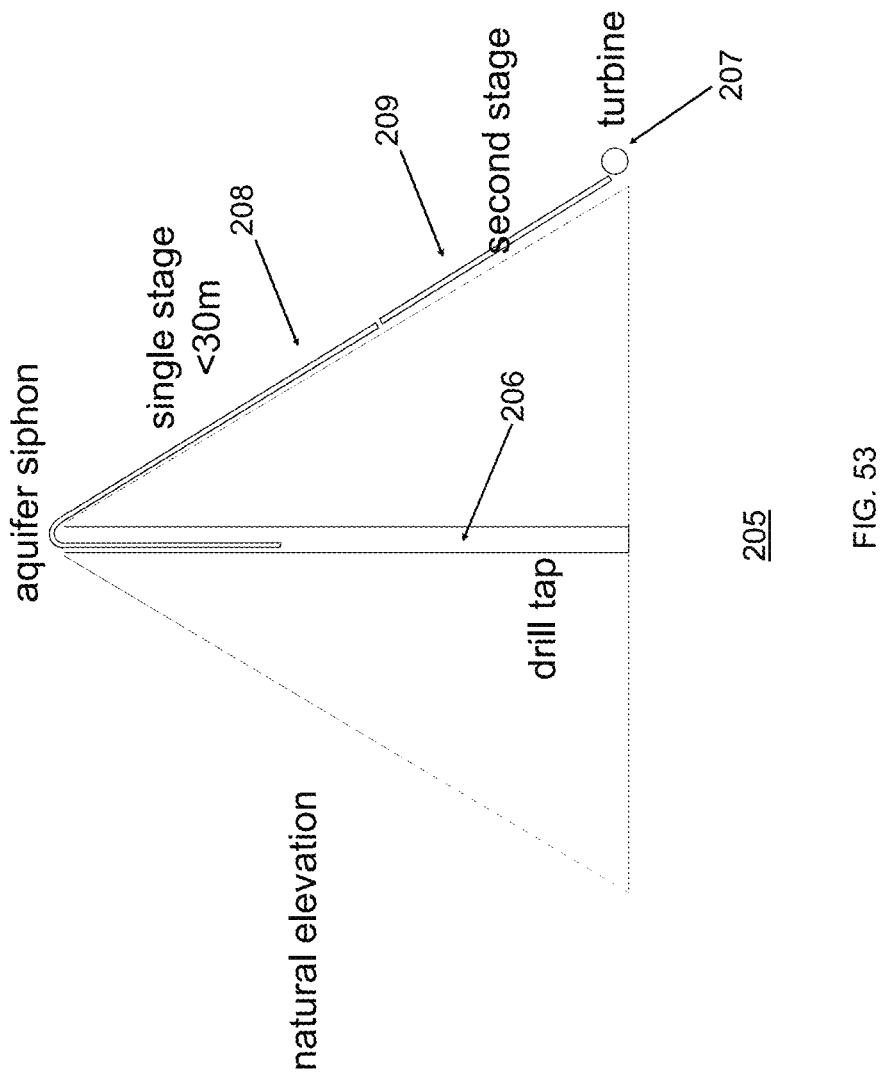
FIG. 53 is a diagrammatic view that depicts examples of a siphoning system adapted for connection to a drill tap as an aquifer siphon having a two-stage siphon in accordance with present teachings.
Figure 54:
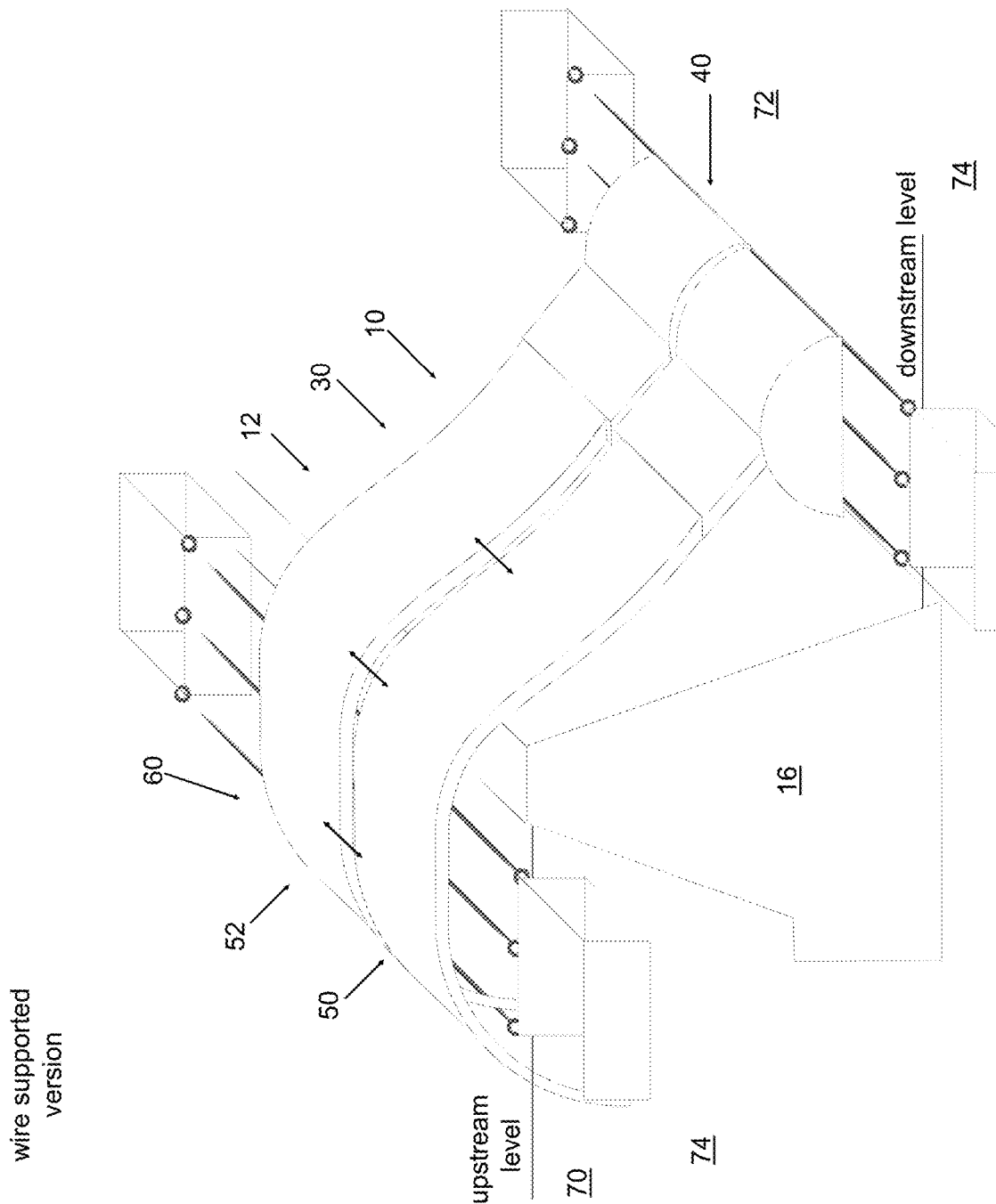
FIG. 54 is a diagrammatic view that depicts examples of a caisson tidal system of a hydrodynamic electrification system with a wire-supported siphon in accordance with the present teachings.

FIGS. 52 and 53 are diagrammatic views of a siphoning system that may draw water from an aquifer 205, such as via a drill tap 206, such as to affect the content or quality of the water delivered downstream or to a turbine 207 within a hydrodynamic power generation system. FIG. 54 is a diagrammatic view that depicts a hydrodynamic electrification system with a tension-supported siphon in accordance with the present teachings.

Figure 55:
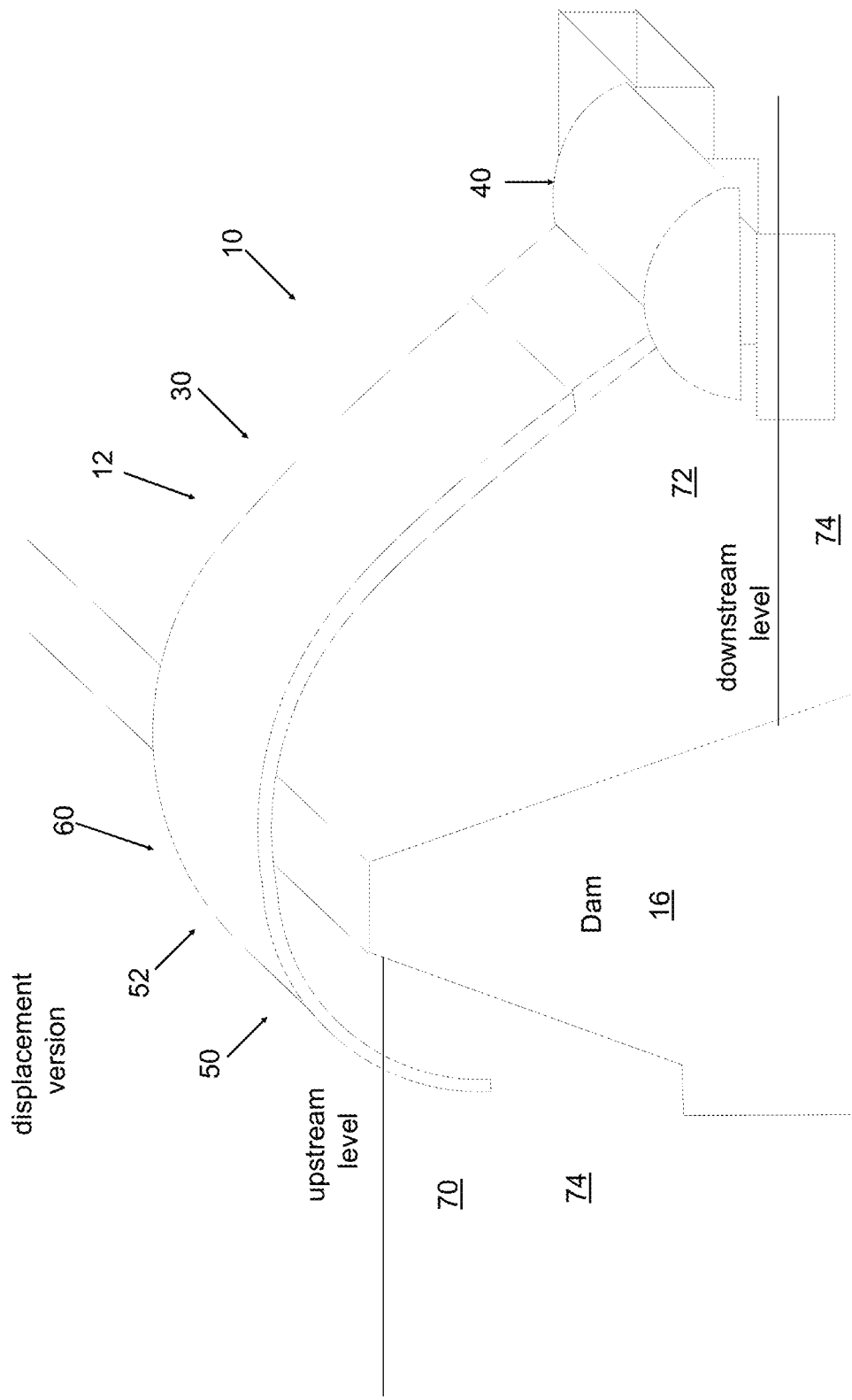
FIG. 55 is a diagrammatic view that depicts examples of a caisson tidal system of a hydrodynamic electrification system with a variable displacement siphon in accordance with the present teachings.
Figure 56:
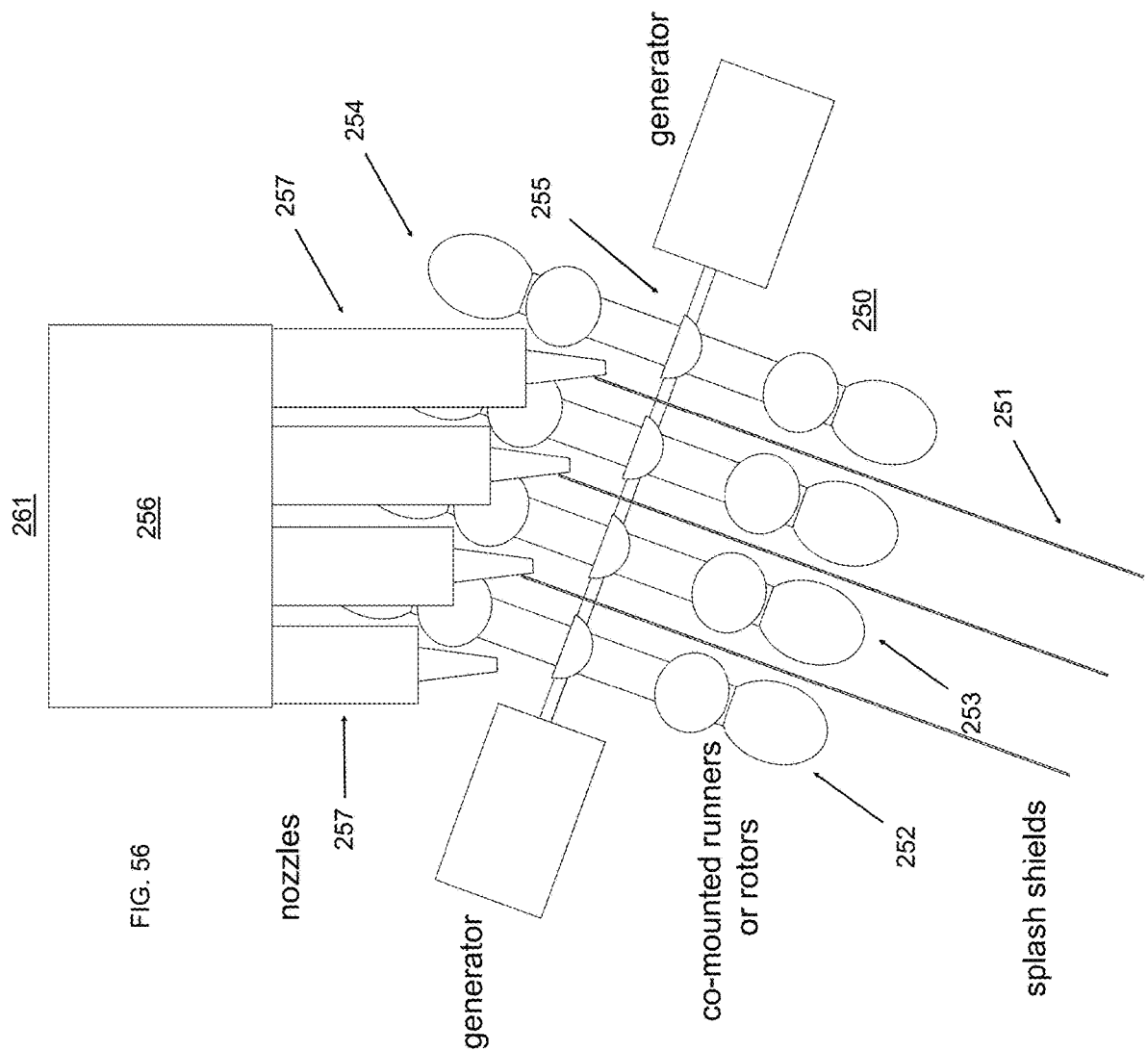
FIGS. 56, 57 and 58 are overhead diagrammatic views that depict examples of a water transport system that delivers water to multiple power extraction systems in accordance with the present teachings.
Figure 57:
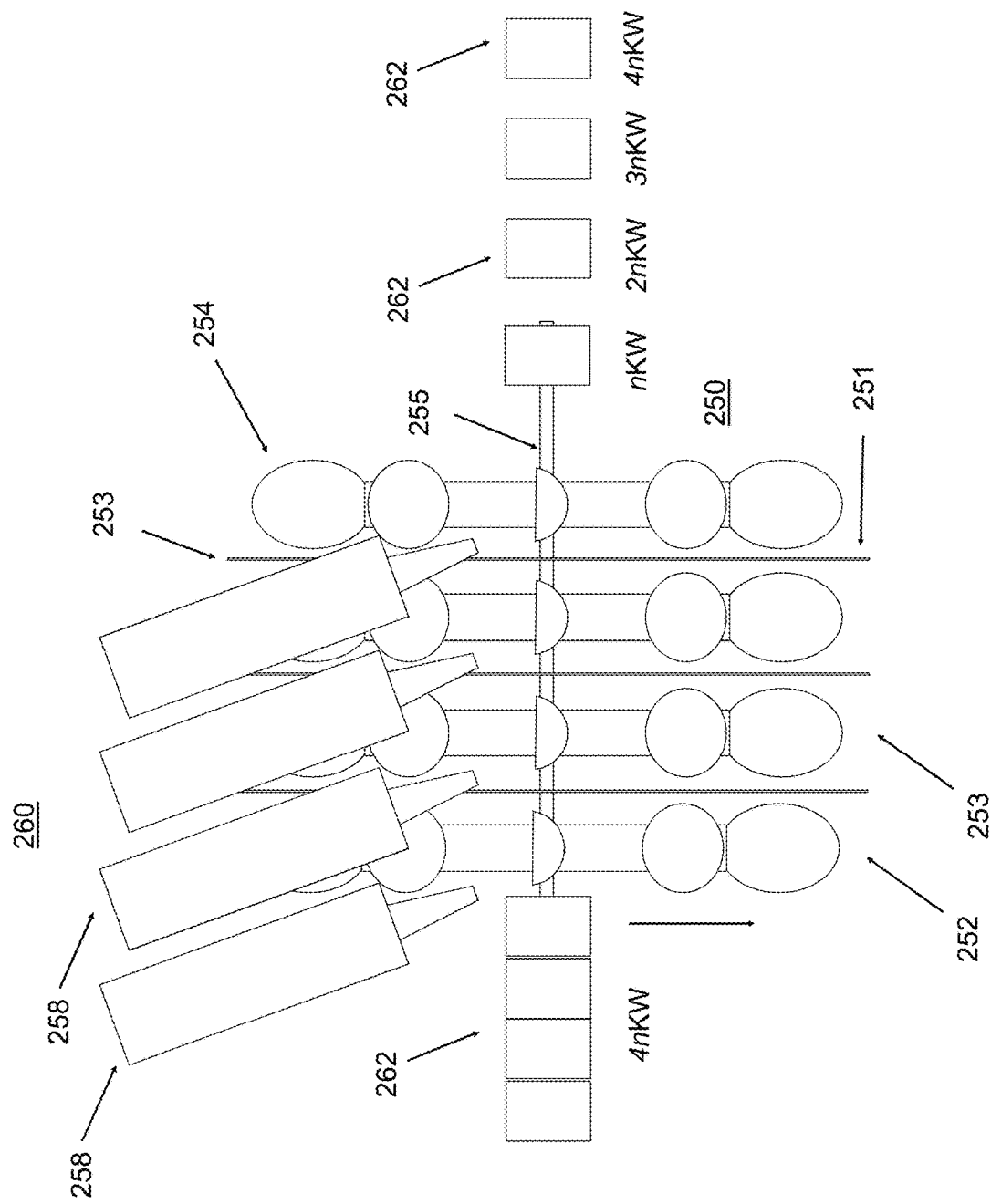
Figure 58:
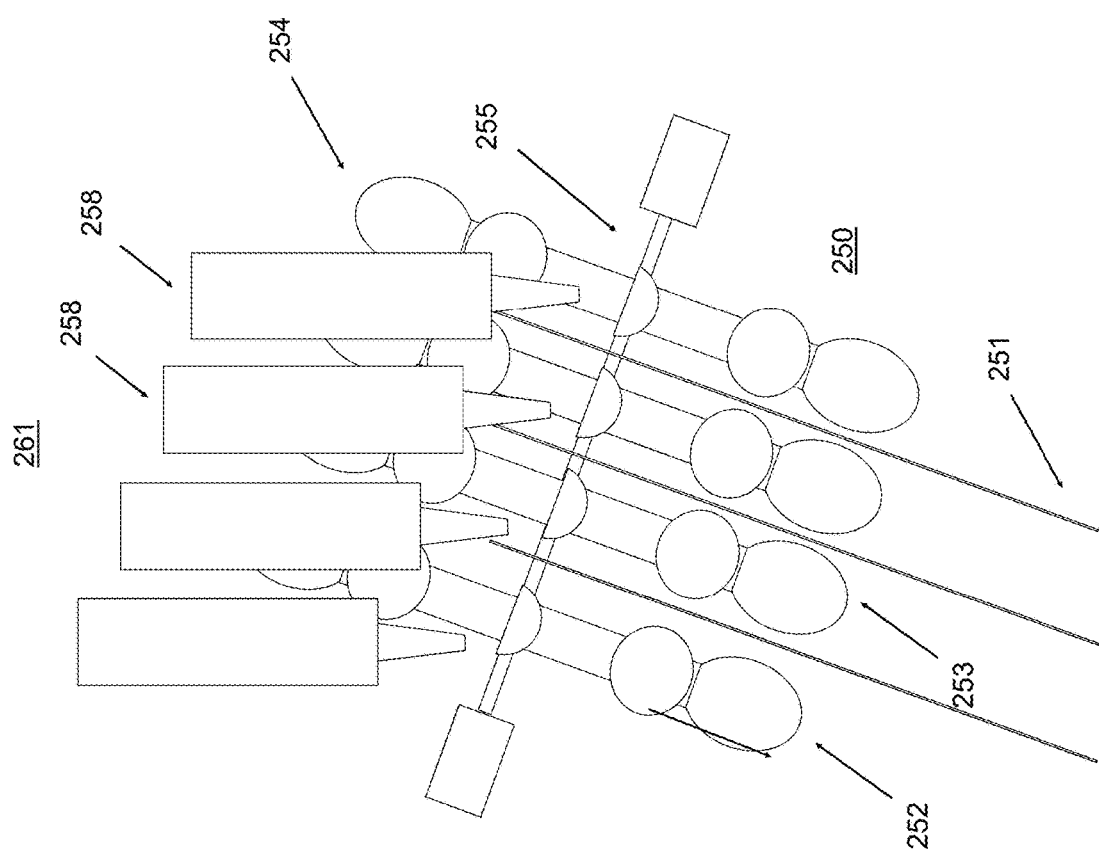
Figure 59:
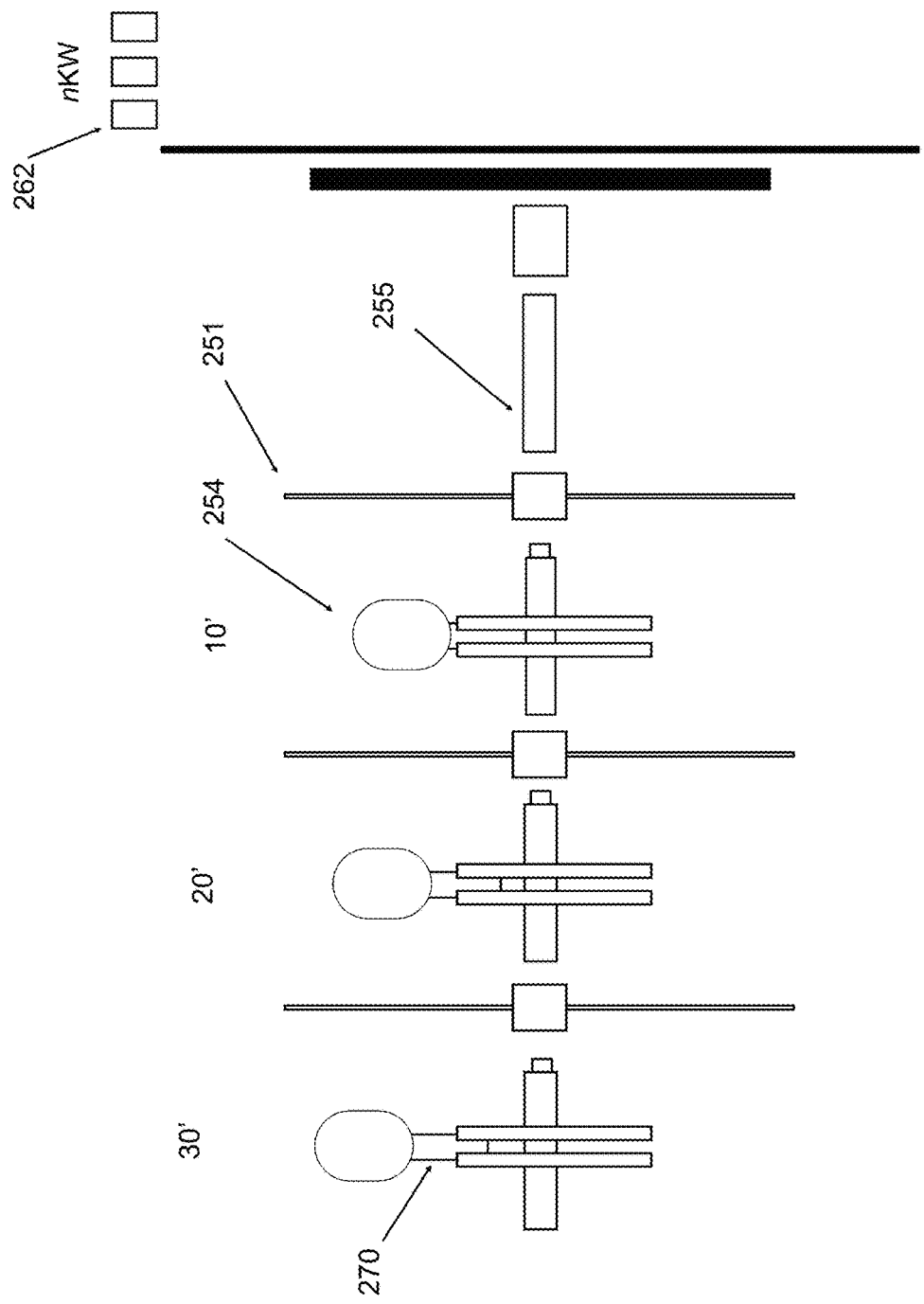
FIG. 59 is an overhead diagrammatic view that depict examples of a water transport system that delivers water to the power extraction system having a modular turbine array in accordance with the present teachings.

FIG. 55 is a diagrammatic view that depicts a hydrodynamic electrification system with a variable displacement siphon in accordance with the present teachings.

Detailed aspects of the present teachings are disclosed herein; however, it is to be understood that the disclosed aspects of the present teachings merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few aspects of the present teachings have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on one or more processor wherein the system may receive information wirelessly from a module control panel 286 or sensor 285 that may measure the relevant performance or state, economic or otherwise, that may be the purpose of the module in question. The module control panel may upload data to the system for analysis of performance and/or utilization rate or may analyze performance locally and forward a notice to the system of a state of underperformance. In the case of underperformance, either in the control or utilization dimensions, the system may calculate the benefit of moving the equipment to a new location wherein its performance or utilization rate is increased and may yield a net economic benefit. The system may use any decision based or learning algorithms to determine benefit to the equipment state in the case of reallocation to a new location. Inventory control, just-in-time, ERP, and the like algorithms may be used in combination simpler decision algorithms to optimize the state of the equipment inventory across its deployed "region". The present disclosure may be implemented as a method on the machine, as a system or apparatus as part of or in relation to the machine, or as a computer program product embodied in a computer readable medium executing on one or more of the machines. In aspects of the present teachings, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In aspects of the present teachings, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of a program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++ or Java, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the many aspects of the present teachings shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific aspects, examples, method, and examples herein. The disclosure should therefore not be limited by the above described aspects, structures, method, and examples, but by all aspects within the scope and spirit of the present teachings.

What is claimed is:

1. A hydrodynamic electrification system that generates electricity from water moving from a high side to a low side and around a structure that divides the low side from the high side, the system comprising:
   a water transport system that directs the water from the high side presenting a hydraulic head, over the structure, and to the low side;
   a power extraction system having a wheel that receives the water from said water transport system, wherein said power extraction unit is configured to adjust the frequency of electricity being generated by adjusting a flow of the water from said water transport system to said power extraction unit;
   a mounting system having a high side anchor that connects near an intake to the water transport system at the high side and having a low side anchor that connects to the power extraction system at the low side; and
   wherein said water transport system include a siphon having an accelerator section to increase a jet velocity of the water into said power extraction system having said wheel configured to operate with a confined flow and include one of a spiral rotor and anhedrally-tilted rotors, and wherein said adjusting of said flow of the water from said water transport system to said power extraction unit includes adjusting a flow rate through the siphon.

2. The hydrodynamic electrification system of claim 1 wherein the structure is one of a dam, a dam sluice, a natural elevation that contains a hydraulic head, a manmade elevation that contains a hydraulic head, a manmade dam, and a previously electrified dam.

3. The hydrodynamic electrification system of claim 1 wherein said power extraction unit generates electricity at 50 Hz.

4. The hydrodynamic electrification system of claim 1 wherein said power extraction unit generates electricity at 60 Hz.

5. The hydrodynamic electrification system of claim 1 wherein said water transport system include multiple siphons, and wherein said adjusting of said flow of the water from said water transport system to said power extraction unit includes opening or closing at least one of said multiple siphons.

6. The hydrodynamic electrification system of claim 1 wherein said siphon made of multiple portions of penstock.

7. The hydrodynamic electrification system of claim 1 wherein the structure is a modular ballast that is configured to move in response to movement of a water line on the high side and a portion of the water transport system is configured to move with said modular ballast.

8. The hydrodynamic electrification system of claim 1 wherein the structure is a modular ballast that is configured to move in response to movement of a water line on the high side, and wherein said high side anchor is connected to said modular ballast and said intake of said water transport system is configured to move with said modular ballast.

9. The hydrodynamic electrification system of claim 1 wherein the structure is a modular ballast that is configured to move in response to movement of a water line on the high side, and wherein said low side anchor is connected to said modular ballast and said power extraction system is configured to move with said modular ballast.

10. The hydrodynamic electrification system of claim 1 wherein the structure is a modular ballast that is configured to move in response to movement of a water line on the high side, and wherein said high side anchor is moored to said modular ballast and said intake of said water transport system is configured to float and not move with said modular ballast.

11. The hydrodynamic electrification system of claim 1 wherein the structure is a modular ballast that is configured to move in response to movement of a water line on the high side, and wherein said low side anchor is moored to said modular ballast and said power extraction system is configured to float but not move with said modular ballast.

12. The hydrodynamic electrification system of claim 1 wherein the mounting system includes a flotation module connected to the intake, wherein the flotation module has a submerged element below a waterline on the high side.

13. The hydrodynamic electrification system of claim 12 wherein said submerged element on the flotation module is at least one hydrofoil.

14. The hydrodynamic electrification system of claim 13 wherein said at least one hydrofoil is configured to be oriented axially with a flow of the water through said water transport system.

15. The hydrodynamic electrification system of claim 13 wherein said submerged element on the flotation module is a series of symmetric hydrofoils oriented axially with a flow of the water through the water transport system.

16. The hydrodynamic electrification system of claim 1 wherein said siphon includes a cross-sectional area defining a single geometry that is one of a honeycomb, round, an oval, triangular, and rectangular throughout the length of the siphon.

17. The hydrodynamic electrification system of claim 1 wherein said siphon includes a cross-sectional area defining at least two different geometries selected from a group consisting of a honeycomb, round, an oval, triangular, and rectangular.

18. The hydrodynamic electrification system of claim 1 wherein said power extraction system having said wheel that is configured to operate in a two-phase water to air system with a jet velocity of a flow of the water into the power extraction system being between 1.25 and 2 times the rotational speed of said wheel.

19. The hydrodynamic electrification system of claim 1 further comprising multiple water transport systems each connected to one of multiple power extraction systems each having a wheel that receives the water from one said water transport systems to which each of said power extraction systems is connected, wherein at least two of said multiple power extraction systems are at disparate geospatial locations.

20. The hydrodynamic electrification system of claim 1 further comprising multiple water transport systems each connected to one of multiple power extraction systems each having a wheel that receives the water from one said water transport systems to which each of said power extraction systems is connected, wherein the multiple power extraction systems each have a sensor package and are configured to controlled by a network control system that wirelessly connects to each of the multiple power extraction systems.

* * * * *